United States Patent
Kim et al.

(10) Patent No.: US 11,508,378 B2
(45) Date of Patent: Nov. 22, 2022

(54) ELECTRONIC DEVICE AND METHOD FOR CONTROLLING THE SAME

(71) Applicant: SAMSUNG ELECTRONICS CO., LTD., Suwon-si (KR)

(72) Inventors: Kwangyoun Kim, Suwon-si (KR); Kyungmin Lee, Suwon-si (KR); Youngho Han, Suwon-si (KR); Sungsoo Kim, Suwon-si (KR); Sichen Jin, Suwon-si (KR); Jisun Park, Suwon-si (KR); Yeaseul Song, Suwon-si (KR); Jaewon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 182 days.

(21) Appl. No.: 16/661,658

(22) Filed: Oct. 23, 2019

(65) Prior Publication Data

US 2020/0126565 A1 Apr. 23, 2020

(30) Foreign Application Priority Data

Oct. 23, 2018 (KR) .................. 10-2018-0126946
Mar. 18, 2019 (KR) .................. 10-2019-0030660

(51) Int. Cl.
*G10L 17/00* (2013.01)
*G10L 25/51* (2013.01)
*G10L 25/84* (2013.01)

(52) U.S. Cl.
CPC .............. *G10L 17/00* (2013.01); *G10L 25/51* (2013.01); *G10L 25/84* (2013.01)

(58) Field of Classification Search
CPC ......... G10L 17/00; G10L 25/51; G10L 25/84; H04R 29/00; H04R 5/02
See application file for complete search history.

(56) References Cited

U.S. PATENT DOCUMENTS 9,513,711 B2 * 12/2016 Ryu ..................... G06F 3/017
9,646,628 B1 *  5/2017 Carlson ................ G10L 17/00
(Continued)

FOREIGN PATENT DOCUMENTS

CN       107910007 A    4/2018
KR  10-2016-0089145 A   7/2016
(Continued)

OTHER PUBLICATIONS

International Search Report (PCT/ISA/210) dated Feb. 17, 2020 from the International Searching Authority in counterpart application No. PCT/KR2019/013986.
(Continued)

*Primary Examiner* — Mohammad K Islam
(74) *Attorney, Agent, or Firm* — Sughrue Mion, PLLC

(57) ABSTRACT

An electronic device is provided. The electronic device includes a microphone to receive audio, a communicator, a memory configured to store computer-executable instructions, and a processor configured to execute the computer-executable instructions. The processor is configured to determine whether the received audio includes a predetermined trigger word; based on determining that the predetermined trigger word is included in the received audio; activate a speech recognition function of the electronic device; detect a movement of a user while the speech recognition function is activated; and based on detecting the movement of the user, transmit a control signal, to a second electronic device to activate a speech recognition function of the second electronic device.

16 Claims, 40 Drawing Sheets

(56) References Cited

U.S. PATENT DOCUMENTS

| | | |
|---|---|---|
| 9,749,583 B1* | 8/2017 | Fineberg ................ H04N 7/142 |
| 9,774,998 B1* | 9/2017 | Soyannwo ............. H04L 67/24 |
| 9,953,647 B2 | 4/2018 | Mun et al. |
| 10,051,600 B1* | 8/2018 | Zhong ..................... G06F 3/167 |
| 10,079,012 B2* | 9/2018 | Klimanis ............. G10L 15/065 |
| 10,304,463 B2 | 5/2019 | Mixter et al. |
| 10,490,192 B2* | 11/2019 | Ogawa .................... G10L 15/08 |
| 10,692,485 B1* | 6/2020 | Grizzel .................... G10L 13/00 |
| 10,748,543 B2 | 8/2020 | Mixter et al. |
| 2013/0024196 A1* | 1/2013 | Ganong, III .......... H04M 3/569 |
| | | 704/E17.001 |
| 2014/0278395 A1* | 9/2014 | Zurek ..................... G10L 15/20 |
| | | 704/231 |
| 2015/0194152 A1 | 7/2015 | Katuri et al. |
| 2015/0228274 A1 | 8/2015 | Leppanen et al. |
| 2016/0163315 A1* | 6/2016 | Choi .................... H04L 12/2816 |
| | | 704/275 |
| 2016/0210965 A1* | 7/2016 | Mun ....................... G10L 15/32 |
| 2017/0076720 A1 | 3/2017 | Gopalan et al. |
| 2017/0083285 A1 | 3/2017 | Meyers et al. |
| 2017/0133011 A1* | 5/2017 | Chen .................... H04L 12/282 |
| 2017/0155831 A1 | 6/2017 | Jang et al. |
| 2017/0243578 A1 | 8/2017 | Son et al. |
| 2017/0256258 A1 | 9/2017 | Froelich |
| 2017/0330563 A1 | 11/2017 | Daley et al. |
| 2018/0047394 A1 | 2/2018 | Tian et al. |
| 2018/0061412 A1* | 3/2018 | Cho ........................ G10L 15/22 |
| 2018/0075860 A1 | 3/2018 | Parada et al. |
| 2018/0096690 A1 | 4/2018 | Mixter et al. |
| 2018/0146042 A1 | 5/2018 | Choi |
| 2018/0210703 A1 | 7/2018 | Meyers et al. |
| 2019/0221215 A1 | 7/2019 | Mixter et al. |
| 2020/0066273 A1* | 2/2020 | Tanabe ................... G10L 15/22 |
| 2020/0184963 A1* | 6/2020 | Joseph ................... G10L 15/30 |
| 2021/0012779 A1 | 1/2021 | Mixter et al. |
| 2021/0104242 A1* | 4/2021 | Hashimoto ............. G06F 3/167 |

FOREIGN PATENT DOCUMENTS

| | | |
|---|---|---|
| KR | 10-2017-0064242 A | 6/2017 |
| KR | 1020170097519 A | 8/2017 |
| KR | 10-2018-0047801 A | 5/2018 |

OTHER PUBLICATIONS

Written Opinion (PCT/ISA/237) dated Feb. 17, 2020 from the International Searching Authority in counterpart application No. PCT/KR2019/013986.

Communication dated Sep. 23, 2021, from the European Patent Office in European Application No. 19877161.0.

Communication dated Feb. 25, 2022 issued by the Indian Patent Office in counterpart Indian Application No. 202127021215.

* cited by examiner

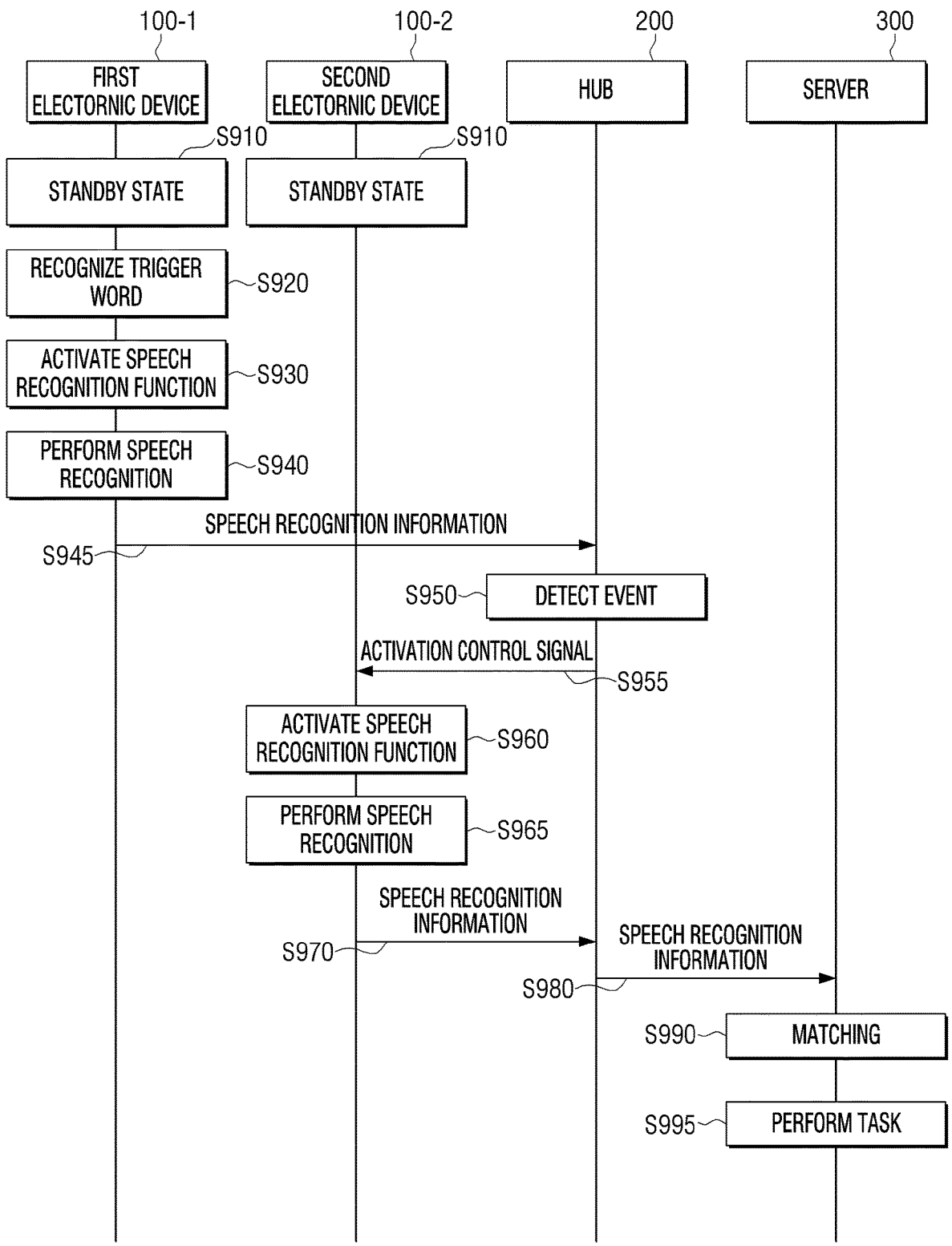

|         | ELECTRONIC DEVICE ||  SERVER ||
|         | AM | LM | AM | LM |
|---------|----|----|----|----|
| EX. 1.1 | X  | X  | O  | O  |
| EX. 1.2 | O  | X  | O  | O  |
| EX. 1.3 | O  | O  | O  | O  |
| EX. 1.4 | X  | O  | O  | O  |

FIG. 16

|        | ELECTRONIC DEVICE ||  HUB  ||
|        | AM | LM | AM | LM |
|--------|----|----|----|----|
| EX. 2.1 | X | X | O | O |
| EX. 2.2 | O | X | O | O |
| EX. 2.3 | O | O | O | O |
| EX. 2.4 | X | O | O | O |

FIG. 17

|  | ELECTRONIC DEVICE | | HUB | | SERVER | |
|---|---|---|---|---|---|---|
|  | AM | LM | AM | LM | AM | LM |
| EX. 3.1 | X | X | X | X | O | O |
| EX. 3.2 | X | X | O | X | O | O |
| EX. 3.3 | X | X | O | O | O | O |
| EX. 3.4 | X | X | X | O | O | O |
| EX. 3.5 | O | X | X | X | O | O |
| EX. 3.6 | O | X | O | X | O | O |
| EX. 3.7 | O | X | O | O | O | O |
| EX. 3.8 | O | X | X | O | O | O |
| EX. 3.9 | X | O | X | X | O | O |
| EX. 3.10 | X | O | O | X | O | O |
| EX. 3.11 | X | O | O | O | O | O |
| EX. 3.12 | X | O | X | O | O | O |
| EX. 3.13 | O | O | X | X | O | O |
| EX. 3.14 | O | O | O | X | O | O |
| EX. 3.15 | O | O | O | O | O | O |
| EX. 3.16 | O | O | X | O | O | O |

FIG. 20
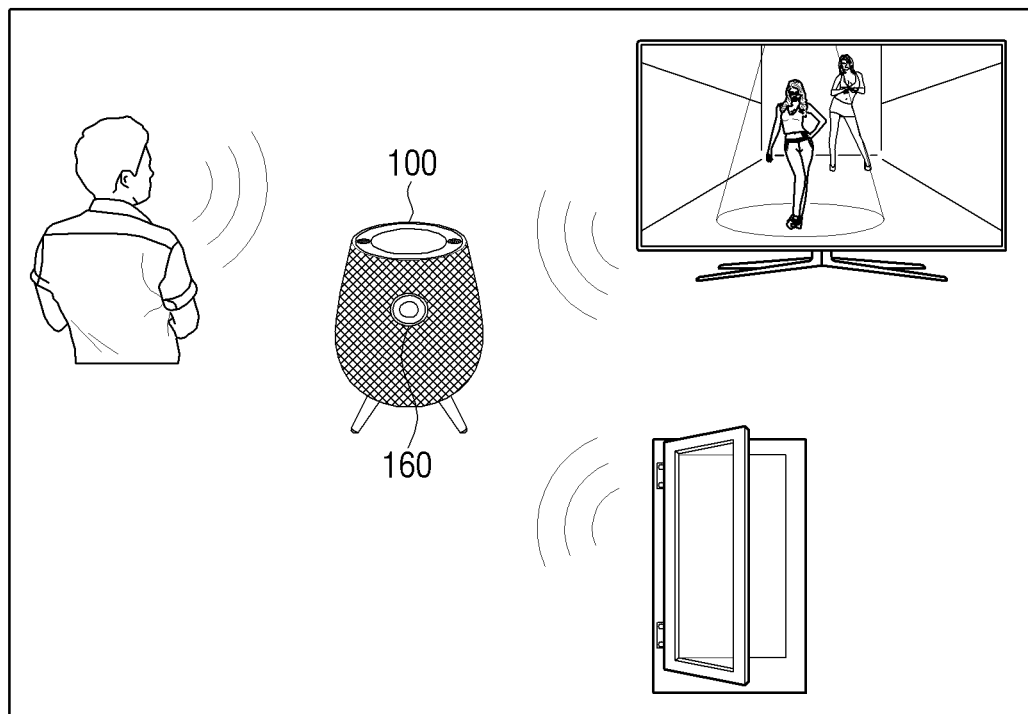
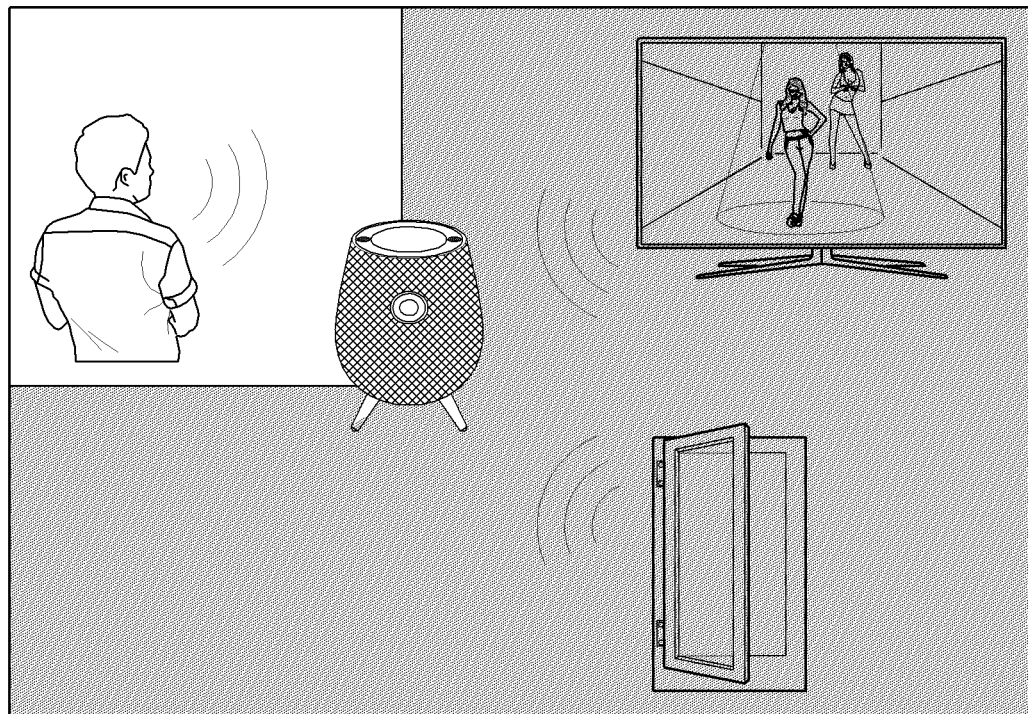

ELECTRONIC DEVICE AND METHOD FOR CONTROLLING THE SAME

CROSS-REFERENCE TO RELATED APPLICATION(S)

This application is based on and claims priority under 35 U.S.C. § 119 to Korean Patent Application Nos. 10-2018-0126946, filed on Oct. 23, 2018 and 10-2019-0030660, filed on Mar. 18, 2019, in the Korean Intellectual Property Office, the disclosure of which are incorporated by reference herein in their entireties.

BACKGROUND

1. Field

Apparatuses and methods consistent with the disclosure relate to an electronic device and a method for controlling the same, and more particularly, to an electronic device and a method for controlling the same, which may control a speech recognition job to be continuously performed in another electronic device, and obtain a final speech recognition result by combining speech recognition information performed in each of the individual electronic device.

2. Description of the Related Art

Recently, an artificial intelligence system is being used in various fields. The artificial intelligence system is a system in which a machine performs learning and makes a decision based on the learning, unlike an existing rule-based smart system. As the artificial intelligence system is used more frequently, a recognition a user's needs may be more accurately understood, and as a result, the existing rule-based smart system has been gradually replaced by a deep learning-based artificial intelligence system.

An artificial intelligence technology may include machine learning, for example, deep learning, and applications using the machine learning.

The machine learning is an algorithm of classifying and learning features of input data by the machine, and the element technology is a technology that mimics functions of human brain, such as cognition, judgment, and the like, by utilizing machine learning algorithms, such as deep learning and the like. The machine learning may be applied to technical fields, such as linguistic understanding, visual understanding, inference/prediction, knowledge representation, a motion control, and the like.

The linguistic understanding is a technology for recognizing, applying, and processing human's language/characters, and includes natural language processing, machine translation, dialogue system, query response, speech recognition/synthesis, and the like. The visual understanding is a technology for recognizing and processing objects as human vision, and includes object recognition, object tracking, image search, human recognition, scene understanding, spatial understanding, image enhancement, and the like. The inference and prediction is a technology for judging and logically inferring and predicting information, and includes knowledge/probability based inference, optimization prediction, preference based planning, recommendation, and the like. The knowledge representation is a technology that automates the processing of human experience information into knowledge data, and includes knowledge building (e.g., data generation/classification), knowledge management (e.g., data utilization), and the like. The motion control is a technology for controlling an autonomous running of a vehicle and a motion of a robot, and includes a movement control (e.g., navigation, collision, running), an operation control (e.g., behavior control), and the like.

On the other hand, various services using speech recognition devices equipped with artificial intelligence agents (e.g., Bixby™, Assistant™, Alexa™, etc.) that provide answers to user speech inquiries are recently provided. The user may activate a speech recognition function of the speech recognition device through a trigger word. However, there is a limit that speech recognition may not be continued when a user moves or a state of the speech recognition device changes, for example, turning power off. As such, there may be inconvenience to the user because the user may have to interact with only one speech recognition device that is activated with the speech recognition function.

SUMMARY

Embodiments of the disclosure overcome the above disadvantages and other disadvantages not described above.

The disclosure provides an electronic device and a method for controlling the same, which may control a speech recognition job to be continuously performed in the other electronic device, and obtain a final speech recognition result by combining speech recognition information performed in an individual electronic device.

According to an embodiment, there is provided an electronic device including a microphone to receive audio, a communicator, a memory configured to store computer-executable instructions, and a processor configured to execute the computer-executable instructions. The processor is configured to determine whether the received audio includes a predetermined trigger word; based on determining that the predetermined trigger word is included in the received audio; activate a speech recognition function of the electronic device; detect a movement of a user while the speech recognition function is activated; and based on detecting the movement of the user, transmit a control signal, to a second electronic device to activate a speech recognition function of the second electronic device.

The processor is further configured to detect the movement of the user based on the received audio obtained through the microphone after the speech recognition function is activated.

The memory stores information on a plurality of electronic devices that receive the audio, and the processor is further configured to, based on the movement of the user, identify one of the plurality of electronic devices that is closest to the user; and control the communicator to transmit the control signal to the identified electronic device.

The processor is further configured to obtain first speech recognition information by performing speech recognition on the received audio; receive second speech recognition information through the communicator from the second electronic device receiving the control signal; and obtain a final recognition result based on the first speech recognition information and the second speech recognition information.

The processor is further configured to obtain time information on a time at which the control signal is transmitted to the second electronic device and match the first speech recognition information and the second speech recognition information based on the obtained time information to obtain the final recognition result.

The time information includes information on an absolute time at which the control signal is transmitted and information on a relative time at which the control signal is transmitted to the second electronic device based on a time at which the speech recognition function of the electronic device is activated.

The processor is further configured to obtain the final recognition result by applying a language model to the second speech recognition information when the second speech recognition information received from the second electronic device is information indicating that an acoustic model is applied and the language model is not applied; and obtain the final recognition result by applying the acoustic model and the language model to the second speech recognition information when the second speech recognition information received from the second electronic device is information indicating that the acoustic model and the language model are not applied.

The processor is further configured to control the communicator to transmit the control signal, to the second electronic device, for providing a feedback on the final recognition result of the electronic device.

The processor is further configured to activate the speech recognition function of the electronic device when a second control signal for activating the speech recognition function is received from the second electronic device.

The processor is further configured to receive user information from the second electronic device and identify the received audio corresponding to the user information among a plurality of audios received through the microphone after the speech recognition function is activated by the second control signal.

The processor is further configured to obtain speech recognition information by performing speech recognition on the received audio until an utterance of the user ends after the speech recognition function is activated by the second control signal, and transmit the obtained speech recognition information to the second electronic device.

The processor is further configured to identify a first user and a second user based on the received audio among a plurality of audios.

According to another embodiment, there is provided a method for controlling an electronic device. The method may include receiving audio through a microphone of the electronic device; determining whether the received audio includes a predetermined trigger word; based on determining that the predetermined trigger word is included in the received audio, activating a speech recognition function of the electronic device; detecting a movement of a user moves the speech recognition function is activated; and based on detecting the movement of the user, transmitting a control signal, to a second electronic device to activate a speech recognition function of the second electronic device.

The detecting the movement of the user is based on the received audio obtained through the microphone after the speech recognition function is activated.

The electronic device stores information on a plurality of electronic devices that receive the audio, and the method may further include, based on the movement of the user, identifying one of the plurality of electronic devices that is closest to the user, and transmitting the control signal to the identified electronic device.

The method may further include obtaining first speech recognition information by performing speech recognition on the received audio; receiving second speech recognition information through the communicator from the second electronic device receiving the control signal; and obtaining a final recognition result based on the first speech recognition information and the second speech recognition information.

The method may further include obtaining time information on a time at which the control signal is transmitted to the second electronic device, and matching the first speech recognition information and the second speech recognition information based on the obtained time information to obtain the final recognition result.

The time information may include information on an absolute time at which the control signal is transmitted and information on a relative time at which the control signal is transmitted to the second electronic device based on a time at which the speech recognition function of the electronic device is activated.

The obtaining the final recognition result further includes applying a language model to the second speech recognition information when the second speech recognition information received from the second electronic device is information indicating that an acoustic model is applied and the language model is not applied, and applying the acoustic model and the language model to the second speech recognition information when the second speech recognition information received from the second electronic device is information indicating that the acoustic model and the language model are not applied.

According to another embodiment, there is provided an electronic device including a communicator; a memory configured to include at least one instruction; and a processor configured to execute the at least one instruction. The processor is configured to receive a first audio signal of a user speech through the communicator from a first external device; control the communicator to transmit a control signal, to a second external device, for receiving a second audio signal of the user speech from the second external device located in a movement direction of a user when a movement of the user is detected based on information included in the received first audio signal; receive the second audio signal through the communicator from the second external device; and match the received first audio signal and the received second audio signal to perform speech recognition on the user speech.

The processor is further configured to align the received first audio signal and the received second audio signal so that a time at which the first audio signal is received and a time at which the second audio signal is received correspond to each other, and match the received first audio signal and the received second audio signal by comparing the aligned first audio signal and the aligned second audio signal.

The processor is further configured to match the received first audio signal and the received second audio signal based on a time at which the second audio signal is received.

The processor is further configured to identify a first quality of the received first audio signal and a second quality of the received second audio signal based on at least one of power of the received first audio signal and a signal-to-noise ratio (SNR) of the received first audio signal, and match the received first audio signal and the received second audio signal based on the identified first quality of the first audio signal and the identified second quality of the second audio signal.

The processor is further configured to obtain first probability information on a speech recognition result of the received first audio signal and second probability information on a speech recognition result of the received second audio signal by inputting the received first audio signal and the received second audio signal to a learned artificial intelligence model, and match the received first audio signal and the received second audio signal based on the obtained first probability information and the obtained second probability information.

The processor is further configured to detect the movement of the user based on at least one of power of the received first audio signal and a signal-to-noise ratio of the received first audio signal.

According to another embodiment, there is provided a method for controlling an electronic device. The method may include receiving a first audio signal of a user speech through a communicator from a first external device; transmitting a control signal, to a second external device, for receiving a second audio signal of the user speech from a second external device located in a movement direction of a user when a movement of the user is detected based on information included in the received first audio signal; receiving the second audio signal through the communicator from the second external device; and matching the received first audio signal and the received second audio signal to perform speech recognition on the user speech.

The method may further include aligning the received first audio signal and the received second audio signal so that a time at which the first audio signal is received and a time at which the second audio signal is received correspond to each other, and in the performing of the speech recognition, the received first audio signal and the received second audio signal are matched by comparing the aligned first audio signal and the aligned second audio signal.

The performing of the speech recognition may further include the received first audio signal and the received second audio signal that are matched based on a time at which the second audio signal is received by the first external device.

The performing of the speech recognition may further include identifying a first quality of the received first audio signal and a second quality of the received second audio signal based on at least one of power of the received first audio signal and a signal-to-noise ratio (SNR) of the received first audio signal; and matching the received first audio signal and the received second audio signal based on the identified first quality of the first audio signal and the identified second quality of the second audio signal.

The performing of the speech recognition may further include obtaining first probability information on a speech recognition result of the received first audio signal and second probability information on a speech recognition result of the received second audio signal by inputting the received first audio signal and the received second audio signal to a learned artificial intelligence model; and matching the received first audio signal and the received second audio signal based on the obtained first probability information and the obtained second probability information.

The movement of the user is detected based on at least one of power of the received first audio signal and a signal-to-noise ratio of the received first audio signal.

BRIEF DESCRIPTION OF THE DRAWINGS

The above and other aspects of the disclosure will be more apparent from the following description with reference to the accompanying drawings, in which:

FIGS. 6 to 9 are flowcharts illustrating various embodiments performing speech recognition in the speech recognition system;

FIGS. 15 to 17 are diagrams illustrating various embodiments related to the use of an acoustic model and a language model in the speech recognition system;

FIG. 20 is a diagram illustrating a method for sensing, by an electronic device, a movement direction of a user using a camera, according to an embodiment;

DETAILED DESCRIPTION

Figure 1:
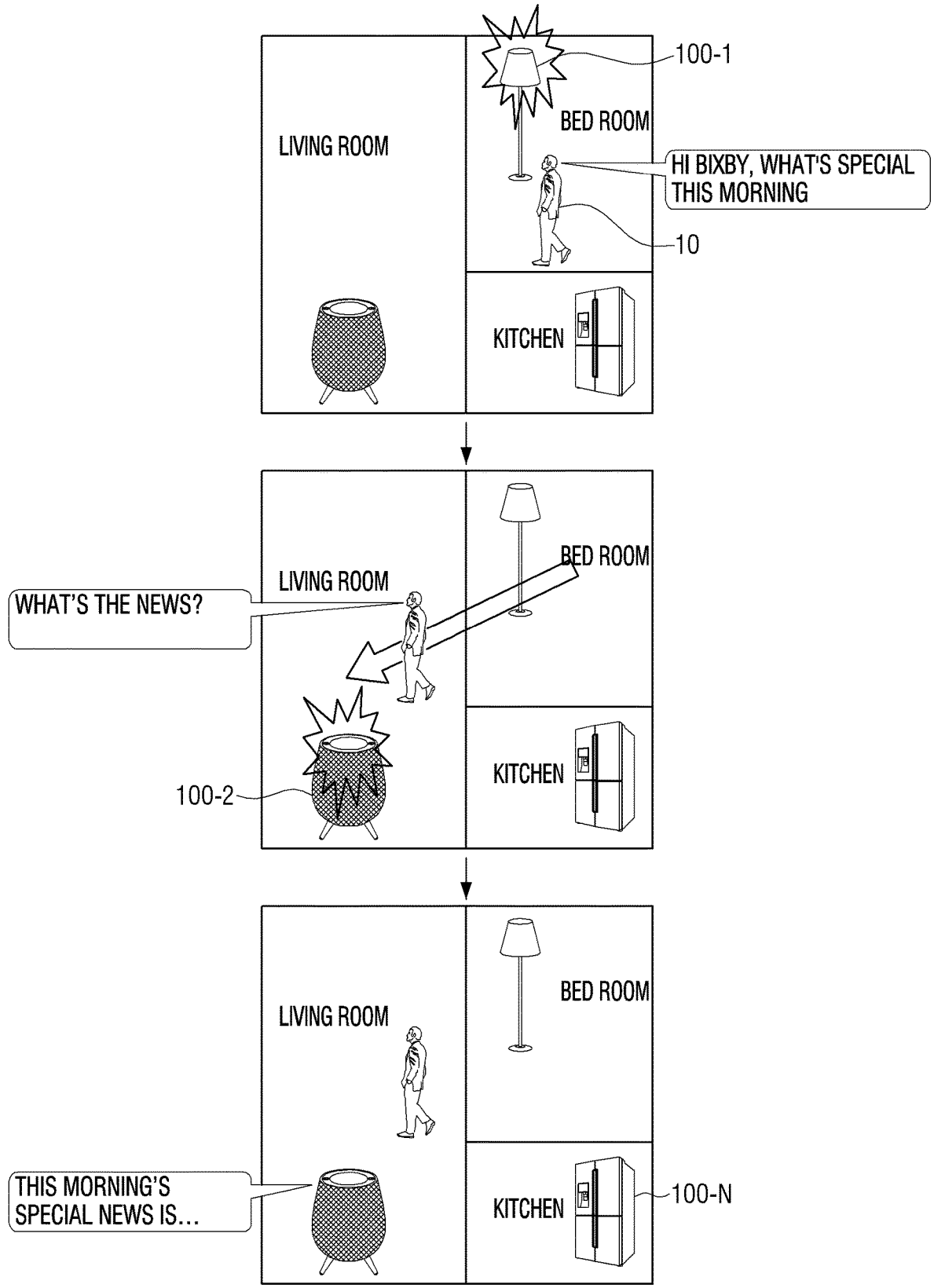
FIG. 1 is a diagram illustrating an embodiment performing speech recognition through a plurality of electronic devices.

Various embodiments of the disclosure will be described herein. However, it may be understood that embodiments of the disclosure are not limited to specific embodiments, but may include all modifications, equivalents, and/or alternatives thereof.

In the disclosure, expressions, such as "have", "may have", "include", "may include", or the like, may indicate an existence of a corresponding feature, for example, a numerical value, a function, an operation, a component such as a part, or the like, and do not exclude an existence of an additional feature.

In the disclosure, expressions, such as "A or B", "at least one of A and/or B", "one or more of A and/or B", or the like, may include all possible combinations of items listed together. For example, "A or B", "at least one of A and B", or "at least one of A or B" may indicate all of (1) a case in which at least one A is included, (2) a case in which at least one B is included, or (3) a case in which both of at least one A and at least one B are included.

Expressions "first", "second", or the like, used in the disclosure may indicate various components regardless of a sequence and/or importance of the components, and may be used only in order to distinguish one component from the other components, and do not limit the corresponding components. For example, a first user device and a second user device may indicate different user devices regardless of a sequence or importance thereof. For example, the first component described in the disclosure may be named the second component and the second component may also be similarly named the first component, without departing from the scope of the disclosure.

Terms, such as "module", "unit", "part", or the like, used in the disclosure may be a term for referring to the component performing at least one function or operation, and such a component may be implemented in hardware or software or may be implemented in a combination of hardware and software. In addition, a plurality of "modules", "units", "parts", or the like may be integrated into at least one module or chip and may be implemented in at least one processor, except for a case in which they need to be each implemented in individual specific hardware.

When it is mentioned that any component, for example, a first component is operatively or communicatively coupled with/to or is connected to another component, for example, a second component, it may be understood that any component is directly coupled with/to another component or may be coupled with/to another component through the other component, for example, a third component. On the other hand, when it is mentioned that any component, for example, a first component is "directly coupled with/to" or "directly connected to" to another component, for example, a second component, it may be understood that the other component, for example, a third component is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware. Instead, an expression "an apparatus configured to" may mean that the apparatus is "capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

Terms used in the disclosure may be used only to describe specific embodiments rather than restricting the scope of other embodiments. Singular forms may include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even though they are defined in the disclosure.

Hereinafter, the disclosure will be described in more detail with reference to the drawings. However, in describing the disclosure, when it is decided that a detailed description for the known functions or configurations related to the disclosure may unnecessarily obscure the gist of the disclosure, the detailed description thereof will be omitted. Throughout the accompanying drawings, similar components will be denoted by similar reference numerals.

FIG. 1 is a diagram illustrating an embodiment performing speech recognition through a plurality of electronic devices.

Referring to FIG. 1, several electronic devices 100-1, 100-2, and 100-N (all of which may be referred to as an electronic device 100) may be provided in a home. The electronic device 100 may include a microphone or be electrically connected to the microphone, and obtain speech of a user 10 through the microphone.

In the electronic device 100, a speech recognition function may be activated in a speech recognition standby state by a user speech including a trigger word, or a wake-up word. The speech recognition function may be activated by pressing a specific button provided in the electronic device 100 as well as by the trigger word spoken by the user.

Here, the speech recognition standby state is a mode in which the microphone is activated and a trigger word may be recognized. In the speech recognition standby state, recognition other than the trigger word may not be performed. Therefore, the speech recognition standby state is a state in which speech recognition is performed with fewer operations. The speech recognition standby state may also be referred to as a speech recognition standby mode.

According to an embodiment, when the trigger word is recognized during the speech recognition standby state, the speech recognition function of the electronic device 100 may be activated. When the speech recognition function is activated, speech recognition may be performed on a speech input through the microphone.

A series of processes may be performed to recognize the speech. For example, a process of recording a speech to obtain an audio signal, a process of obtaining feature information from the audio signal, a process of obtaining pronunciation information, phoneme, or character string information based on the obtained feature information and an acoustic model, and a process of obtaining text data based on a language model with respect to the obtained pronunciation information, phoneme, or character string information may be included. Specifically, the electronic device may obtain the feature information from input speech data by applying a feature extraction technique to the audio signal. In an embodiment, the electronic device may extract the feature of the input audio signal by using any one of the feature extraction techniques, including Cepstrum, Linear Predictive Coefficient (LPC), Mel Frequency Cepstral Coefficient (MFCC), and Filter Bank Energy, to the audio signal. The foregoing feature obtaining technique is merely an example, and the feature obtaining technique used in the disclosure is not limited to the foregoing example.

According to an embodiment, the electronic device 100 may perform all of a series of processes for speech recognition. According to another embodiment, the electronic device 100 may obtain an intermediate result by performing only some of a series of processes for speech recognition, and transmit the intermediate result to an external device so that the remaining processes may be performed by the external device. For example, the electronic device 100 may transmit the audio signal, obtained by performing only the speech recording, to the external device so that the remaining speech recognition process may be performed by the external device. Specifically, the electronic device 100 may perform only the process of obtaining pronunciation information, phoneme information, or character string information based on the acoustic model, and transmit the pronunciation information, the phoneme information, or the character string information to the external so that the process of obtaining the text data based on the language model may be performed by the external device.

Here, the electronic device 100 may perform speech recognition some of a series of processes for speech recognition to obtain the intermediate result and transmit the intermediate result to the external device. The electronic device 100 may also perform all of a series of processes for speech recognition. In addition, the speech recognition information obtained as a result of the speech recognition performed by the electronic device 100 may mean a final result (e.g., text data) obtained by performing all of a series of processes for speech recognition, or the intermediate results (e.g., audio signal, feature information, pronunciation information, phoneme information, character string information, etc.) obtained by performing only some of a series of processes for speech recognition.

On the other hand, the trigger word may be a predetermined word or sentence. For example, 'Hi Bixby', and the like may be used. For example, when a user utters "Hi Bixby, how is the weather today?", the electronic device 100 may activate the speech recognition function by recognizing the "Hi Bixby" in the speech recognition standby state and perform speech recognition for "How is the weather today?"

According to an embodiment, the electronic device 100 may handover a speech recognition job to the other electronic device in a situation in which the speech recognition may be better performed in the other electronic device. The handover of the speech recognition job means that an electronic device different from the electronic device that has been previously performing the speech recognition is controlled to continuously perform the speech recognition. For example, the handover of the speech recognition job may include transmitting a control signal that activates the speech recognition function to the other electronic device. In addition, the handover of the speech recognition job may include transmitting, by the electronic device, its own identification information (e.g., device ID) and user information corresponding to the input speech, to the other electronic device. The other electronic device may identify a speech of a user based on the transmitted user information and may continuously perform speech recognition. Alternatively, the user information may be pre-registered in the other electronic device, so that the pre-registered user information and the received user information, from the electronic device, may be compared with each other. As another alternative, in case of a user is not pre-registered, the received user information and user information obtained from a currently input speech may be compared with each other.

Referring to FIG. 1, when the first electronic device 100-1 in a bedroom receives a speech including a trigger word (e.g., "Hi Bixby") from the user in a speech recognition standby state, the first electronic device 100-1 may activate a speech recognition function. After the user speaks the trigger word, the user may then utter "What's the special news this morning?" while moving from the bedroom to a living room. The first electronic device 100-1 in the bedroom may sense a movement of the user. For example, as the user moves out of the bedroom to the living room and an audio signal strength corresponding to the speech input to the first electronic device 100-1 gradually decreases, the first electronic device 100-1 may sense the movement of the user.

As such, in a situation, the second electronic device 100-2 in the living room may better perform the speech recognition, the first electronic device 100-1 may handover the speech recognition job to the second electronic device 100-2 in the living room. Specifically, as the audio signal strength corresponding to the speech input to the first electronic device 100-1 decreases, the first electronic device 100-1 may sense that the user is moving and broadcast information for searching for the second electronic device which is in a movement direction of the user. In addition, the second electronic device may sense an audio corresponding to the speech of the user and transmit information on the corresponding signal to the first electronic device. In this case, the first electronic device 100-1 may transmit a control signal for activating the speech recognition function to the second electronic device 100-2. Accordingly, the second electronic device 100-2 may activate the speech recognition function in the speech recognition standby state and recognize the speech of the user. This is merely an example, and the movement of the user may be sensed by using information obtained by various sensors such as a camera in addition to the audio obtained by the microphone to identity the other electronic device which is in the movement direction. A method for identifying the other electronic device in the movement direction of the user by the electronic device 100 will be described in more detail with reference to FIGS. 18 to 20.

The speech recognition information obtained by the first electronic device 100-1 and the second electronic device 100-2, respectively, may be compared and matched to recognize an entire sentence. For example, when the user utters "What's the special news this morning?", and a corresponding response, or feedback, may be provided to the first electronic device 100-1 or the second electronic device 100-2. It may be preferable that the response is provided from the second electronic device 100-2 near the last position of the user. That is, the corresponding response, such as "This morning's special news is . . . ," may be provided through a speaker of the second electronic device 100-2.

When the speech recognition information is transmitted to the other electronic device, the electronic device 100 may transmit additional information to be used for matching of the voice recognition information. The additional information may include at least one of time information, information on recording characteristics, and information on a speech recognition progress situation.

Here, the time information may include a time at which a speech is input to the electronic device. The time information may be information on absolute time or relative time. The device performing the final matching may match the speech recognition information in chronological order based on the time information.

The information on the recording characteristics may be information on microphone characteristic of a device performing the recording and surrounding situation (ambient noise, etc.). The device performing the final matching may perform appropriate noise processing or apply an appropriate acoustic model or language model based on the information on the recording characteristics.

The information on the speech recognition progress situation may be information on a series of processes for speech recognition being performed. For example, the information on the speech recognition progress situation may include information on the audio signal that is transmitted, feature information (feature vector) that is extracted from the audio signal, the feature information that is transmitted by applying the acoustic model or the language model based on the feature information, the text data obtained by applying the acoustic model or the language model that is transmitted, or the like.

As described above, the electronic device that originally started the speech recognition may handover the speech recognition job by actively selecting the other electronic device to assist itself, and speeches obtained from each of the electronic devices may be matched to perform the entire recognition. That is, the speech recognition may be performed seamlessly through several electronic devices.

The electronic device 100 may be implemented as, for example, a smartphone, a tablet personal computer (PC), a mobile phone, an image phone, an artificial intelligence speaker, a speaker (a speaker including at least one microphone not equipped with an artificial intelligence function), an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, or a wearable device. The wearable device may include at least one of an accessory type wearable device (e.g., a watch, a ring, a bracelet, an anklet, a necklace, a glasses, a contact lens, or a head-mounted-device (HMD)), a textile or clothing integral type wearable device (e.g., an electronic clothing), a body attachment type wearable device (e.g., a skin pad or a tattoo), or a living body implantation type wearable device (e.g., an implantable circuit).

In some embodiments, the electronic device 100 may be a home appliance. The home appliance may include at least one of, for example, a television, a digital video disk (DVD) player, an audio, a refrigerator, an air conditioner, a cleaner, an oven, a microwave oven, a washing machine, an air cleaner, a robotic vacuum cleaner, a set-top box, a home automation control panel, a door lock, a security control panel, a TV box (e.g., HomeSync™ of Samsung Electronics Co., Ltd, TV™ of Apple Inc, or TV™ of Google), a game console (e.g., Xbox™, PlayStation™), an electronic dictionary, an electronic key, a camcorder, or a digital photo frame. The electronic device 100 may be implemented as an Internet of things.

The electronic device 100 may be a combination of one or more of various devices described above. In addition, the electronic device 100 is not limited to the devices described above, but may include new electronic devices in accordance with the development of technologies.

At least some of the several electronic devices 100 may be the same type, or the respective electronic devices 100 may be a different type from each other.

As described above, the function of handing over the speech recognition job and the function of matching the speeches obtained from the several electronic devices 100, may be implemented in a speech recognition system according to various embodiments. The speech recognition system may include the electronic devices 100, and may further include a hub device, a server, and the like, which may be connected to the electronic devices 100.

Hereinafter, a speech recognition system according to various embodiments will be described with reference to FIGS. 2 to 5A.

Figure 2:
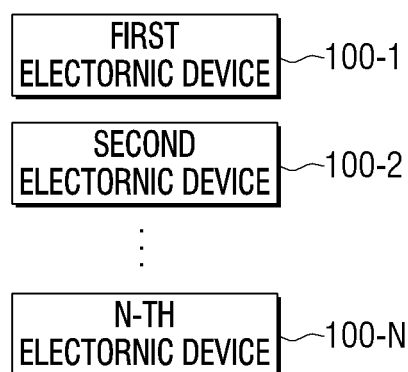
FIGS. 2 to 5B are block diagrams illustrating a speech recognition system according to various embodiments.

Referring to FIG. 2, a speech recognition system 1000 may include electronic devices 100-1 to 100-N (all of which may be referred to as an electronic device 100).

The electronic devices 100 may communicate with an external device in a wireless or wired communication manner. For example, the electronic devices 100 may be connected to a wireless access point, such as a wireless router to communicate with the external device through the wireless access point. Alternatively, the electronic devices 100 may communicate with the external device through a short range wireless communication manner, such as Wi-Fi Direct, Bluetooth, ZigBee, Z-Wave, or the like.

When a specific event activates a first electronic device 100-1 for the first time and the speech recognition needs to be continuously performed on the other electronic device while the speech recognition function is activated, the first electronic device 100-1 may transmit relevant information to a second electronic device 100-2 to continuously perform the speech recognition. For example, a specific event may include an event in which the user moves, an event in which noise around the electronic device 100-1 occurs more than a predetermined degree, an event in which power of the electronic device 100-1 is expected to be turned off soon, and the like. Based on the specific event, the first electronic device 100-1 may determine the other electronic device to take over the speech recognition job. For example, the electronic device 100-2 that takes over the speech recognition job may be determined as a pre-registered electronic device (e.g., a mobile device that the user always carries) or an electronic device in a direction in which the user is moving. The determining of the other electronic device that takes over the speech recognition job will be described in more detail hereinafter.

When the second electronic device 100-2 is determined as the device that takes over the speech recognition job, the first electronic device 100-1 may hand over the speech recognition job to the second electronic device 100-2. In this case, the first electronic device 100-1 may transmit a control signal for activating the speech recognition function to the second electronic device 100-2.

The second electronic device 100-2 receiving the control signal from the first electronic device 100-1 may activate the speech recognition function. In addition, when the user moves to the other electronic device again, other than the first electronic device 100-1 and the second electronic device 100-2, the second electronic device 100-2 may hand over the speech recognition job to the other electronic device in the same manner as the first electronic device 100-1.

Alternatively, when an end of the utterance of the user is sensed by the second electronic device 100-2, the second electronic device 100-2 may perform voice recognition on the user's utterance obtained from the time when the speech recognition function is activated to the end of the utterance of the user, and transmit speech recognition information to the first electronic device 100-1 as a result of performing the speech recognition.

The first electronic device 100-1 may perform the matching on the speech recognition information that is the result of performing the speech recognition on the user's speech obtained by the first electronic device 100-1 and the speech recognition information received from the second electronic device 100-2 in chronological order, and generate a corresponding response based on a speech recognition result finally obtained by the matching process. For example, when an entire utterance of the user obtained through the first electronic device 100-1 and the second electronic device 100-2 is "What is the weather today?", the first electronic device 100-1 may transmit a control signal, to the second electronic device 100-2, that causes the second electronic device 100-2 to output a speech response, such as "Today, you may expect some rain in the afternoon."

Alternatively, although it is described in the example above that the first electronic device 100-1 that has activated the speech recognition function for the first time performs the matching, the final matching may be performed in any one of the electronic devices 100-1 to 100-N. According to an embodiment, an electronic device among the electronic devices 100-1 to 100-N that is to perform the matching may be predetermined before the user utterance starts. For example, when one of the electronic devices 100-1 to 100-N senses the end of the user utterance, that electronic device may be predetermined to perform the matching. As such, the electronic device that senses the end of the user utterance may request speech recognition information, user information, additional information for matching, and the like, to the preceding electronic devices. Alternatively, the first electronic device 100-1 may transmit the speech voice recognition information, the user information, the additional information for matching, and the like together, from when the first electronic device 100-1 hands over the speech recognition job to the second electronic device 100-2. In addition, when the first electronic device 100-1 performs the matching and then performs the speech recognition job, but a score for the speech recognition is low, the second electronic device 100-2 may perform the speech recognition job again. Here, the determination of the score will be further described with reference to FIG. 22. In this case, all of the series of processes for speech recognition may also be performed again by the second electronic device 100-2. Alternatively, only some of the series of processes for speech recognition may also be performed again. Specifically, some of the series of processes for speech recognition may be performed again by applying the language model to the speech recognition information applied to the acoustic model.

Figure 3:
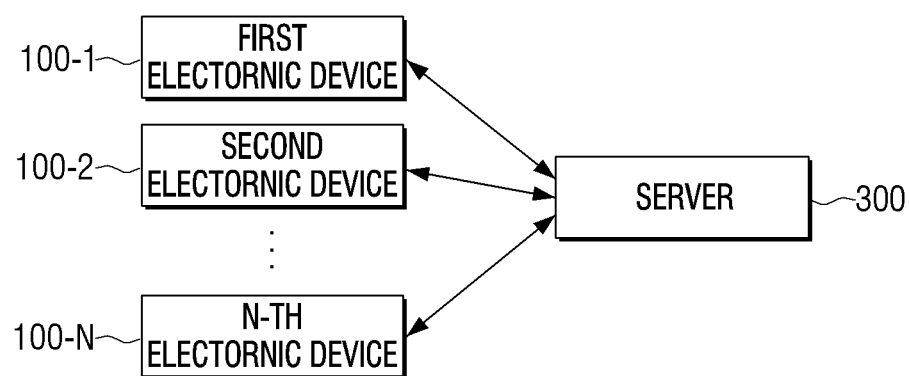

FIG. 3 is a diagram illustrating a speech recognition system according to another embodiment.

A speech recognition system 2000 may include the electronic devices 100-1 to 100-N (all of which may be referred to as an electronic device 100) and a server 300.

The electronic devices 100 may communicate with the server 300 through at least one network. The at least one network may include any one or combination of many different types of networks, such as a cellular network, a wireless network, a local area network (LAN), a wide area network (WAN), a personal area network (PAN), the Internet, and the like. The electronic apparatus 100 may be connected to an access point such as a wireless router.

The electronic devices 100 may communicate with each other through the server 300 or by using a device-to-device (D2D) or peer-to-peer (P2P) connection.

The server 300 may manage and control the electronic devices 100. The server 300 may be implemented as a cloud server. The server may include a single server or may be implemented as a plurality of cloud servers.

The server 300 may perform at least one of the functions of handing over the speech recognition job, for example, the function of matching the speech recognition information, or the function of performing the task as described in FIG. 2. Here, the task refers to any generation of output responding to the user's input. That is, when the speech recognition is performed by the electronic devices 100, the task may be performed to generate an output that corresponds to the user's speech.

According to an embodiment, the speech recognition function may be activated on the first electronic device 100-1 for the first time, and the first electronic device 100-1 may perform speech recognition on the user speech obtained while the voice recognition function is activated, and transmit speech recognition information to the server 300. Thereafter, when a specific event related to a situation in which the speech recognition needs to be continuously performed on the other device while the speech recognition function is activated on the first electronic device 100-1, the first electronic device 100-1 may determine an electronic device to take over the speech recognition execution.

When the second electronic device 100-2 is determined as the device that takes over the speech recognition execution, the first electronic device 100-1 may hand over the speech recognition job to the second electronic device 100-2. In this case, the first electronic device 100-1 may transmit a control signal for activating the speech recognition function to the second electronic device 100-2.

The second electronic device 100-2 receiving the control signal from the first electronic device 100-1 may activate the speech recognition function. The second electronic device 100-2 may transmit recognition information regarding the user speech obtained by the second electronic device 100-2 to the server 300. In addition, when the user moves to the other electronic device again, the second electronic device 100-2 may hand over the speech recognition job to the other electronic device in the same manner.

When the speech recognition information is received from an n-th electronic device 100-N in which the user speech is last input, the server 300 may perform the matching on speech recognition information received from the electronic devices 100-1 to 100-N in chronological order, and generate a response based on a speech recognition result finally obtained by matching. For example, when an entire speech of the user obtained through the electronic devices 100-1 to 100-N is "What is the weather today?", the server 300 may perform a task of transmitting a control signal that causes the n-th electronic device 100-N to output a speech response that "Today, you may expect some rain in the afternoon" to the n-th electronic device 100-N.

Figure 4:
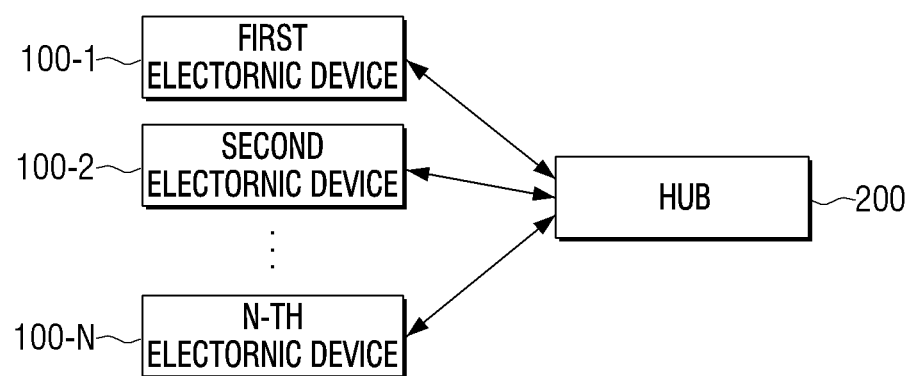

FIG. 4 is a diagram illustrating a speech recognition system 3000 according to still another embodiment.

A speech recognition system 3000 may include the electronic devices 100-1 to 100-N (all of which may be referred to as an electronic device 100) and a hub device 200. The hub device 200 may be configured as one hub device, or may be configured as a plurality of hub devices and connected to each of the electronic device. For example, when there are five electronic devices and two hub devices, three electronic devices may be connected to a first hub device and two electronic devices may be connected to a second hub device. In addition, five electronic devices may be connected to the first hub device and two electronic devices may be connected to the second hub device. Such a connection may be configured in various connection methods according to a method set by a user.

The electronic devices 100 and the hub device 200 may communicate with an external device in a wireless or wired communication manner. For example, the electronic devices 100 and the hub device 200 may be connected to a wireless access point such as a wireless router to communicate with the external device through the wireless access point. Alternatively, the electronic devices 100 and the hub device 200 may communicate with the external device through a short range wireless communication manner such as Wi-Fi Direct, Bluetooth, ZigBee, Z-Wave, or the like.

The communication in the speech recognition system 3000 may be centralized on the hub device 200. For example, the electronic devices 100 may communicate with the external device through the hub device 200. Alternatively, it is also possible for the electronic devices 100-1 to 100-N to communicate with the external device without passing through the hub device 200.

The hub device 200 may manage and control the electronic devices 100. The hub device 200 may be a home gateway. The hub device 200 may be implemented as various types of devices.

The hub device 200 may be implemented as, for example, a smartphone, a tablet personal computer (PC), a mobile phone, an image phone, an artificial intelligence speaker, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, or a wearable device. The wearable device may include at least one of an accessory type wearable device (e.g., a watch, a ring, a bracelet, an anklet, a necklace, a glasses, a contact lens, or a head-mounted-device (HMD)), a textile or clothing integral type wearable device (e.g., an electronic clothing), a body attachment type wearable device (e.g., a skin pad or a tattoo), and a living body implantation type wearable device (e.g., an implantable circuit).

In some embodiments, the hub device 200 may be a home appliance. The home appliance may include at least one of, for example, a television, a digital video disk (DVD) player, an audio, a refrigerator, an air conditioner, a cleaner, an oven, a microwave oven, a washing machine, an air cleaner, a robotic vacuum cleaner, a set-top box, a home automation control panel, a door lock, a security control panel, a TV box (e.g., HomeSync™ of Samsung Electronics Co., Ltd, TV™ of Apple Inc, or TV™ of Google), a game console (e.g., Xbox™, PlayStation™), an electronic dictionary, an electronic key, a camcorder, or a digital photo frame. The hub device 200 may be implemented as an Internet of things and an edge computing device.

The hub device 200 may perform at least one of the function of handing over the speech recognition job, the function of matching the speech recognition information, or the function of performing the task that are described in FIG. 2.

According to an embodiment, the speech recognition function may be activated on the first electronic device 100-1 of the electronic devices 100 for the first time, and the first electronic device 100-1 may perform speech recognition on the user speech obtained while the voice recognition function is activated, and transmit speech recognition information to the hub device 200. Thereafter, when a specific event requires the speech recognition to be continuously performed on the other electronic device while the speech recognition function is activated on the first electronic device 100-1, the hub device 200 may determine an electronic device that takes over the speech recognition execution.

For example, the hub device 200 may sense the movement of the user based on a signal-to-noise ratio (SNR) and/or amplitude of speech signals received from the electronic devices 100. For example, when the user speaks while moving from the first electronic device 100-1 to the second electronic device 100-2, the SNR and/or amplitude of the speech signal received from the first electronic device 100-1 will gradually decrease, and the SNR and/or amplitude of the speech signal received from the second electronic device 100-2 will gradually increase. The hub device 200 may sense that the user moves from the first electronic device 100-1 to the second electronic device 100-2 based on at least one of the SNR and the signal amplitude, and accordingly, the hub device 200 may determine the second electronic device 100-2 as the electronic device that takes over the speech recognition execution. Here, the SNR is merely an example for indicating quality of the speech signal, and parameters for evaluating the quality of other speech signals such as sound pressure level (SPL) may also be used.

When the second electronic device 100-2 is determined as the device that takes over the speech recognition execution, the hub device 200 may hand over the speech recognition job to the second electronic device 100-2. As such, the hub device 200 may transmit a control signal for activating the speech recognition function to the second electronic device 100-2.

The second electronic device 100-2 receiving the control signal from the hub device 200 may activate the speech recognition function. The second electronic device 100-2 may transmit recognition information regarding the user speech obtained by the second electronic device 100-2 to the hub device 200. In addition, when the user moves to the other electronic device again, the hub device 200 may hand over the speech recognition job to the other electronic device in the same manner.

When the speech recognition information is received from an n-th electronic device 100-N in which the user speech is last input, the hub device 200 may perform the matching on speech recognition information received from the electronic devices 100-1 to 100-N in chronological order, and perform a task based on a speech recognition result finally obtained by matching. For example, when an entire speech of the user obtained through the electronic devices 100-1 to 100-N is "What is the weather today?", the hub device 200 may perform a task of transmitting a control signal that causes the n-th electronic device 100-N to output a speech response that "Today, you may expect some rain in the afternoon" to the n-th electronic device 100-N.

As an example of a task, when the user gives a speech command to control the device, for example, "turn on the air conditioner", a control command for turning on the air conditioner may be generated and transmitted to the air conditioner in order to perform the task, and the air conditioner may provide a speech response, "the air conditioner is on". As another example, when the speech command of the user is "turn on the air conditioner", a control command for turn on the air conditioner may be generated and transmitted to the air conditioner in order to perform the task, and the other electronic device (e.g., an electronic device that is closer to the user, an electronic device to which the speech is last input, or another electronic device) other than the air conditioner may provide a speech response, "the air conditioner is on".

Figure 5A:
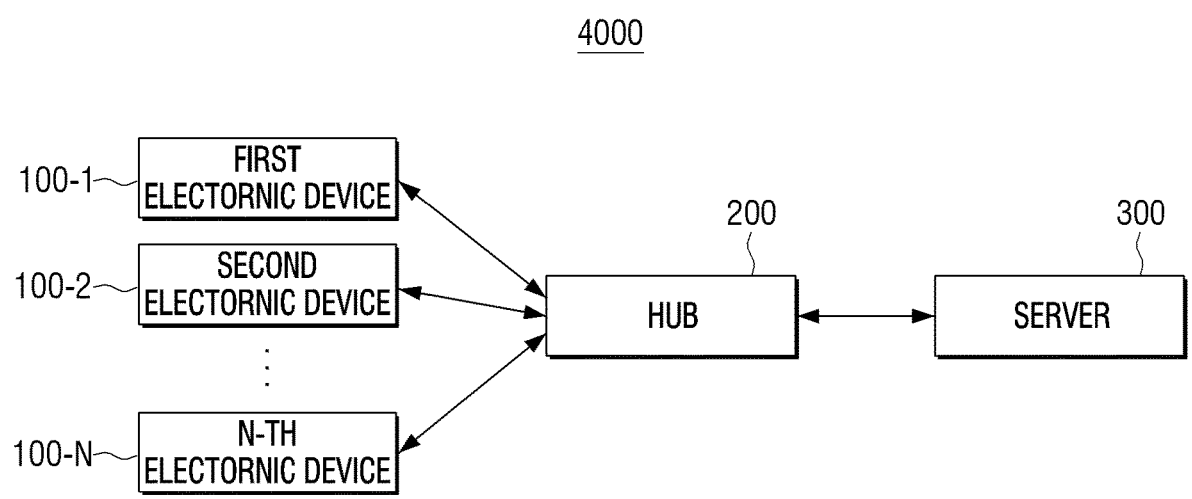

FIG. 5A is a diagram illustrating a speech recognition system 4000 according to still another embodiment.

A speech recognition system 4000 may include the electronic devices 100-1 to 100-N (all of which may be referred to as an electronic device 100), the hub device, and the server 300.

The electronic devices 100, the hub device 200, and the server 300 may communicate with an external device in a wireless or wired communication manner. For example, the electronic devices 100 may communicate with the server 300 through the hub device 200.

Compared to the speech recognition system 3000 in FIG. 4, the server 300 may play a part of the role of the hub device 200 in the speech recognition system 4000 of FIG. 5A. For example, the server 300 may perform at least one of the function of matching the speech recognition information or the function of performing the task that is performed by the hub device 200 of the speech recognition system 3000 in FIG. 4.

Figure 5B:
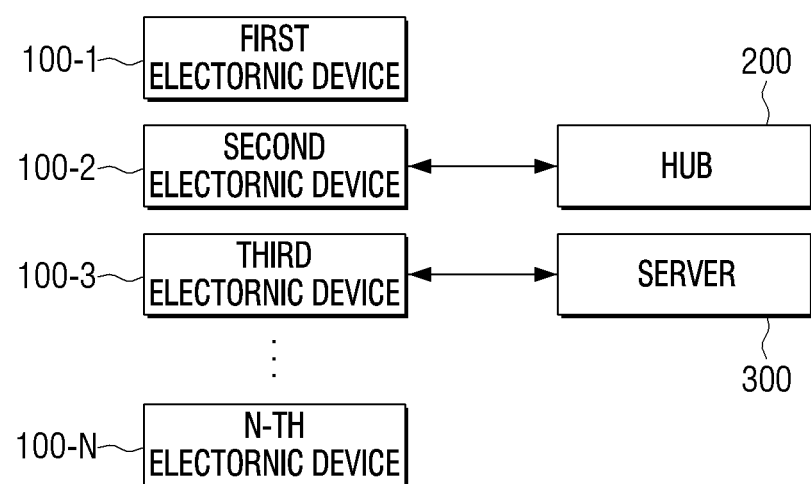

FIG. 5B is a diagram illustrating a speech recognition system 5000 according to still another embodiment.

The speech recognition system 5000 in FIG. 5B shows a hybrid form in which the speech recognition system 1000 of FIG. 2, the speech recognition system 2000 of FIG. 3, and the speech recognition system 3000 of FIG. 4 are combined.

For example, referring to FIG. 5B, the electronic device 100-1 of the electronic devices in the speech recognition system 5000 may perform most of the series of processes for speech recognition, the other electronic device 100-2 may perform only some of the series of processes for speech recognition and transmit the result to the hub device 200 to cause the hub device 200 to perform the remaining part, and another electronic device 100-3 may perform only some of the series of processes for speech recognition and transmit the result to the server 300 to cause the server 300 to perform the remaining part.

At least one of the electronic device 100, the hub device 200, or the server 300 of the speech recognition system 5000 may perform at least one of the function of handing over the speech recognition job, the function of matching the speech recognition information, and the function of performing the task.

Hereinafter, a speech recognition method in the speech recognition systems according to various embodiments described above will be described with reference to FIGS. 6 to 9.

Figure 6:
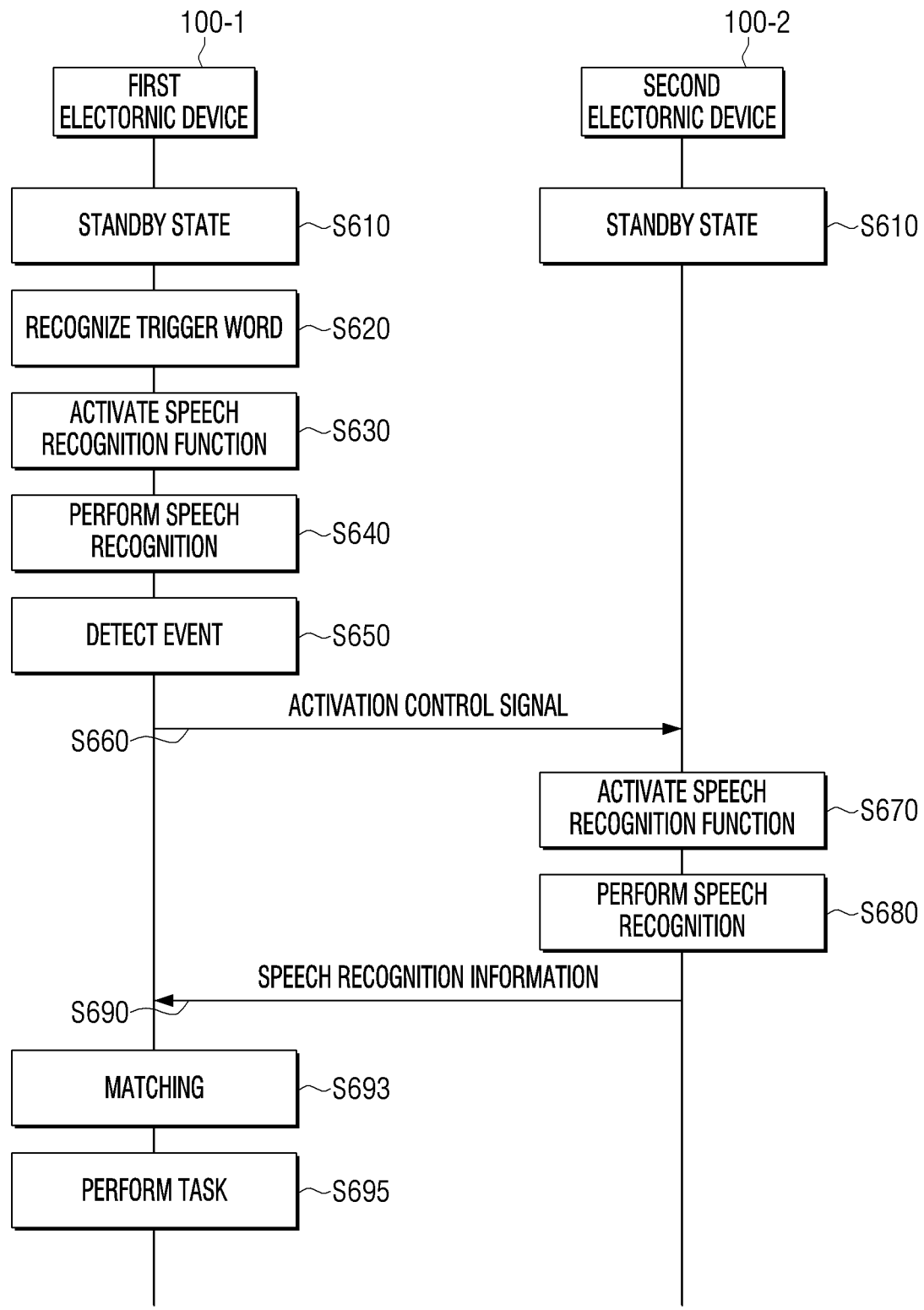

FIG. 6 is a flowchart illustrating a speech recognition method in the speech recognition system 1000 according to an embodiment.

Referring to FIG. 6, the speech recognition system 1000 may include a first electronic device 100-1 and a second electronic device 100-2.

Initially, the first electronic device 100-1 and the second electronic device 100-2 may be in a speech recognition standby state (S610). Thereafter, when the user utters a speech including a trigger word near the first electronic device 100-1, the first electronic device 100-1 may recognize the trigger word included in the user speech (S620). When the first electronic device 100-1 recognizes the trigger word included in the user speech, the first electronic device 100-1 may activate a speech recognition function (S630). Upon activating the speech recognition function, the first electronic device 100-1 may perform speech recognition on the user speech input in a state in which the speech recognition function is activated (S640).

Alternatively, the speech recognition function may be activated by a user's manual operation. For example, when a specific button provided in the first electronic device 100-1 is selected, the speech recognition function may be activated.

Further, the first electronic device 100-1 may sense a specific event in which the other electronic device needs to continuously perform the speech recognition in the state in which the speech recognition function is activated (S650). For example, the first electronic device 100-1 may include a plurality of microphones and may detect an event in which the user moves from one location to the other. Here, the plurality of microphones may detect a difference in the volume of the user speech input through the plurality of microphones. According to another embodiment, the first electronic device 100-1 may include a camera and may detect an event through an image obtained by the camera.

Thereafter, when the specific event in which the other device needs to continuously perform the speech recognition is detected, the first electronic device 100-1 may transmit a control signal for activating the speech recognition function to hand over the speech recognition job to the second electronic device 100-2, which is in the movement direction of the user (S660). In this case, the first electronic device 100-1 may also transmit additional information and user information to the second electronic device 100-2 to perform matching.

The user information may include, for example, various user information such as user identification information (ID), user name, user account information, feature information obtained from a speech for speaker recognition, and the like. The user information may be used to distinguish and match speech information of the user. For example, the second electronic device 100-2 may compare the user information received from the first electronic device 100-1 with the user information obtained from a currently input speech to the second electronic device 100-2 to determine whether the user is the same user and match the speech information of the same user. The second electronic device 100-2 receiving the control signal may activate the speech recognition function (S670). In addition, the second electronic device 100-2 may perform speech recognition on the user speech input in a state in which the speech recognition function is activated (S680).

In this case, the second electronic device 100-2 may perform all of the series of processes for speech recognition, or may perform only some of the series of processes for speech recognition. For example, the second electronic device 100-2 may perform only a process of performing a speech recording to obtain an audio signal. As another example, the second electronic device 100-2 may perform up to a process of obtaining pronunciation information, phoneme information, or character string information based on the acoustic model.

When the first electronic device 100-1 is determined as a device to perform the final matching, the second electronic device 100-2 transmits the speech recognition information obtained according to the speech recognition execution to the first electronic device 100-1 (S690). In this case, when all of the series of processes for speech recognition are performed in S680, the speech recognition information may include a final result (e.g., text data corresponding to the user speech). When only some of the series of processes for speech recognition are performed in S680, the speech recognition information may include an intermediate result (e.g., an audio signal, feature information obtained from the audio signal, pronunciation information, phoneme information, string information, or the like). In addition, the second electronic device 100-2 may also transmit additional information and user information to be used for matching to the first electronic device 100-1.

The first electronic device 100-1 may match the speech recognition information obtained through the speech recognition performed in S640 and the speech recognition information received from the second electronic device 100-2 in chronological order (S693). In this case, when the speech recognition information received from the second electronic device 100-2 is the intermediate result, the first electronic device 100-1 may perform the remaining processes for speech recognition to obtain a final result, and may perform the matching based on the final result.

In addition, the first electronic device 100-1 may perform a task based on a final recognition result for an entire user speech obtained as the matching result (S695).

On the other hand, in FIG. 6, although the matching is described as being performed by the first electronic device 100-1, it is possible to perform the matching by the second electronic device 100-2. For example, instead of the second electronic device 100-2 transmitting the speech recognition information to the first electronic device 100-1 in step S690, the second electronic device 100-2 may transmit a signal for requesting transmission of the speech recognition information to the first electronic device 100-1. Accordingly, the first electronic device 100-1 may transmit the speech recognition information obtained through the speech recognition performed in S640 to the second electronic device 100-2. Alternatively, it is also possible for the first electronic device 100-1 to transmit the speech recognition information to the second electronic device 100-2 in S660. The second electronic device 100-2 may match the speech recognition information received from the first electronic device 100-1 and the speech recognition information obtained through the speech recognition performed in S680 in chronological order. In addition, the second electronic device 100-2 may perform a task.

Although it is described that the same electronic device performs the matching and the task, the electronic device performing the matching may provide information on the final recognition result for the entire user speech obtained as the matching result to the other electronic device, and the other electronic device may also perform the task based on the information on the final recognition result.

Figure 7:
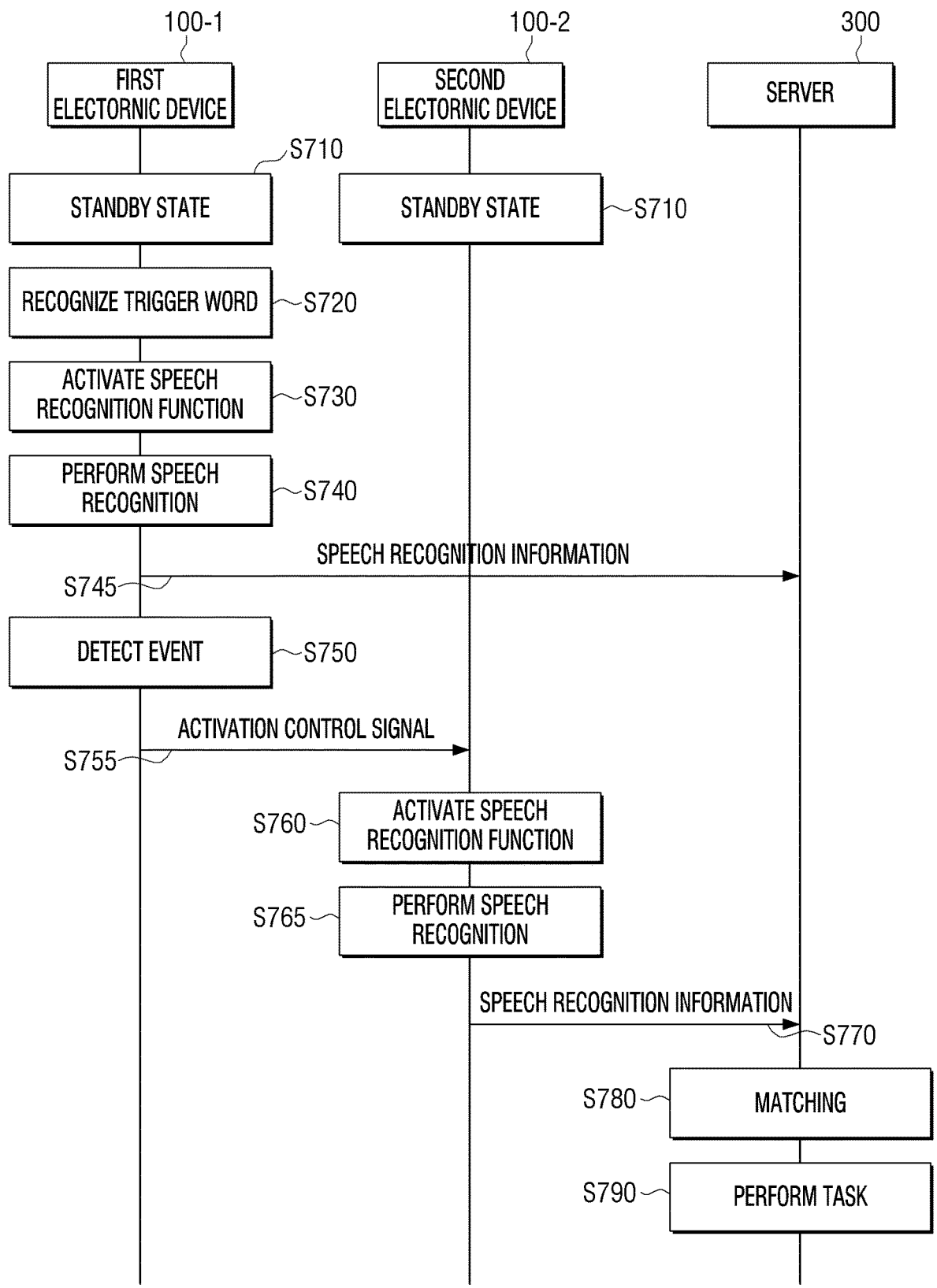

FIG. 7 is a flowchart illustrating a speech recognition method in the speech recognition system according to another embodiment.

Referring to FIG. 7, the speech recognition system 2000 may include a first electronic device 100-1, a second electronic device 100-2, and a server 300.

First, the first electronic device 100-1 and the second electronic device 100-2 may be in a speech recognition standby state (S710). Thereafter, when the user utters a speech including a trigger word near the first electronic device 100-1, the first electronic device 100-1 may recognize the trigger word included in the user speech (S720).

When the first electronic device 100-1 recognizes the trigger word included in the user speech, the first electronic device 100-1 may activate a speech recognition function (S730).

Alternatively, the speech recognition function may be activated by a user's manual operation. For example, when a specific button provided in the first electronic device 100-1 is selected, the speech recognition function may be activated.

In addition, the first electronic device 100-1 may perform speech recognition on the user speech input in a state in which the speech recognition function is activated (S740). In this case, the first electronic device 100-1 may perform all of the series of processes for speech recognition, or may perform only some of the series of processes for speech recognition. For example, the first electronic device 100-1 may perform only a process of performing a speech recording to obtain an audio signal. As another example, the first electronic device 100-1 may perform up to a process of obtaining pronunciation information, phoneme information, or character string information based on the acoustic model.

The first electronic device 100-1 may transmit speech recognition information obtained by performing the speech recognition to the server 300 (S745). Here, when all of the series of processes for speech recognition are performed in S740, the speech recognition information may include a final result (e.g., text data corresponding to an audio signal). When only some of the series of processes for speech recognition are performed in S740, the speech recognition information may include an intermediate result. For example, the intermediate result may be an audio signal obtained by performing only the speech recording. Alternatively, the intermediate result may be feature information obtained from the audio signal. Alternatively, the intermediate result may be pronunciation information, phoneme information, or character string information obtained based on the acoustic model. In this case, the first electronic device 100-1 may also transmit additional information and user information to be used for matching.

As such, the electronic device 100 and the server 300 may divide and perform the processes for speech recognition, thereby reducing an operational burden on the electronic device 100.

In addition, the first electronic device 100-1 may sense a specific event in which the other electronic device needs to continuously perform the speech recognition in the state in which the speech recognition function is activated (S750). For example, when an event in which the user movement is detected, the first electronic device 100-1 may transmit a control signal for activating the speech recognition function to hand over the speech recognition job to the second electronic device 100-2 which is in the movement direction of the user (S755).

According to still another embodiment, instead of the first electronic device 100-1, the server 300 may perform an operation of handing over the speech recognition job. For example, the server 300 may receive signals related to the movement of the user from a first electronic device 100-1 capable of detecting the movement of the user, sense the event in which the user moves based on detected signals, and transmit the control signal for activating the speech recognition function to hand over the speech recognition job to the second electronic device 100-2.

The second electronic device 100-2 receiving the control signal may activate the speech recognition function (S760). In addition, the second electronic device 100-2 may perform speech recognition on the user speech input in a state in which the speech recognition function is activated (S765). In this case, the second electronic device 100-2 may perform all of the series of processes for speech recognition, or may perform only some of the series of processes for speech recognition.

In addition, the second electronic device 100-2 may transmit speech recognition information obtained by performing the speech recognition to the server 300 (S770). In this case, when all of the series of processes for speech recognition are performed in S765, the speech recognition information may include a final result (e.g., text data corresponding to an audio signal). When only some of the series of processes for speech recognition are performed in S765, the speech recognition information may include an intermediate result (e.g., an audio signal, feature information obtained from the audio signal, pronunciation information, phoneme information, character string information, or the like). In this case, the second electronic device 100-2 may also transmit additional information and user information to be used for matching.

The server 300 may match the speech recognition information received from the first electronic device 100-1 and the speech recognition information received from the second electronic device 100-2 in chronological order (S780). For example, when at least one of the speech recognition information received from the first electronic device 100-1 or the speech recognition information received from the second electronic device 100-2 is the intermediate result, the server 300 may perform the remaining processes for speech recognition to obtain a final result, and may perform the matching based on the final result.

In addition, the server 300 may perform a task based on a final recognition result for an entire user speech obtained as the matching result (S790).

For example, when the entire speech of the user obtained through the first electronic device 100-1 and the second electronic device 100-2 is "What is the weather today?", the server 300 may perform a task of transmitting a control signal that causes the second electronic device 100-2 to output a speech response that "Today, you may expect some rain in the afternoon," to the second electronic device 100-2.

On the other hand, in FIG. 7, although the matching is described as being performed by the server 300, it is possible to perform the matching by the first electronic device 100-1 or the second electronic device 100-2. For example, the server 300 may perform recognition on the user speeches obtained from the first electronic device 100-1 and the second electronic device 100-2, respectively, to obtain the speech recognition information, and transmit the obtained speech recognition information to the first electronic device 100-1 or the second electronic device 100-2, and the first electronic device 100-1 or the second electronic device 100-2 may perform the matching for the speech recognition information. In addition, the first electronic device 100-1 or the second electronic device 100-2 may perform the task.

Figure 8A:
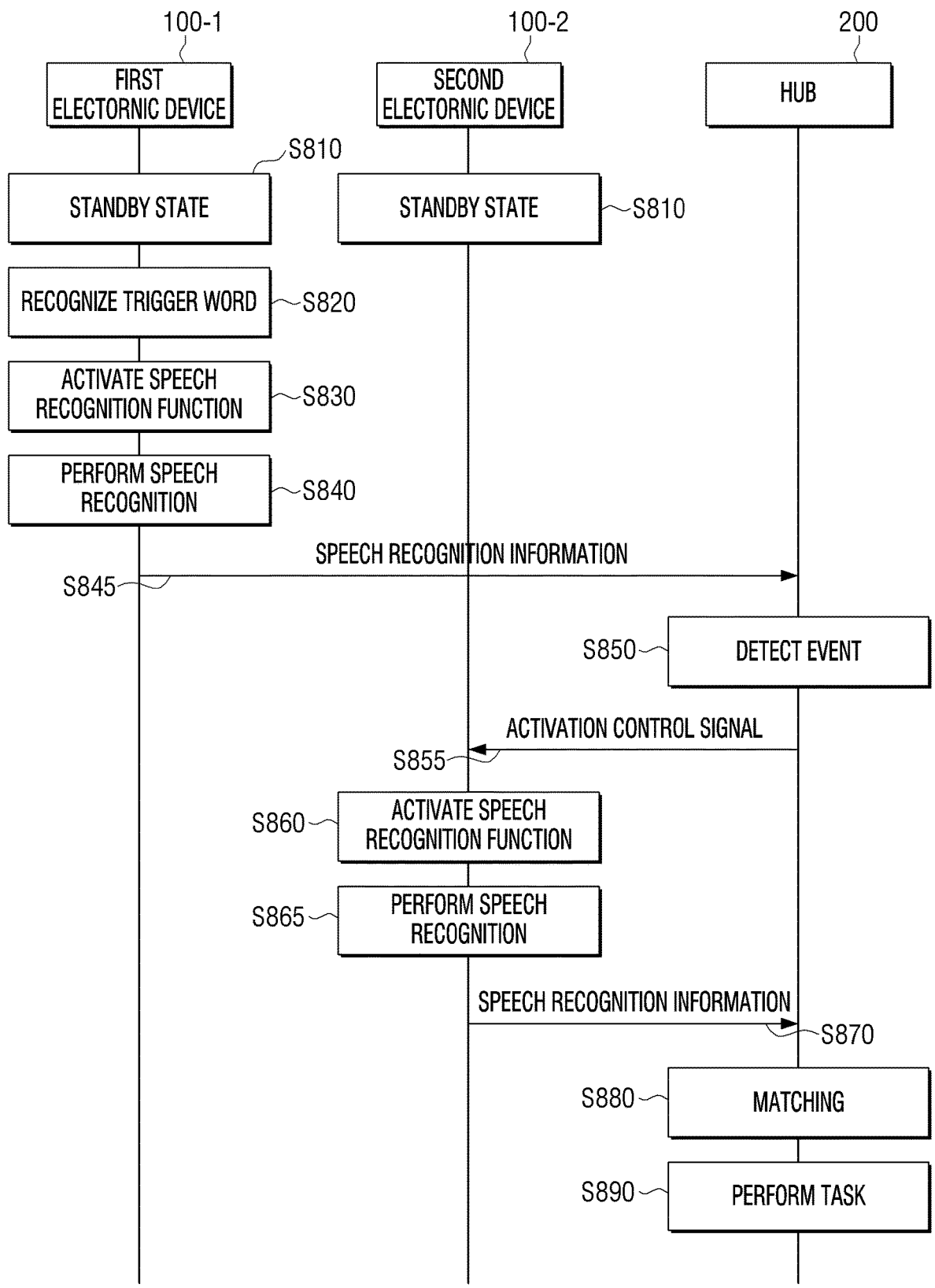

FIG. 8A is a flowchart illustrating a speech recognition method in the speech recognition system according to still another embodiment.

Referring to FIG. 8A, the speech recognition system 3000 may include a first electronic device 100-1, a second electronic device 100-2, and a hub device 200.

First, the first electronic device 100-1 and the second electronic device 100-2 are in a speech recognition standby state (S810). Thereafter, when the user utters a speech including a trigger word near the first electronic device 100-1, the first electronic device 100-1 may recognize the trigger word included in the user speech (S820). Alternatively, the speech recognition function may be activated by a user's manual operation. For example, when a specific button provided in the first electronic device 100-1 is selected, the speech recognition function may be activated.

When the first electronic device 100-1 recognizes the trigger word included in the user speech, the first electronic device 100-1 may activate a speech recognition function (S830). In addition, the first electronic device 100-1 may perform speech recognition on the user speech input in a state in which the speech recognition function is activated (S840). In this case, the first electronic device 100-1 may perform all of the series of processes for speech recognition, or may perform only some of the series of processes for speech recognition. For example, the first electronic device 100-1 may perform only a process of performing a speech recording to obtain an audio signal. As another example, the first electronic device 100-1 may perform up to a process of obtaining pronunciation information, phoneme information, or character string information based on the acoustic model.

Furthermore, the first electronic device 100-1 may transmit speech recognition information obtained by performing the speech recognition to the hub device 200 (S845). As such, when all of the series of processes for speech recognition are performed in S840, the speech recognition information may include a final result (e.g., text data corresponding to an audio signal). When only some of the series of processes for speech recognition are performed in S840, the speech recognition information may include an intermediate result (e.g., an audio signal, feature information obtained from the audio signal, pronunciation information, phoneme information, character string information, or the like). In this case, the first electronic device 100-1 may also transmit additional information and user information to be used for matching.

As such, the electronic device 100 and the hub device 200 may divide and perform respective processes for speech recognition, thereby reducing an operational burden on the electronic device 100.

The hub device 200 may sense a specific event in which the other device needs to continuously perform the speech recognition while the speech recognition function of the first electronic device 100-1 is activated (S850). For example, when the user movement is detected, the hub device 200 may transmit a control signal for activating the speech recognition function to hand over the speech recognition job to the second electronic device 100-2 which is in the movement direction of the user (S855). For example, the hub device 200 may receive signals related to the movement of the user from an electronic device capable of sensing the movement of the user, sense the event in which the user moves based on the detected signals, and transmit the control signal for activating the speech recognition function to hand over the speech recognition job to the second electronic device 100-2.

On the other hand, instead of the hub device 200, the first electronic device 100-1 may perform an operation of handing over the speech recognition job. For example, the first electronic device 100-1 may sense the movement of the user through a plurality of microphones and cameras, sense the event in which the user moves based on the sensed movement of the user, and transmit the control signal for activating the speech recognition function to hand over the speech recognition job to the second electronic device 100-2.

The second electronic device 100-2 receiving the control signal may activate the speech recognition function (S860). In addition, the second electronic device 100-2 may perform speech recognition on the user speech input in a state in which the speech recognition function is activated (S865). In this case, the second electronic device 100-2 may perform all of the series of processes for speech recognition, or may perform only some of the series of processes for speech recognition.

In addition, the second electronic device 100-2 may transmit speech recognition information obtained by performing the speech recognition to the hub device 200 (S870). In this case, when all of the series of processes for speech recognition are performed in S865, the speech recognition information may include a final result (e.g., text data corresponding to an audio signal). When only some of the series of processes for speech recognition are performed in S865, the speech recognition information may include an intermediate result (e.g., an audio signal, feature information obtained from the audio signal, pronunciation information, phoneme information, character string information, or the like). In this case, the second electronic device 100-2 may also transmit additional information and user information to be used for matching.

The hub device 200 may match the speech recognition information received from the first electronic device 100-1 and the speech recognition information received from the second electronic device 100-2 in chronological order (S880). In this case, when at least one of the speech recognition information received from the first electronic device 100-1 and the speech recognition information received from the second electronic device 100-2 is the intermediate result, the hub device 200 may perform the remaining processes for speech recognition to obtain a final result, and may perform the matching based on the final result.

In addition, the hub device 200 may perform a task based on a final recognition result for an entire user speech obtained as the matching result (S890).

For example, when the entire speech of the user obtained through the first electronic device 100-1 and the second electronic device 100-2 is "What is the weather today?", the hub device 200 may perform a task of transmitting a control signal that causes the second electronic device 100-2 to output a speech response that "Today, you may expect some rain in the afternoon," to the second electronic device 100-2.

On the other hand, in FIG. 8A, although the matching is described as being performed by the hub device 200, it is possible to perform the matching by the first electronic device 100-1 or the second electronic device 100-2. For example, the hub device 200 may perform recognition for the user speeches obtained from the first electronic device 100-1 and the second electronic device 100-2, respectively, to obtain the speech recognition information, and transmit the obtained speech recognition information to the first electronic device 100-1 or the second electronic device 100-2, and the first electronic device 100-1 or the second electronic device 100-2 may perform the matching for the speech recognition information. In addition, the first electronic device 100-1 or the second electronic device 100-2 may perform the task.

Furthermore, the information obtained by performing the task may also be transmitted to one electronic device, but the information obtained by performing the task may also be transmitted to two or more electronic devices. For example, in case of a speech command "turn on the air conditioner", a control command to perform a task for "turn on the air conditioner" may be transmitted to the air conditioner, and a feedback on the completion of the task may be transmitted to an electronic device closer the user.

In the embodiments described above, it is described that the electronic device 100 may recognize the trigger word. However, according to another embodiment, the electronic device 100 may not recognize the trigger word and merely transmit audio data obtained from the user speech to the outside, and it may be possible to perform the process for speech recognition externally. This will be described with reference to FIGS. 8B and 8C.

Figure 8B:
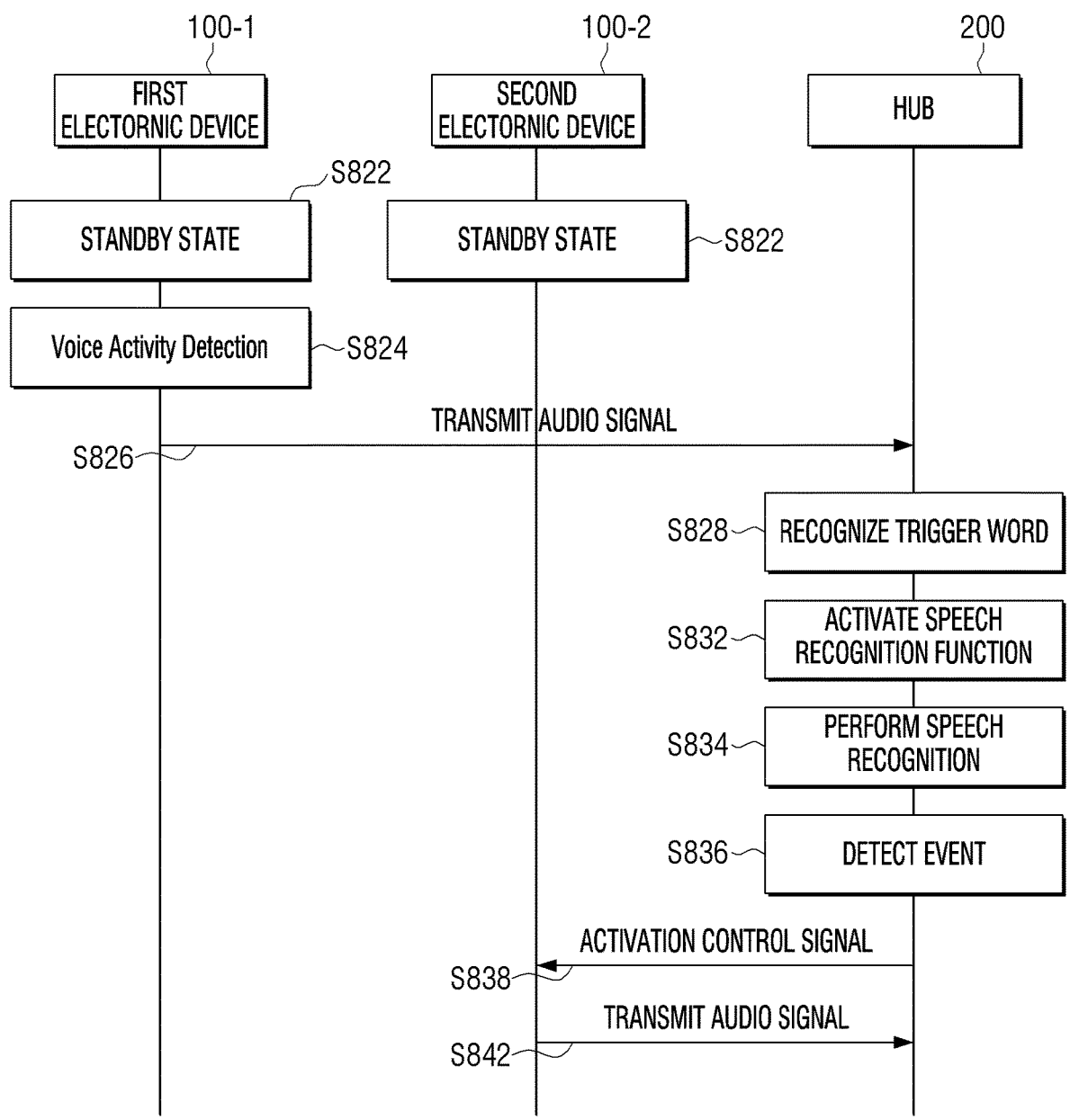

FIG. 8B is a flowchart illustrating a speech recognition method in a speech recognition system according to still another embodiment.

Referring to FIG. 8B, initially, the first electronic device 100-1 and the second electronic device 100-2 are in a speech recognition standby state (S822).

When the first electronic device 100-1 detects a human voice (S824), the first electronic device 100-1 may immediately transmit a recorded, or obtained, audio signal to the hub device 200 (S826). A voice Activity Detection (VAD) is a technique generally used in the speech recognition field and is a technique that detects the human voice using a statistical model, a deep learning model, or the like, based on loudness and energy distribution in a frequency domain. In addition, the human voice may be detected using voice end point detection (EPD), which is a technique commonly used in speech recognition.

According to still another embodiment, the first electronic device 100-1 may not include a voice activity detection function, and in this case, the first electronic device 100-1 may continue to transmit the audio signal to the hub device 200 in a standby state.

When hub device 200 recognizes a trigger word in the audio signal received from the first electronic device 100-1 (S828), the hub device 200 may activate a speech recognition function (S832) and perform speech recognition (S834).

In addition, the hub device 200 may detect a specific event in which a device other than the first electronic device 100-1 needs to continuously perform the speech recognition (S836). For example, the hub device 200 may detect the movement of the user. As such, the hub device 200 may transmit a control signal for activating the speech recognition function to hand over a speech recognition job (S838).

The second electronic device 100-2 receiving the activation control signal may start recording and transmit the audio signal to the hub device 200. In addition, the hub device 200 may perform the speech recognition for the audio signal received from the second electronic device 100-2.

The hub device 200 may match a speech recognition result for the audio signal received from the first electronic device 100-1 and a speech recognition result for the audio signal received from the second electronic device 100-2 to obtain a final recognition result.

When the audio signal received from the first electronic device 100-1 and the audio signal received from the second electronic device 100-2 are from different users, the hub device 200 may newly perform the trigger word recognition and the speech recognition in another session. That is, the hub device 200 may process speeches of multiple users in parallel. Alternatively, the hub device 200 may also be configured to process only the speech of one user at a time.

Figure 8C:
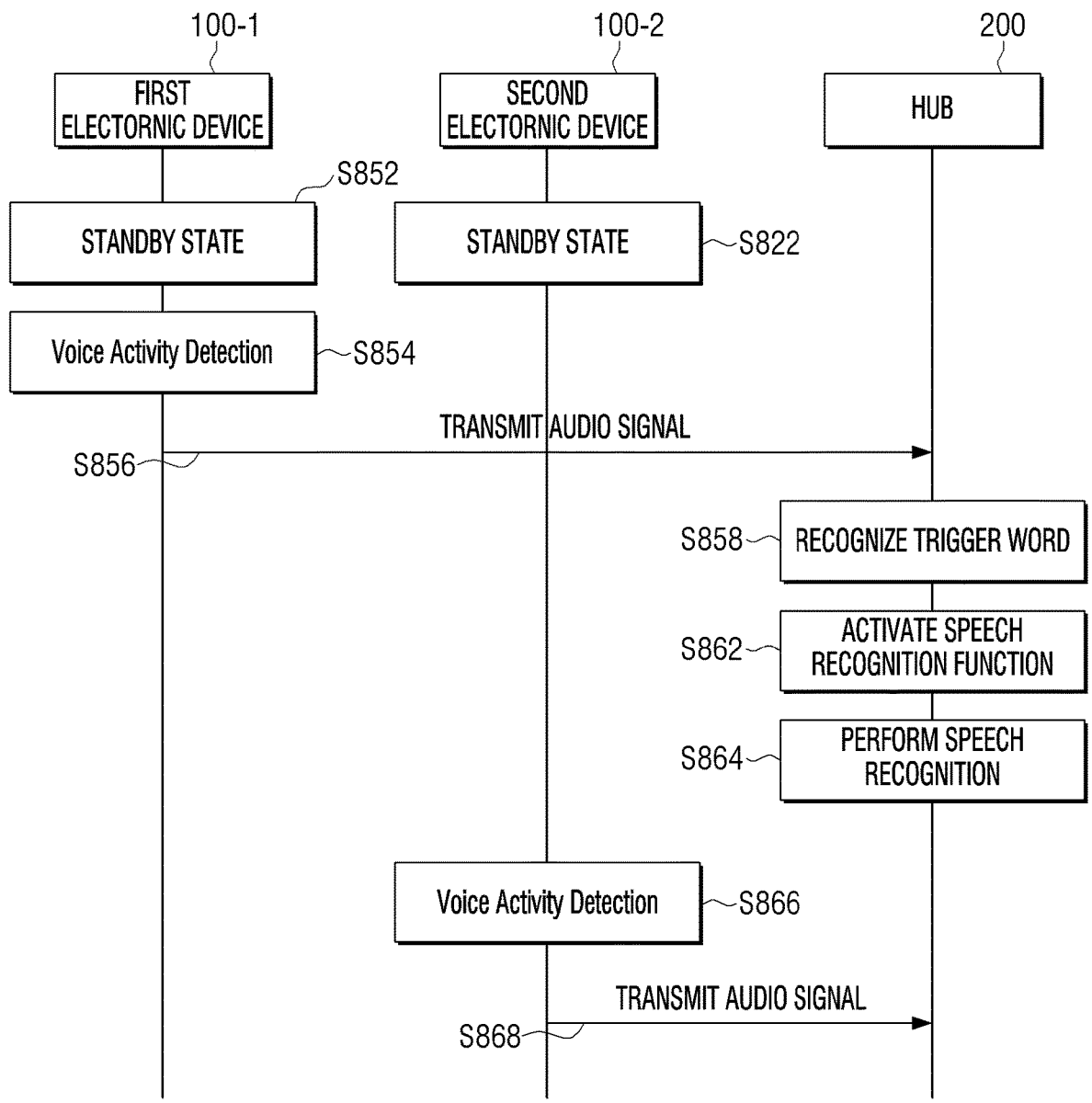

FIG. 8C is a flowchart illustrating a speech recognition method in a speech recognition system according to still another embodiment. In comparison with FIG. 8B, even if the hub device 200 does not transmit the control signal to hand over the speech recognition job to the second electronic device 100-2, the second electronic device 100-2 may also have the voice activity detection function like the first electronic device 100-1, and may immediately transmit the audio signal to the hub device 200 when the human voice is detected. Alternatively, the second electronic device 100-2 may not include the voice activity detection function, and in this case, the second electronic device 100-2 may continue to transmit the audio signal to the hub device 200 in a standby state.

Referring to FIG. 8C, the first electronic device 100-1 and the second electronic device 100-2 may be in a speech recognition standby state (S852).

When the first electronic device 100-1 detects a human voice (S854), the first electronic device 100-1 may immediately transmit a recorded audio signal to the hub device 200 (S856). However, the first electronic device 100-1 may not include a voice activity detection function, and in this case, the first electronic device 100-1 may continue to transmit the audio signal to the hub device 200 in a standby state.

When hub device 200 recognizes a trigger word in the audio signal received from the first electronic device 100-1 (S858), the hub device 200 may activate a speech recognition function (S862) and perform speech recognition (S864).

When the second electronic device 100-2 detects a human voice (S866), the second electronic device 100-2 may immediately transmit a recorded audio signal to the hub device 200 (S868). However, the second electronic device 100-2 may not include a voice activity detection function, and in this case, the second electronic device 100-2 may continue to transmit the audio signal to the hub device 200 in a standby state. In addition, the hub device 200 may perform the speech recognition for the audio signal received from the second electronic device 100-2.

The hub device 200 may match a speech recognition result for the audio signal received from the first electronic device 100-1 and a speech recognition result for the audio signal received from the second electronic device 100-2 to obtain a final recognition result.

When the speech recognition is already in progress of processing the utterance of the same user, the hub device 200 may switch, maintain or combine the signals by determining the quality of the signal. When the signals are from different users, the hub device 200 may newly perform the trigger word recognition and the speech recognition in another session.

Here, the function of the hub device 200 may also be implemented in the server 300.

FIG. 9 is a flowchart illustrating a speech recognition method in a speech recognition system according to still another embodiment.

Referring to FIG. 9, the speech recognition system 4000 may include a first electronic device 100-1, a second electronic device 100-2, a hub device 200, and a server 300.

Here, the first electronic device 100-1 and the second electronic device 100-2 are in a speech recognition standby state (S910). Thereafter, when the user utters a speech including a trigger word near the first electronic device 100-1, the first electronic device 100-1 may recognize the trigger word included in the user speech (S920). Alternatively, the speech recognition function may be activated by a user's manual operation. For example, when a specific button provided in the first electronic device 100-1 is selected, the speech recognition function may be activated.

When the first electronic device 100-1 recognizes the trigger word included in the user speech, the first electronic device 100-1 may activate a speech recognition function (S930). Furthermore, the first electronic device 100-1 may perform speech recognition on the user speech input in a state in which the speech recognition function is activated (S940). In this case, the first electronic device 100-1 may perform all of the series of processes for speech recognition, or may perform only some of the series of processes for speech recognition. For example, the first electronic device 100-1 may perform only a process of performing a speech recording to obtain an audio signal. As another example, the first electronic device 100-1 may perform up to a process of obtaining pronunciation information, phoneme information, or character string information based on the acoustic model.

In addition, the first electronic device 100-1 may transmit speech recognition information obtained by performing the speech recognition to the hub device 200 (S945). In this case, when all of the series of processes for speech recognition are performed in S940, the speech recognition information may include a final result (e.g., text data corresponding to an audio signal). When only some of the series of processes for speech recognition are performed in S940, the speech recognition information may include an intermediate result (e.g., feature information obtained from the audio signal, pronunciation information, phoneme information, character string information, or the like). In this case, the first electronic device 100-1 may also transmit additional information and user information to be used for matching.

As such, the electronic device 100 and the hub device 200 may divide and perform the processes for speech recognition, thereby reducing an operational burden on the electronic device 100.

On the other hand, the first electronic device 100-1 may also transmit the speech recognition information to the server 300 instead of transmitting the speech recognition information to the hub device 200.

The hub device 200 may detect a specific event in which the other device needs to continuously perform the speech recognition while the speech recognition function of the first electronic device 100-1 is activated (S950).

For example, when the movement of the user is detected, the hub device 200 may transmit a control signal for activating the speech recognition function to hand over the speech recognition job to the second electronic device 100-2 which is in the movement direction of the user (S955). For example, the hub device 200 may receive signals related to the movement of the user from the first electronic device 100-1 capable of sensing the movement of the user, identify the event based on the received signals, and transmit the control signal for activating the speech recognition function to hand over the speech recognition job to the second electronic device 100-2.

According to still another embodiment, instead of the hub device 200, the server 300 may perform an operation of handing over the speech recognition job. For example, the server 300 may receive signals related to the movement of the user from the electronic device 100-1 capable of sensing the movement of the user, identify the event based on the received signals, and transmit the control signal for activating the speech recognition function to hand over the speech recognition job to the second electronic device 100-2.

On the other hand, the first electronic device 100-1 may perform an operation of handing over the speech recognition job. For example, the first electronic device 100-1 may detect the movement of the user through a plurality of microphones and cameras, detect the event in which the user moves based on the sensed movement of the user, and transmit the control signal for activating the speech recognition function to hand over the speech recognition job to the second electronic device 100-2.

The second electronic device 100-2 receiving the control signal may activate the speech recognition function (S960). In addition, the second electronic device 100-2 may perform speech recognition on the user speech input in a state in which the speech recognition function is activated (S965). In this case, the second electronic device 100-2 may perform all of the series of processes for speech recognition, or may perform only some of the series of processes for speech recognition.

Alternatively, the second electronic device 100-2 may transmit speech recognition information obtained by performing the speech recognition to the hub device 200 (S970). In this case, when all of the series of processes for speech recognition are performed in S965, the speech recognition information may include a final result (e.g., text data corresponding to an audio signal). When only some of the series of processes for speech recognition are performed in S965, the speech recognition information may include an intermediate result (e.g., an audio signal, feature information obtained from the audio signal, pronunciation information, phoneme information, character string information, or the like). In this case, the second electronic device 100-2 may also transmit additional information and user information, to the hub 200, to be used for matching.

On the other hand, the second electronic device 100-2 may also transmit the speech recognition information to the server 300 instead of transmitting the speech recognition information to the hub device 200.

The hub device 200 may transmit the speech recognition information received from the first electronic device 100-1 and the speech recognition information received from the second electronic device 100-2 to the server 300 (S980). In this case, the hub device 200 may transmit the speech recognition information received from the first electronic device 100-1 and the speech recognition information received from the second electronic device 100-2 to the server 300, as received from the first electronic device 100-1 and the second electronic device 100-2. Alternatively, when the speech recognition information received from the first electronic device 100-1 and the speech recognition information received from the second electronic device 100-2 is an intermediate result, the hub device 200 may perform the remaining processes for speech recognition and transmit a final result to the server 300. Alternatively, when the audio signal is received from the first electronic device 100-1 and the second electronic device 100-2, the hub device 200 may relay the received audio signal to the server 300.

In addition, the server 300 may match the received speech recognition information in chronological order. When the received speech recognition information is the intermediate result, the server 300 may perform the remaining processes for speech recognition to obtain a final result, and may perform the matching based on the final result. In addition, the hub device 200 may perform a task based on a final recognition result for an entire user speech obtained as the matching result (S995).

For example, when the entire speech of the user obtained through the first electronic device 100-1 and the second electronic device 100-2 is "What is the weather today?", the server 300 may perform a task of transmitting a control signal that causes the second electronic device 100-2 to output a speech response that "Today, you may expect some rain in the afternoon," to the second electronic device 100-2.

On the other hand, in FIG. 9, although the matching is described as being performed by the server 300, it may be possible to perform the matching by the first electronic device 100-1, the second electronic device 100-2, or the hub device 200. In addition, the first electronic device 100-1, the second electronic device 100-2, or the hub device 200 may perform the task.

As described above, in the speech recognition system according to various embodiments, the speech recognition job may be automatically handed over to the electronic device 100 near the user according to the movement of the user, the speech recognition information obtained by the respective electronic devices 100 may be matched, and the task may be performed based on the matched result. In addition, the series of processes for speech recognition may be distributed into the multiple devices and performed by the multiple devices, thereby reducing the operational burden in one device.

Hereinafter, configurations of the electronic device 100, the hub device 200, and the server 300 will be described with reference to FIGS. 10 to 13.

Figure 10:
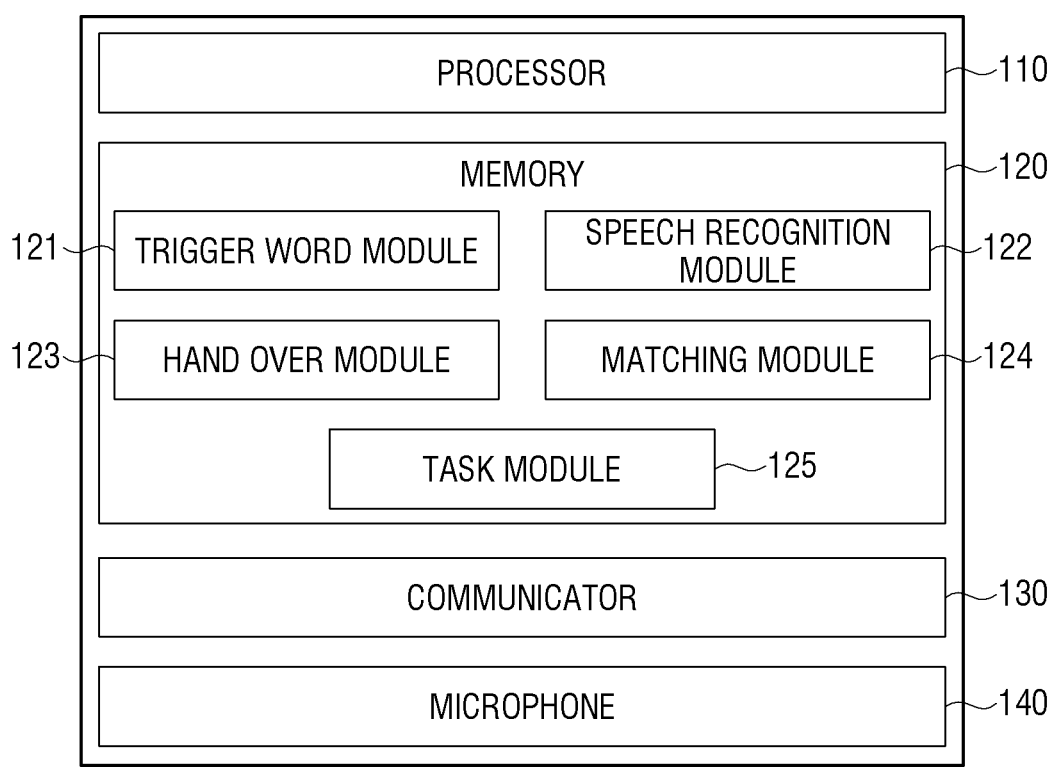
FIG. 10 is a block diagram illustrating a configuration of an electronic device according to an embodiment.

FIG. 10 is a diagram illustrating a configuration of the electronic device 100 according to an embodiment.

Referring to FIG. 10, the electronic device 100 may include a processor 110, a memory 120, a communicator 130, and a microphone 140.

The processor 110 is a component for controlling an overall operation of the electronic device 100. For example, the processor 110 may drive an operating system or an application to control a plurality of hardware or software components connected to the processor 110, and may perform various kinds of data processing and operations. The processor 110 may be a central processing unit (CPU) or graphics-processing unit (GPU) or both. The processor 110 may be implemented as at least one general processor, a digital signal processor, an application specific integrated circuit (ASIC), a system on chip (SoC), a microcomputer (MICOM), or the like.

The memory 120 may include an internal memory or an external memory. The memory 120 is accessed by the processor 110, and the processor 110 may perform readout, writing, correction, deletion, update, and the like of data in the memory 120.

The memory 120 may include software and/or firmware configured as one or more modules. The module may correspond to a set of computer executable instructions.

The memory 120 may include a trigger word module 121, a speech recognition module 122, a hand over module 123, a matching module 124, and a task module 125. The modules 121, 122, 123, 124, and 125 may be executed by the processor 110 to perform corresponding functions.

The trigger word module 121 may recognize a predetermined trigger word or phrase in an audio signal. For example, the trigger word module 121 may recognize a trigger word included in the user speech obtained through the microphone 140. When the trigger word is recognized, the speech recognition function of the electronic device 100 may be activated. For example, the trigger word module 121 may activate a recording function of the microphone 140 and activate or drive the speech recognition module 122.

Alternatively, the electronic device 100 may not include the trigger word module 121, and in this case, the electronic device 100 may activate the speech recognition function by a user's manual operation. For example, the speech recognition function may be activated by selecting a specific button provided in the electronic device 100. As another example, the electronic device 100 may perform only recording and transmit an audio signal to an external device, for example, the other electronic device 100, the hub device 200, the server 300, or the like, and it may be also possible to control the speech recognition function to be activated in the electronic device 100 by recognizing the trigger word in such an external device.

The speech recognition module 122 may perform speech recognition. The speech recognition module 122 may use automatic speech recognition (ASR) technology.

The speech recognition module 122 may convert an audio signal corresponding to the user speech into text data. A specific function of the speech recognition module 122 will be described with reference to FIG. 13.

Figure 13:
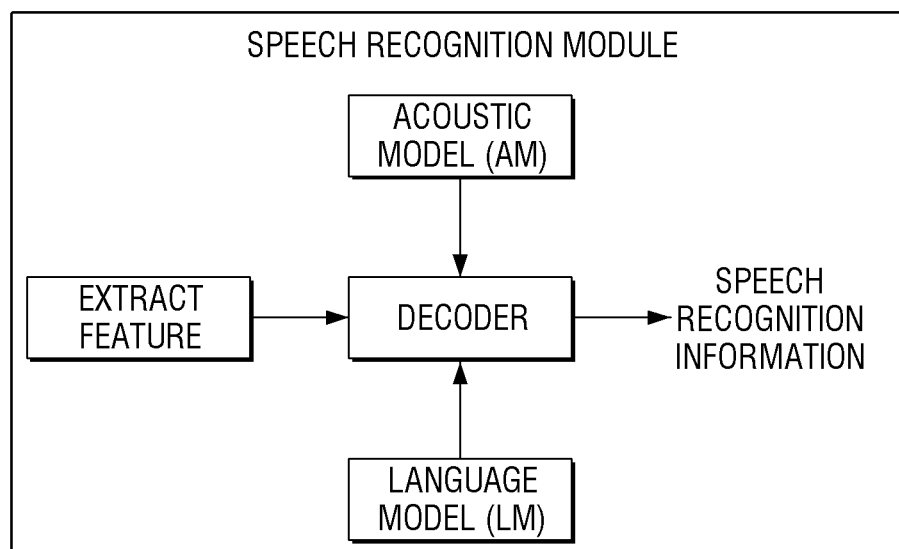
FIG. 13 is a block diagram illustrating a speech recognition module according to an embodiment.

Referring to FIG. 13, the speech recognition module 122 may include a feature extractor and a decoder. The feature extractor may extract feature information (feature vector) from the audio signal. In addition, the decoder may obtain speech recognition information corresponding to feature information based on an acoustic model and a language model. The speech recognition information may include pronunciation information, phoneme information, and character string information corresponding to the feature information obtained based on the acoustic model, and text data corresponding to the obtained pronunciation information based on the language model.

According to an embodiment, the speech recognition module 122 may include only one of the acoustic model and the language model, or may use only one of the acoustic model and the language model even if it includes both the acoustic model and the language model. In this case, the speech recognition module 122 may obtain the speech recognition information by applying only one of the acoustic model and the language model. For example, the speech recognition information may include the pronunciation information, the phoneme information, and the character string information obtained based on the acoustic model, or the text information obtained based on the language model. That is, the speech recognition information may include the pronunciation information, the phoneme information, or the character string information, which is an intermediate result. Alternatively, the speech recognition information that may include text data, which is a final result. Here, the speech recognition information may be transmitted from the first electronic device 100-1 to the second electronic device 100-2, and the text data may be finally obtained by applying, from the second electronic device 100-2, the acoustic model or the language model that has not been applied in the first electronic device 100-1.

According to another embodiment, the speech recognition module 122 may not include both the acoustic model and the language model, or may not use the acoustic model or the language model even if it includes both of the acoustic model and the language model. In this case, the speech recognition module 122 may output the speech recognition information including the feature information by performing up to an operation of extracting the feature information. The speech recognition information may be transmitted to the other device, and the text data may be finally obtained by applying the acoustic model and the language model through the other device.

According to still another embodiment, the electronic device 100 may not include the speech recognition module itself, or may not use the speech recognition module even if it includes the speech recognition module. In this case, the electronic device 100 may transmit the audio signal obtained through the microphone 140 to the other device, and the other device may perform the speech recognition.

As such, the selective use of the functions of the speech recognition module 122 may reduce an operational burden in the electronic device 100.

In addition, when the speech recognition module 122 receives the speech recognition information, which may be the intermediate result, from the external device, the speech recognition module 122 may perform the remaining speech recognition processes on the speech recognition information. For example, when the speech recognition information received from the external device is information to which the acoustic model is applied, but not the language model, the speech recognition module 122 may obtain the final recognition result by applying the language model to the received speech recognition information. As another example, when the speech recognition information received from the external device includes only the feature information, the speech recognition module 122 may obtain the final recognition result by applying the language model and the acoustic model to the speech recognition information.

When the text data is obtained from the audio signal through the speech recognition module 122, the text data may be transmitted to the task module 125.

The hand over module 123 may perform a function of detecting a specific event in which the other device needs to continuously perform the speech recognition, a function of selecting the other device to which the speech recognition job is to be handed over, a function of transmitting a control signal for activating a speech recognition function of the other device, and a function of transmitting speech recognition information, additional information to be used for matching, and/or user information.

For example, the electronic device 100 may include a plurality of microphones 140 for detecting a movement of a user, and the hand over module 123 may detect a difference in the volume of the user speech input through the plurality of microphones resulting from the user's movement. According to still another embodiment, the first electronic device 100-1 may include a camera, and the hand over module 123 may detect the user movement based on an image obtained through the camera.

The hand over module 123 may select the other electronic device to which the speech recognition job is to be handed over by using information of the other electronic devices capable of receiving speech pre-stored in the memory. For example, when the hand over module 123 detects the event in which the user moves, the hand over module 123 may obtain movement information of the user, and may select the other electronic device which is currently closest to the user among other electronic devices based on the information of the other electronic devices stored in the memory 120. In addition, the hand over module 123 may transmit a control signal for activating the speech recognition function to the selected other electronic device through the communicator 130.

A method for identifying the other electronic device which is in the movement direction of the user by the electronic device 100 using the hand over module 123 will be described in more detail with reference to FIGS. 18 to 20.

The electronic device 100 may generate location information of electronic devices in a network (e.g., a home network) in order to identify which electronic device is in the movement direction of the user. When a new electronic device enters the network, the location information may also be generated for the new electronic device.

One example of a method for generating location information on electronic devices will be described with reference to FIG. 18.

Figure 18:
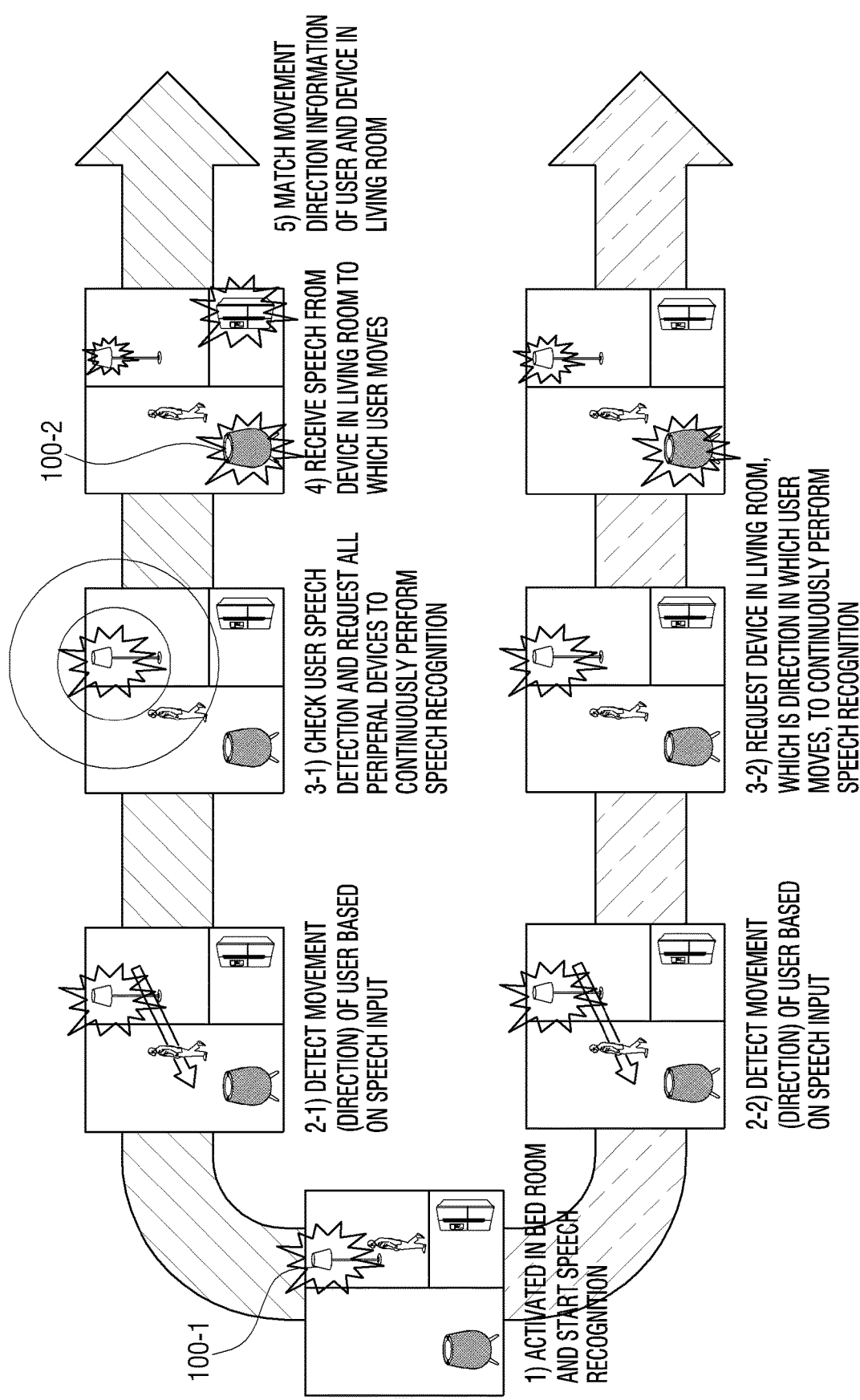
FIG. 18 is a diagram illustrating an example of a method for generating location information on electronic devices according to an embodiment.

Referring to FIG. 18, a flow indicated by an upper arrow is a process of generating location information, and a flow indicated by a lower arrow is a process of activating a speech recognition function of the other electronic device which is in a movement direction of a user by using the generated location information.

A process of learning the location information will be described herein. As shown in FIG. 18, in step 1) the first electronic device 100-1 starts speech recognition upon activation of a speech recognition function of a first electronic device 100-1 in a bedroom. In step 2-1), the first electronic device 100-1 may obtain information on a movement direction of a user based on the user speech input through a plurality of microphones. In step, 3-1), the first electronic device 100-1 may transmit a control signal for activating the speech recognition function to all electronic devices capable of receiving the speech within the same network. In step 4), when a second electronic device 100-2 in a living room. which is in a direction of the user's movement, receives the user speech, the second electronic device 100-2 may notify the received user speech to the first electronic device 100-1. In step 5), the first electronic device 100-1 may generate location information of the second electronic device 100-2 by matching the information on the movement direction of the user with the second electronic device 100-2. By performing such method to other devices, the location information on each of the electronic devices within the same network may be generated, and the location information may be shared among the electronic devices. For example, the electronic devices 100 may transmit the location information to each other, or may transmit the location information to the hub 200 or the server 300.

After the location information is generated, the first electronic device 100-1 may activate only a specific device which is in the movement direction of the user. That is, referring to the flow indicated by the lower arrow of FIG. 18, in step 1), the electronic device 100-1 starts the speech recognition upon activating the speech recognition function of the first electronic device 100-1 in the bedroom. In step 2-2), the first electronic device 100-1 may obtain information on a movement direction of a user based on the user speech input through a plurality of microphones. In step 3-2), the first electronic device 100-1 may transmit a control signal for activating the speech recognition function to the second electronic device 100-2 based on the first electronic device 100-1 determining that the direction in which the user moves matches the location of the second electronic device 100-2 in the living room.

Figure 19:
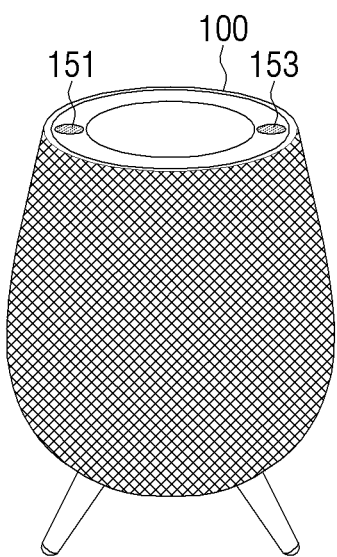
FIG. 19 is a diagram illustrating an electronic device including a plurality of microphones according to an embodiment.

FIG. 19 is a diagram illustrating an electronic device 100 including a plurality of microphones according to an embodiment.

Referring to FIG. 19, the electronic device 100 may include a speaker and a plurality of microphones 151 and 153. The electronic device 100 may determine the direction in which the user speech is generated using the user voices received from the plurality of microphones 151 and 153.

Specifically, distances from a sound source to the plurality of microphones 151 and 153 may be different from each other. Therefore, the time it takes for a speech generated at a specific point to be delivered to each of the plurality of microphones 151 and 153 may differ and the loudness of sound that the speech generated at the specific point may be delivered to each of the plurality of microphones 151 and 153. The electronic device 100 may detect a direction in which a speech command is generated by using a time difference or the loudness of sound in which the same speech is detected in each of the plurality of microphones 151 and 153. This is the same principle as ears of a person detecting the direction of sound.

Specific techniques for determining the movement direction of the user using the speech may include GCC-PHAT, SRP-PHAT, and the like.

The number of the plurality of microphones 151 and 153 is not limited to two, and the direction may be more precisely detected using a greater number of microphones.

According to an embodiment, the electronic device 100 may select a pair of two microphones of different combinations among the plurality of microphones provided in the electronic device 100, and calculate time delays of an acoustic signal using each pair of microphones. The electronic device 100 may calculate a three-dimensional location of the sound source based on the calculated time delays and the locations of the plurality of microphones. An algorithm of such method may be a generalized cross-correlation with the phase transform (GCC-PHAT).

In addition, for example, the electronic device 100 may receive the acoustic signal using the plurality of microphones and change the acoustic signal into acoustic data corresponding to each of the plurality of microphones. Assuming that the received acoustic signal propagated at a specific direction, the electronic device 100 may calculate beamforming power output by calculating a time delay for each of the plurality of microphones and moving the acoustic data corresponding to each of the plurality of microphones by the calculated time delay corresponding to the acoustic data, and then adding the delayed acoustic data. Here, since a value in which the acoustic data is added is maximized when the assumed direction is an actual direction of the sound source, the electronic device 100 may calculate beamforming power output for all possible directions and determine a direction in which the beamforming power output is maximized as the direction of the sound source. An algorithm of such method may be steered response power with the phase transform (SRP-PHAT).

FIG. 20 is a diagram illustrating a method for detecting, by an electronic device 100, a movement direction of a user using a camera, according to an embodiment.

The electronic device 100 illustrated in FIG. 20 may include a plurality of microphones and a camera 160. The electronic device 100 may determine the movement of a user using the plurality of microphones. If it is determined that there is the movement of the user, the electronic device 100 may control to drive the camera 160 provided in the electronic device 100, or may control to drive a camera of the other device when the camera is provided in the other device. In addition, the electronic device 100 may obtain an image generated by the camera 160 or receive an image generated by the camera provided in the other device, and may identify the movement direction of the user and a noise direction (e.g., sound coming from an opened window, TV sound, etc.) based on the image. That is, the direction of the user may be detected based on the image generated by the camera, and the noise from other directions may be removed or attenuated, thereby more accurately detecting the direction of the user. The electronic device 100 may also transmit information on the noise direction to the other electronic device to which the speech recognition job is handed over.

For example, the electronic device 100 may separate sound sources from an audio signal by using an independent component analysis technique that separates original sounds by a statistical learning algorithm. In addition, the electronic device 100 may identify the speech of the user among the separated sound sources, based on the information on the noise direction obtained through the camera 160. In this case, the electronic device 100 may include two or more microphones to identify the directions of the respective sound sources received by the two or more microphones. Further, the electronic device 100 may compare the directions of the received respective sound sources by the plurality of microphones with the direction information obtained through the camera 160 to identify the sound source corresponding to the user speech among a plurality of sound sources. When the sound source corresponding to the user speech is identified, the electronic device 100 may attenuate the remaining sound sources.

In addition, when the electronic device recognizes the speech, the electronic device may increase the sound source by performing beamforming in the user direction from the received audio signals and may attenuate the noise in the noise direction.

The matching module 124 may match the recognition information on the user speeches collected from different electronic devices in chronological order.

According to an embodiment, the final recognition result may be obtained based on the first speech recognition information obtained by performing the speech recognition on the user speech obtained through the microphone 140, and the second speech recognition information received from the other electronic device to which the speech recognition job is handed over.

In this case, the matching module 124 may obtain information on a time when the control signal for activating the speech recognition function is transmitted to the other electronic device, and may match the first speech recognition information and the second speech recognition information based on the obtained information on the time to obtain the final recognition result. Here, the obtained information on the time may include information on absolution time at which the control signal is transmitted. That is, the matching may be performed based on the absolute time information. Alternatively, the obtained information on the time may include information on a time taken to transmit the control signal to the other electronic device after the speech recognition function of the electronic device 100 is activated. That is, the matching may be performed based on relative time information.

Examples of the electronic device 100 matching the speech recognition information using the matching module 125 will be described with reference to FIGS. 21 to 25.

Figure 21:
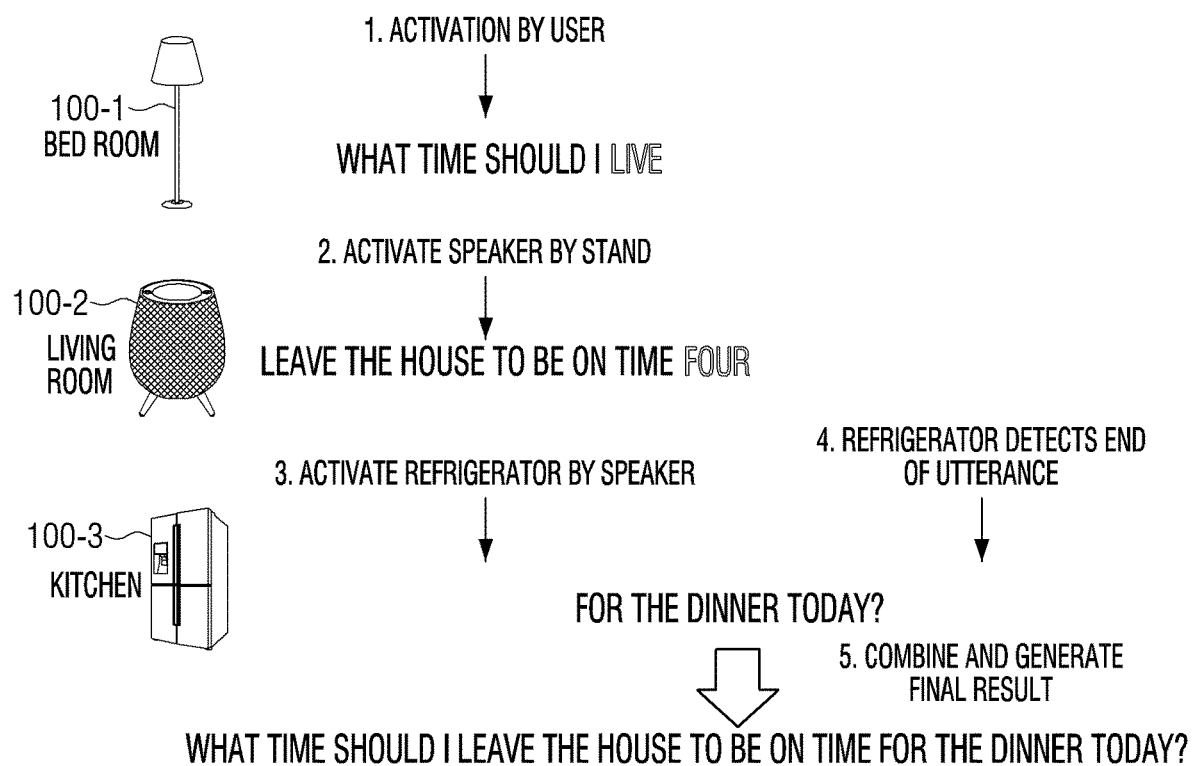
FIGS. 21 to 25 are diagrams illustrating various embodiments in which an electronic device matches speech recognition information.

FIG. 21 is a diagram illustrating a speech recognition information matching method of the electronic device 100 according to an embodiment.

Referring to FIG. 21, when the user utters while moving from a first electronic device 100-1 to a second electronic device 100-2 and a third electronic device 100-3, the electronic devices 100-1, 100-2, and 100-3 may sequentially activate the speech recognition function. For example, the user may want to know what time he should leave the house in order to be on time for his dinner and may ask "What time should I leave the house to be on time for the dinner today?" In addition, the user may be moving from his bedroom to the kitchen as he asks the question. Specifically, the user may utter "What time should I leave" while he is in the bedroom, in which the first electronic device 100-1 is located, and may be moving toward the living room. Here, the first electronic device 100-1 may recognize the phrase "What time should I", but may not clearly recognize the word "leave" as the voice of the user fades away as he is moving toward the living room. Further, the first electronic device 100-1 may misrecognize the term "leave" with some similar pronouncing term, such as "live." Then, the second electronic device 100-2, which is located in the living room, may recognize the phrase "I leave to be on time four" as the user approaches the second electronic device 100-2 in the living room. If it is determined that the second electronic device 100-2 receives a stronger audio signal from the user compared to the audio signal received by first electronic device 100-1, it may be determined that the term "leave" is more accurate in the context of the sentence or phrase. Furthermore, the electronic device 100-3, which is located in the kitchen, may recognize the rest of the phrase "for the dinner today?", as the user moves toward the kitchen and closer to the electronic device 100-3. Here, similar to the above, the third electronic device 100-2 may misrecognize the term "for" with some similar pronouncing term, such as "four." As described above, based on the strength of the audio signal received by the second electronic device 100-2 and the third electronic device 100-3, it may be determined that the term "for" is more accurate in the context of the sentence or phrase. Also, the third electronic device 100-3 may detect the end of the user utterance, and combine each phrase recognized by the first electronic device 100-1, the second electronic device 100-2, and the third electronic device 100-3 and generate a final result. The final result may be the entire user utterance which reads "What time should I leave the house to be on time for the dinner today?" In addition, any one of the electronic devices 100-1, 100-2, and 100-3, the hub device 200, or the server 300 may match the speech recognition information generated by the electronic devices 100-1, 100-2, and 100-3 to generate the final result. In this case, in order to match the speech recognition information, time information is required as additional information to be used for matching.

Figure 22:
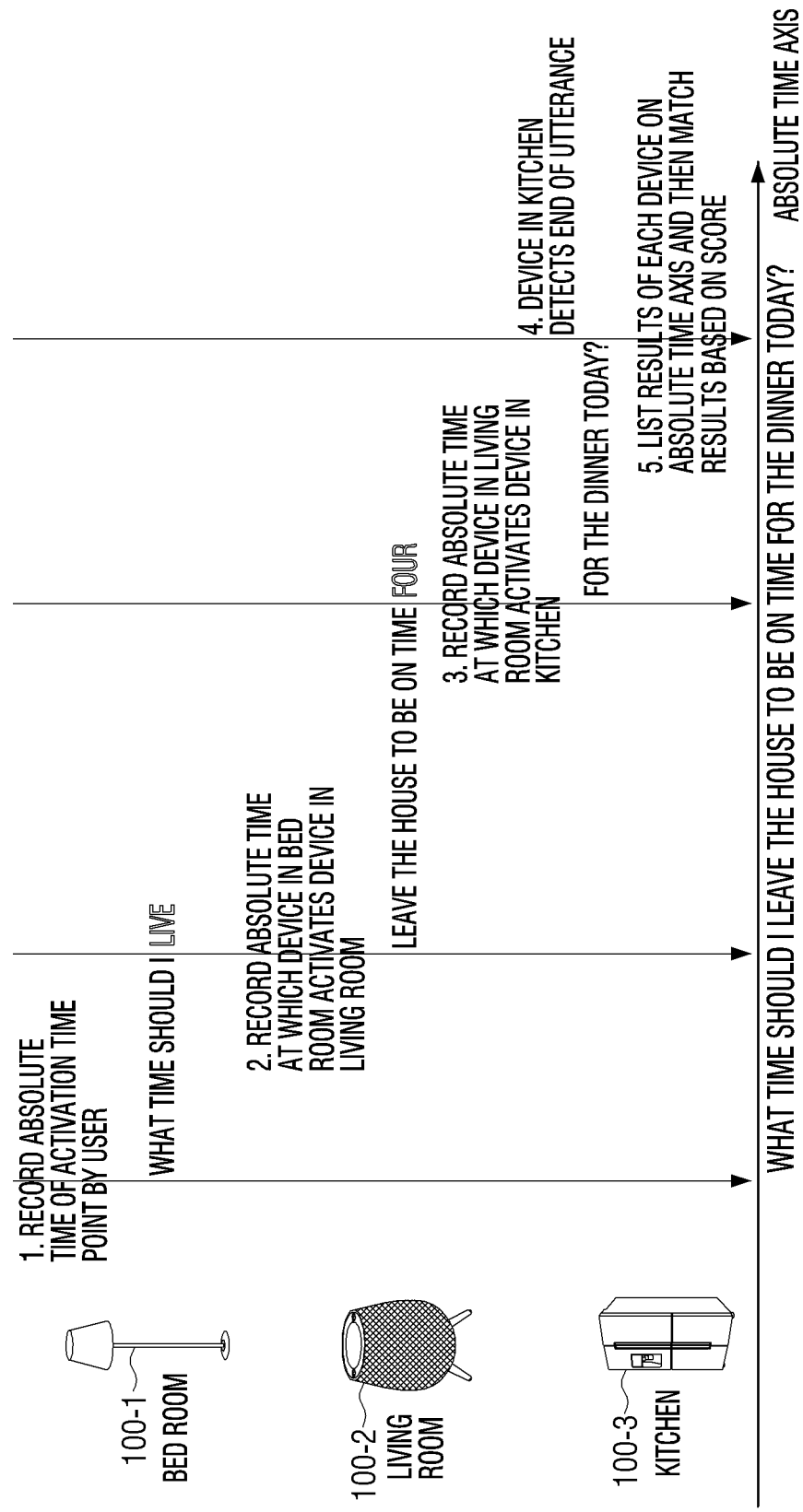

FIG. 22 is a diagram illustrating an example of coordinating the speech recognition information based on absolute time information.

Referring to FIG. 22, the electronic devices 100-1, 100-2, and 100-3 may record the time at which the speech recognition function is activated in an absolute time form and perform the matching on an axis of the absolute time. In this case, the matching may be performed based on a score, the degree to which the speech recognition is correctly performed. Here, the dark letters are portions having a high score. The score may be determined based on the SNR size and/or ASR score. The ASR score may include at least one of an acoustic model (AM) score indicating an accuracy of an application result of the AM or an language model (LM) score indicating an accuracy of an application result of the LM.

For example, each of the first electronic device 100-1, the second electronic device 100-2, and the third electronic device 100-3 may obtain information on an absolute time (date, hour, minute, second) at which each speech recognition function is activated, and transmit time information to a device to perform the final matching. When the device to perform the final matching is, for example, the third electronic device 100-3, the first electronic device 100-1 and the second electronic device 100-2 may transmit the speech recognition information and time information generated by the first electronic device 100-1 and the second electronic device 100-2 to the third electronic device 100-3. In this case, the first electronic device 100-1 and the second electronic device 100-2 may directly transmit the time information to the third electronic device 100-3, or the first electronic device 100-1 may transmit the time information to the second electronic device 100-2 and the second electronic device 100-2 may collect the information on the time obtained by the second electronic device 100-2 and the time information received from the first electronic device 100-1, and transmit the collected information to the third electronic device 100-3. That is, the time information may be transmitted in a chain-like manner. The speech recognition information may also be likewise transmitted separately or transmitted like a chain. Then, the third electronic device 100-3 may perform the matching based on the information on the time and the speech recognition information which are received to obtain a final recognition result, and may perform a task based on a final recognition result. For example, the first electronic device 100-1 may record an absolute time at which the first electronic device 100-1 is activated when the user starts uttering "What time should I live". The second electronic device 100-2 may record an absolute time at which the second electronic device 100-2 is activated to receive a portion of the phrase, for example, "leave the house to be on time four". Further, the third electronic device 100-3 may record an absolute time at which the third electronic device 100-3 is activated to receive a portion of the phrase, for example, "for the dinner today?" The third electronic device 100-3 may also detect the end of the utterance and generate a final result based on the absolute times received from the first electronic device 100-1 and the second electronic device 100-2. Here, the absolute time information may be collected and used to precisely determine the order and accuracy of user's speech.

Figure 23:
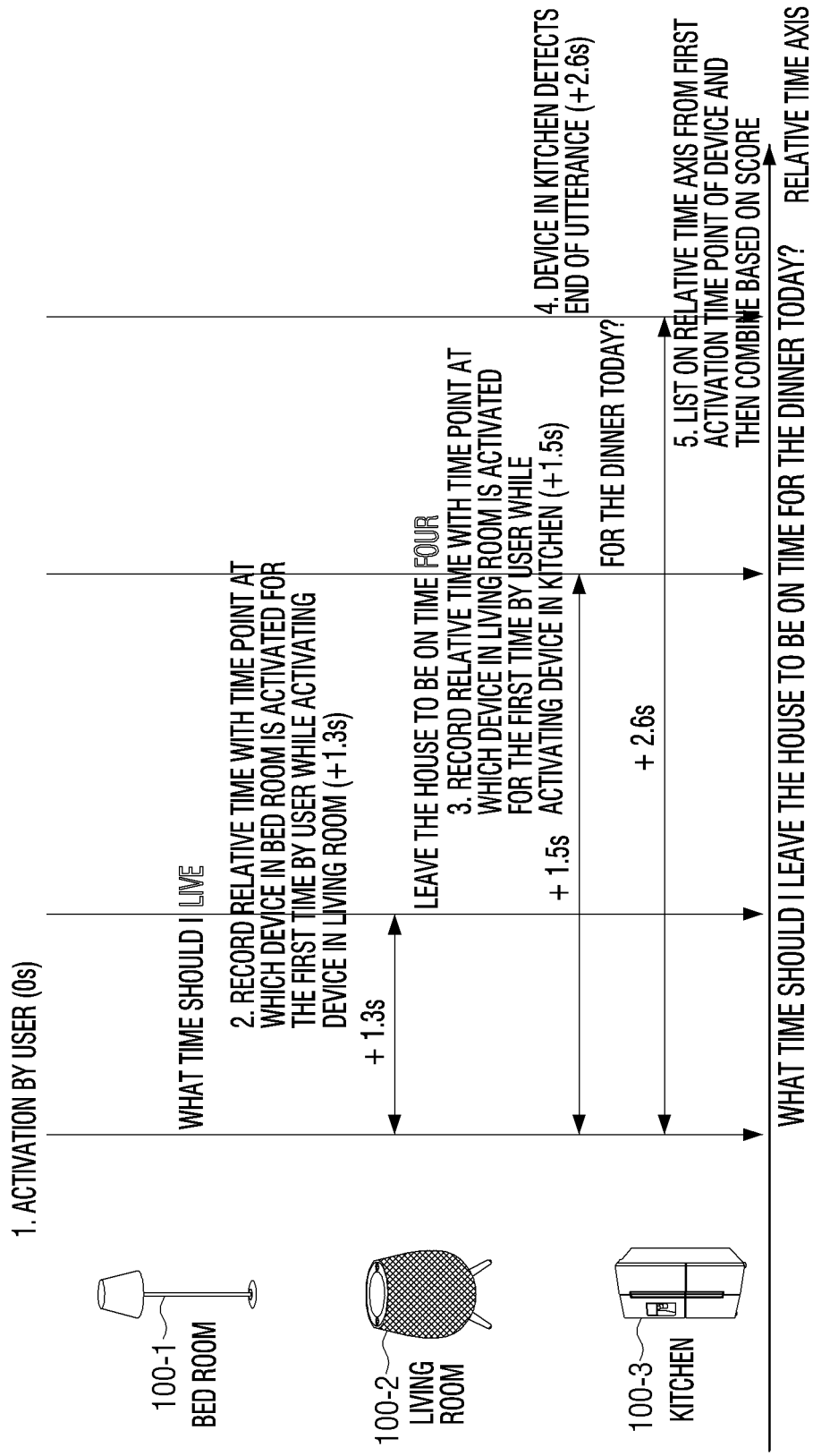

FIG. 23 is a diagram illustrating an example of coordinating the speech recognition information based on relative time information.

Referring to FIG. 23, each of the electronic devices 100-1, 100-2, and 100-3 may record a relative time of a time at which the speech recognition function is first activated based on the time at which the speech recognition is activated by the user for the first time and transmit the recorded relative time to a next electronic device, and such relative time information may be used for matching.

For example, each of the first electronic device 100-1, the second electronic device 100-2, and the third electronic device 100-3 may obtain information on a relative time at which the other device is activated based on the time at which the each speech recognition function is activated, and transmit time information to the next device. When the device to perform the final matching is, for example, the third electronic device 100-3, the first electronic device 100-1 may first transmit relative time information obtained by the first electronic device 100-1 to the second electronic device 100-2, and the second electronic device 100-2 may add relative time information obtained by the second electronic device 100-2 to the time information received from the first electronic device 100-1, and transmit the collected information to the third electronic device 100-3. That is, the time information may be transmitted in a chain-like manner. The speech recognition information may also be likewise transmitted like a chain. Then, the third electronic device 100-3 may perform the matching by listing the speech recognition information based on the received relative time information to obtain a final recognition result. In addition, the third electronic device 100-3 may perform a task based on the final recognition result. For example, referring to FIG. 23, a relative time difference between a time at which the first electronic device 100-1 is first activated and a time at which the second electronic device 100-2 is first activated is 1.3 seconds. A relative time difference between a time at which the first electronic device 100-1 is first activated and a time at which the third electronic device 100-3 is first activated is 1.5 seconds. In addition, a relative time difference between a time at which the first electronic device 100-1 is first activated and a time at which the third electronic device 100-3 determines the end of utterance is 2.6 seconds. Here, the third electronic device 100-3, which is to perform the final matching, may use the relative time information transmitted from the first electronic device 100-1 and the second electronic device 100-2 to yield a final recognition result.

Figure 24:
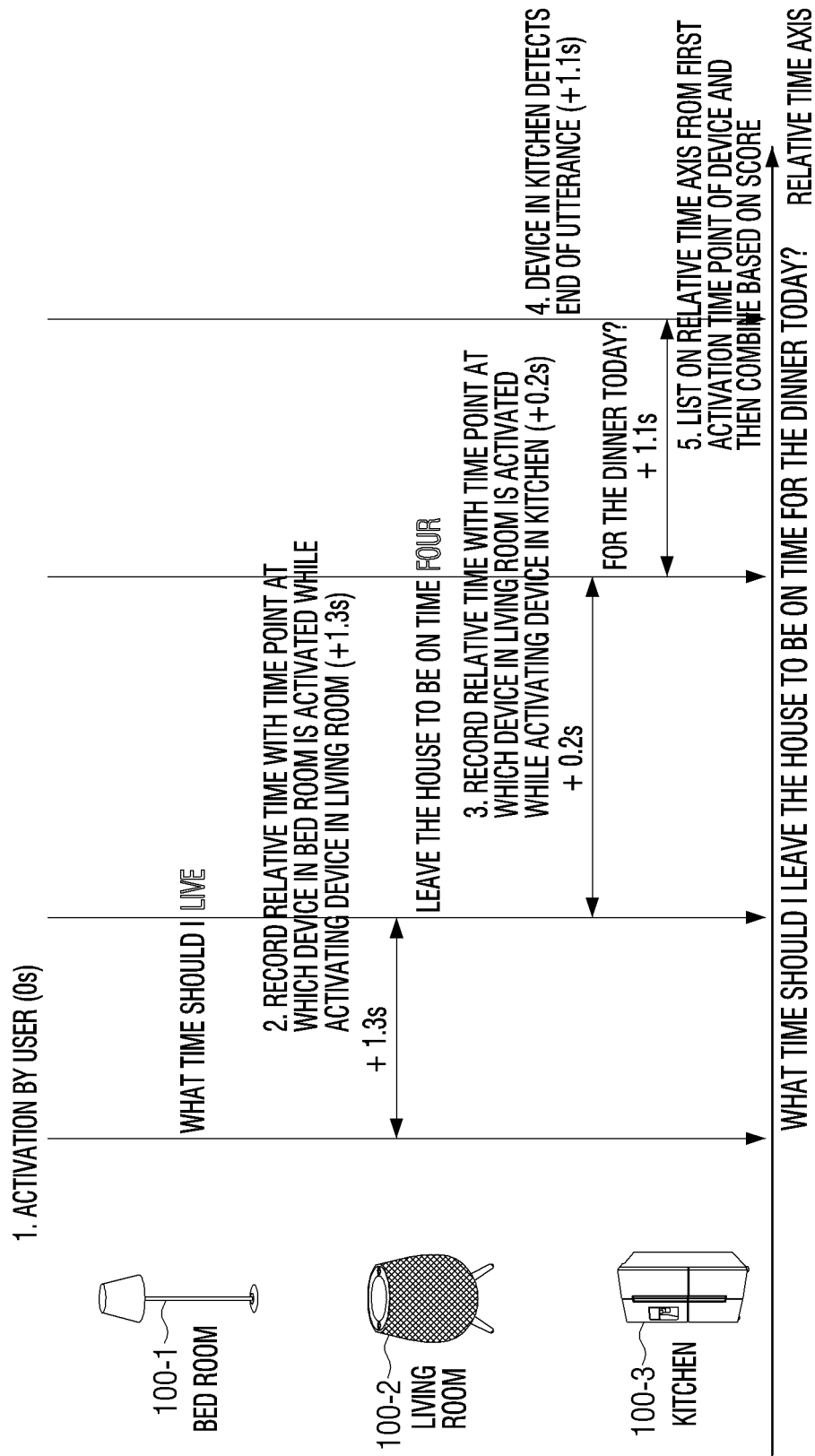

FIG. 24 is a diagram illustrating another example of coordinating the speech recognition information based on relative time information.

Referring to FIG. 24, each of the electronic devices 100-1, 100-2, and 100-3 may record a relative time with a time at which each of the electronic devices 100-1, 100-2, and 100-3 is activated while activating a speech recognition function of the other electronic device 100-3 and transmit the recorded relative time to a next electronic device, and such relative time information may be used for matching. When the time information is received by the device that performs the final matching, the device that performs the final matching may list and match the speech recognition information based on the time information to obtain the final recognition result.

Figure 25:
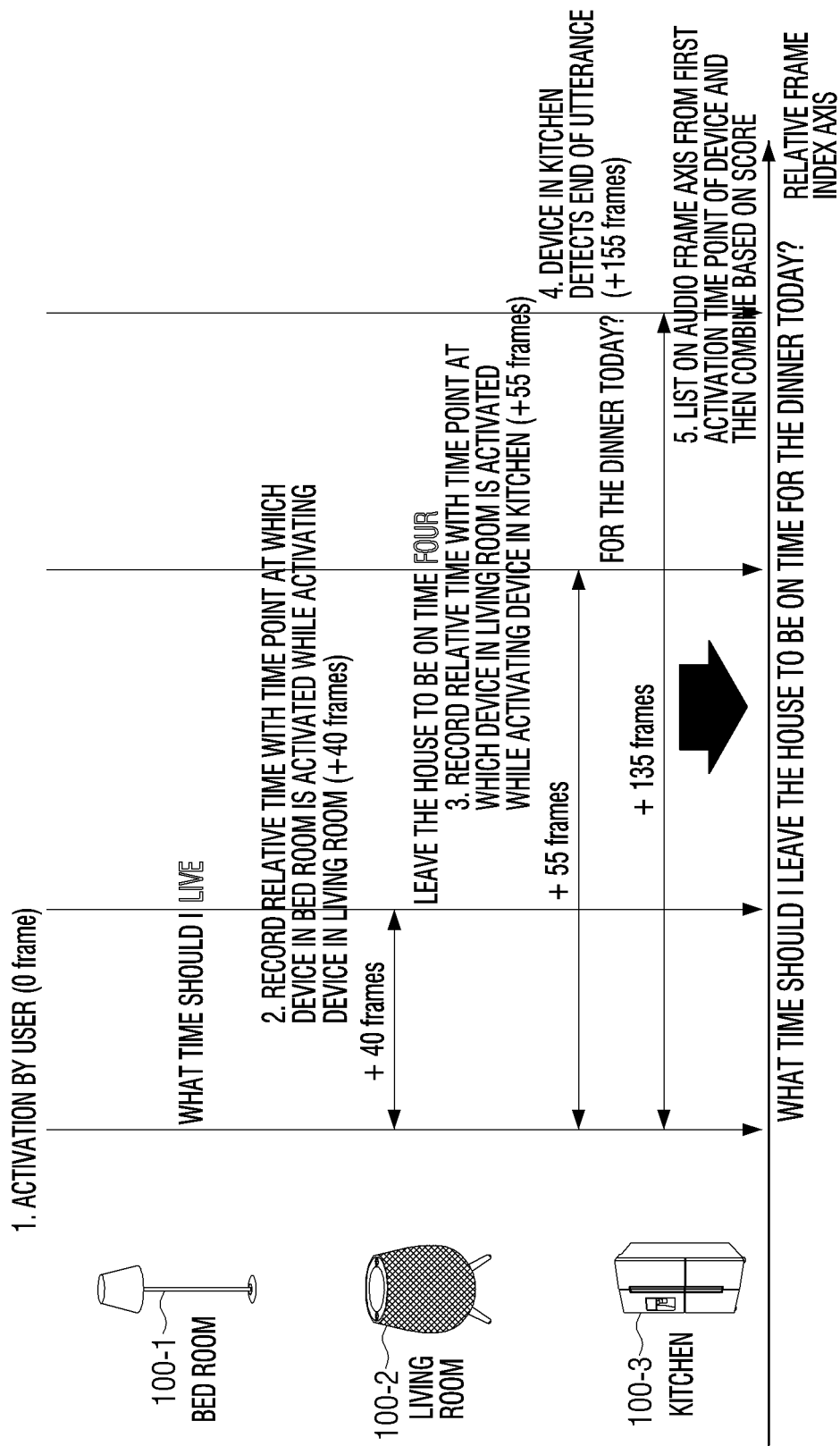

FIG. 25 is a diagram illustrating still another example of coordinating the speech recognition information in units of frames.

The frame is an interval unit for extracting feature information from an audio signal and is a unit of speech recognition. The frame may be a unit of sliding window. For example, one frame may be 25 ms or 10 ms. The embodiment of FIG. 25 is similar to FIG. 23, but uses frame units instead of time.

Referring back to FIG. 10, the task module 125 may analyze the text data received from the speech recognition module 122 to analyze meaning and perform a task suitable for the meaning. The task module 125 may use natural language processing (NLP) technology.

The task module 125 may identify a task to perform based on the analyzed meaning. Various types of tasks may be performed, such as playing a music, scheduling, making call, responding to inquiry, and the like. The task providing the response to the inquiry may be a task for controlling the electronic device 100 or the other device so that the task module 125 outputs a response "Today, you may expect some rain" in response to, for example, a user speech "What is the weather today?"

According to an embodiment, an artificial intelligence agent program for performing a task may be stored in the electronic device 100.

The artificial intelligence agent program may be a dedicated program for providing artificial intelligence (AI) based services (e.g., voice recognition service, secretary service, translation service, search service, etc.) and may be executed by a processor (e.g., CPU) or a separate AI dedicated processor (e.g., GPU or the like). The processor 110 may include at least one of the general purpose processor or the AI dedicated processor.

In particular, the artificial intelligence agent program may include a dialogue system capable of processing user inquiries and responses in natural language. The dialogue system may be configured to include the speech recognition module 122 and the task module 125.

Figure 14:
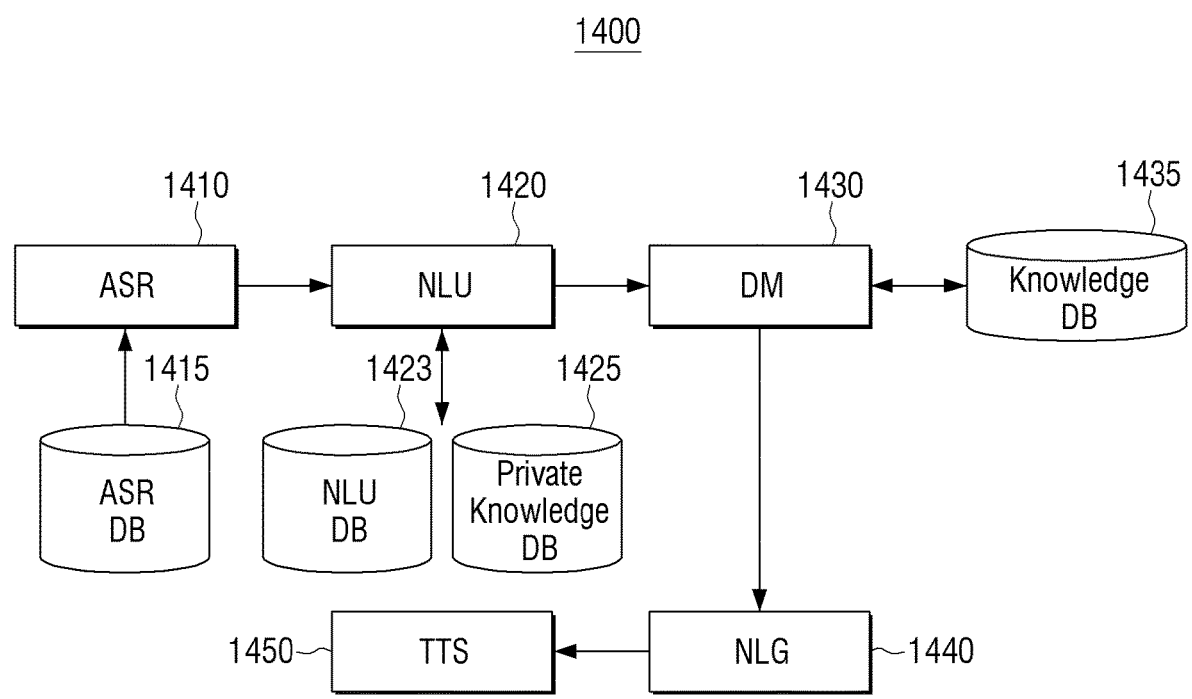
FIG. 14 is a block diagram illustrating a dialogue system of an artificial intelligence agent system according to an embodiment.

FIG. 14 is a block diagram illustrating a dialogue system according to an embodiment.

A dialogue system 1400 illustrated in FIG. 14 is a component for performing a conversation with a virtual AI agent through natural language. According to an embodiment, the dialogue system 1400 may be stored in the memory 120 of the electronic device 100. However, this is merely one example, and at least one of modules included in the dialogue system 1400 may be included in at least one external server.

As illustrated in FIG. 14, the dialogue system 1400 may include an automatic speech recognition (ASR) module 1410, a natural language understanding (NLU) module 1420, a dialogue manager (DM) module 1430, a natural language generator (NLG) module 1440, and a text-to-speech (TTS) module 1450. In addition, the dialogue system 1400 may further include a path planner module or an action planner module.

The automatic speech recognition (ASR) module 1410 may convert a user input received from electronic device 100 into text data. For example, the automatic speech recognition (ASR) module 1410 may include an utterance recognition module. The utterance recognition module may include an acoustic model and a language model. For example, the acoustic model may include information related to vocalization, and the language model may include unit phoneme information and information on a combination of unit phoneme information. The utterance recognition module may convert the user utterance into the text data by using information related to the vocalization and the unit phoneme information. The information on the acoustic model and the language model may be stored, for example, in an automatic speech recognition database (ASR DB) 1415.

The natural language understanding module 1420 may determine a user's intention by performing syntactic analysis or semantic analysis. The syntactic analysis may divide the user input into syntactic units (e.g., words, phrases, morphemes, etc.) and may determine what syntactic elements the divided units have. The semantic analysis may be performed by using a semantic matching, a rule matching, a formula matching, or the like. Accordingly, the natural language understanding module 1420 may obtain a domain, an intent, or a parameter (or slot) required to represent the intent of the user input.

The natural language understanding module 1420 may determine the intent and the parameter of the user by using a matching rule divided into the domain. For example, one domain (e.g., alarm) may include a plurality of intents (e.g., alarm setting, alarm clearing, etc.), and one intent may include a plurality of parameters (e.g., time, number of repetitions, alarm sound, etc.). A plurality of rules may include, for example, one or more requisite element parameters. The matching rule may be stored in the natural language understanding database (NLU DB) 1423.

The natural language understanding module 1420 may identify the meaning of a word extracted from the user input by using linguistic features (e.g., syntactic elements) such as morphemes and phrases, and determine the intent of the user by matching the identified meaning of the word with the domain and the intent. For example, the natural language understanding module 1420 may determine the intent of the user by calculating how much the word extracted from the user input is included in each domain and intent. According to an embodiment, the natural language understanding module 1420 may determine a parameter of the user input by using a word on which the natural language understanding module 1420 bases to identify the intent. According to an embodiment, the natural language understanding module 1420 may determine the intent of the user by using the natural language recognition database 1423 in which the linguistic features for identifying the intent of the user input are stored.

The natural language understanding module 1420 may understand the inquiry of the user by using a private knowledge DB 1425. The private knowledge DB 1425 may learn a relationship between knowledge information based on at least one of a user interaction input to the electronic device 100, a search history of the user, sensing information sensed by the electronic device 100, or user information received from an external device. In this case, the private knowledge DB 1425 may store the relationship between the knowledge information in the form of ontology.

When new knowledge information is added, the private knowledge DB 1425 may receive additional information of the new knowledge information from an external server and store the knowledge information and the additional information in the form of ontology. On the other hand, the private knowledge DB 1425 storing the knowledge information in the form of ontology is merely an example and the private knowledge DB 1425 may store the information in the form of a dataset.

The natural language understanding module 1420 may determine the intent of the user by using the private knowledge DB 1425. For example, the natural language understanding module 1420 may determine the intent of the user by using the user information (e.g., preferred phrase, preferred content, contact list, music list, etc.). According to an embodiment, in addition to the natural language understanding module 1420, the automatic speech recognition module 1410 may also recognize the speech of the user with reference to the private knowledge DB 1425.

The natural language understanding module 1420 may generate a path rule based on the intent and the parameter of the user input. For example, the natural language understanding module 1420 may select an application to be executed based on the intent of the user input and determine an operation to be performed in the selected app. The natural language understanding module 1420 may generate the path rule by determining a parameter corresponding to the determined operation. According to an embodiment, the path rule generated by the natural language understanding module 1420 may include information on an application to be executed, an operation to be executed in the app, and a parameter required to execute the operation.

The natural language understanding module 1420 may generate one path rule or a plurality of path rules based on the intent and the parameter of the user input. For example, the natural language understanding module 1420 may receive a path rule set corresponding to the electronic device 100 from the path planner module, and determine the path rule by mapping the intent and the parameter of the user input to the received path rule set. In this case, the path rule may include information on an operation for performing a function of an app or information on a parameter required for executing the operation. In addition, the path rule may include an operation order of the app. The electronic device may receive the path rule, select an app according to the path rule, and execute an operation included in the path rule in the selected app.

The natural language understanding module 1420 may generate one path rule or a plurality of path rules by determining an application to be executed, an operation to be executed in the app, and a parameter required to execute the operation based on the intent and the parameter of the user input. For example, the natural language understanding module 1420 may generate the path rule by arranging the app to be executed and the operation to be executed in the app in the form of ontology or graph model according to the intent of the user input using the information of the electronic device 100. The generated path rule may be stored in a path rule database through, for example, the path planner module. The generated path rule may be added to the path rule set of the natural language understanding database 1423.

The natural language understanding module 1420 may select at least one of the plurality of generated path rules. For example, the natural language understanding module 1420 may select an optimal path rule among the plurality of path rules. As another example, the natural language understanding module 1420 may select the plurality of path rules when only some of the operations are specified based on the user utterance. The natural language understanding module 1420 may determine one path rule among the plurality of path rules by an additional input of the user.

The dialogue manager module 1430 may determine whether the intent of the user identified by the natural language understanding module 1420 is clear. For example, the dialogue manager module 1430 may determine whether the intent of the user is clear based on the information of the parameter being sufficient. The dialogue manager module 1430 may determine whether the parameter identified by the natural language understanding module 1420 is sufficient to perform the task. According to an embodiment, when the intent of the user is not clear, the dialogue manager module 1430 may perform a feedback for requesting necessary information to the user. For example, the dialogue manager module 1430 may perform a feedback for requesting information on a parameter for identifying the intent of the user.

According to an embodiment, the dialogue manager module 1430 may include a content provider module. When the content provider module performs an operation based on the intent and the parameter identified by the natural language understanding module 1420, the content provider module may generate a result of performing the task corresponding to the user input.

According to another embodiment, the dialogue manager module 1430 may provide a response to the user inquiry using a knowledge database 1435. In this case, the knowledge database 1435 may be included in the electronic device 100, but this is merely an example and the knowledge database 1435 may be included in an external server.

The natural language generator module 1440 may change designated information into a text form. The information changed into the text form may be in the form of natural language utterance. The designated information may be, for example, information on an additional input, information for guiding completion of an operation corresponding to the user input, or information (e.g., feedback information for the user input) for guiding the additional input of the user. The information changed into the text form may be displayed on a display of the electronic device 100 or may be changed into a speech form by the text-to-speech (TTS) module 1450.

The text-to-speech module 1450 may change information in the text form into information in the speech form. The text-to-speech module 1450 may receive the information in the text form from the natural language understanding module 1440 and change the information in the text form into the speech form to output the information in the speech form to the speaker.

The automatic speech recognition module 1410 may be implemented as the speech recognition module 122 of FIG. 10, and the natural language understanding module 1420, the dialogue manager module 1430, the natural language generator module 1440, and the text-to-speech module 1450 may be implemented as the task module 125 of FIG. 10.

On the other hand, at least one of the modules 121, 122, 123, and 124 of FIG. 10 may be provided in the external device, instead of the electronic device 100. In this case, the electronic device 100 may request the other device to perform a function of the corresponding module.

The communicator 130 may be connected to a network through, for example, wireless communication or wired communication to communicate with an external device. The wireless communication, which is, for example, a cellular communication protocol, may use at least one of long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). In addition, the wireless communication may include, for example, short range communication. The short range communication may include at least one of, for example, wireless fidelity (WiFi) direct, Bluetooth, near field communication (NFC), or Zig-bee. The wired communication may include at least one of, for example, universal serial bus (USB), high definition multimedia interface (HDMI), recommended standard 232 (RS-232), or plain old telephone service (POTS). The network may include at least one of communication networks such as a computer network (for example, a local area network (LAN) or a wide area network (WAN)), the Internet, and a telephone network.

The microphone 140 is a component for receiving sound. The microphone 140 may convert the received sound into an electrical signal. The microphone 140 may be implemented integrally with the electronic device 100 or be separated from the electronic device 100. The separated microphone 140 may be electrically connected to the electronic device 100. A plurality of microphones 140 may be provided. The movement direction of the user may be detected by using the plurality of microphones.

The processor 110 may perform various functions by executing computer executable instructions stored in the memory 120.

According to an embodiment, the processor 110 may obtain the user speech including a predetermined trigger word through the microphone 140, activate the speech recognition function of the electronic device 100 based on the trigger word included in the user speech, detect the event in which the user moves while the speech recognition function is activated, and control the communicator 130 to transmit the control signal for activating the speech recognition function of the other electronic device based on the detected event to the other electronic device, by executing the computer executable instructions stored in the memory 120.

In addition, the electronic device 100 may include a user input receiver. The user input receiver may receive various user inputs, for example, a touch input, a motion input, a button manipulation, and the like. For example, the user input receiver may include a button, a touch panel, and the like. In addition, the electronic device 100 may further include a display for displaying various information. The display may include, for example, a light-emitting diode (LED), a liquid crystal display (LCD), or the like. In addition, the electronic device 100 may further include a camera. An image captured by the camera may be used to determine the movement direction of the user or to attenuate the noise coming into the microphone 140. In addition, the electronic device 100 may further include a speaker. A response feedback to the user inquiry may be provided through the speaker.

Figure 11:
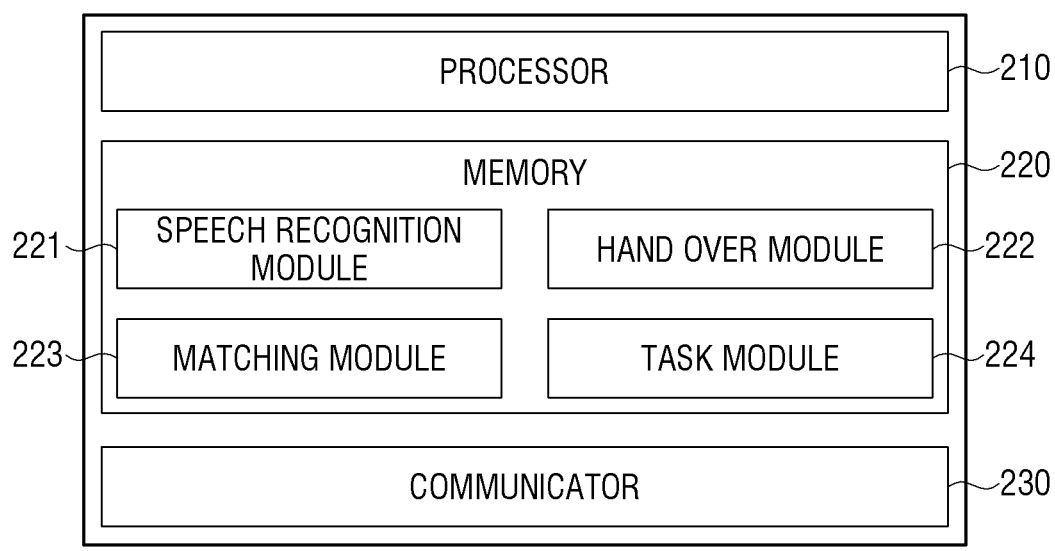
FIG. 11 is a block diagram illustrating a configuration of a hub device according to an embodiment.

FIG. 11 is a diagram illustrating a configuration of the hub device 200 according to an embodiment.

Referring to FIG. 11, the hub device 200 may include a processor 210, a memory 220, and a communicator 230.

The processor 210 is a component for controlling an overall operation of the hub device 200. For example, the processor 210 may drive an operating system or an application to control a plurality of hardware or software components connected to the processor 210, and may perform various kinds of data processing and operations. The processor 210 may be a central processing unit (CPU) or graphics-processing unit (GPU) or both. The processor 210 may be implemented as at least one general processor, a digital signal processor, an application specific integrated circuit (ASIC), a system on chip (SoC), a microcomputer (MICOM), or the like.

The memory 220 may include an internal memory or an external memory. The memory 220 is accessed by the processor 210, and readout, writing, correction, deletion, update, and the like of data in the memory 220 may be performed by the processor 210.

The memory 220 may include software and/or firmware configured as one or more modules. The module may correspond to a set of computer executable instructions.

The memory 220 may include a speech recognition module 221, a hand over module 222, a matching module 223, and a task module 224. The modules 221, 222, 223, and 224 may be executed by the processor 210 to perform various functions.

The speech recognition module 221 may perform the same function as that of the speech recognition module 122 described above.

In particular, when the speech recognition information to which the language model or the acoustic model is not applied is received from the electronic device 100 through the communicator 230, the speech recognition module 221 may obtain a final recognition result by applying the language model or the acoustic model to the received speech recognition information.

The hand over module 222 may perform the same function as that of the hand over module 123 described above.

In particular, the hand over module 222 may detect the user movement and determine which of the electronic devices 100 to hand over the speech recognition job. For example, the hand over module 222 may receive user movement information obtained from the electronic devices 100 or the other device, and detect the user movement based on the received user movement information. Alternatively, the hub device 200 may itself have a configuration (e.g., a plurality of microphones, cameras, etc.) capable of detecting the movement of the user.

The matching module 223 may perform the same function as that of the matching module 124 described above. For example, the matching module 223 may match the speech recognition information received from the electronic devices 100 in chronological order to obtain a final recognition result.

The task module 224 may perform the same function as that of the task module 125 described above. For example, the task module 224 may perform a task of transmitting a specific control signal to at least one of the electronic devices 100 based on the final recognition result. For example, when the final recognition result is "What is the weather today?", the task module 224 may perform a task of transmitting a control signal of outputting a speech response of "the weather is sunny today" to the electronic device 100.

On the other hand, the hub device 200 may further include the trigger word module 121 as described in FIG. 10. For example, the hub device 200 may receive an audio signal corresponding to the user speech from the electronic devices 100 to detect the trigger word in the audio signal, and may transmit a control signal for activating the speech recognition function to the electronic device 100 that has transmitted the corresponding audio signal when the trigger word is detected.

At least one of the modules 221, 222, 223, and 224 of FIG. 11 may be provided in the external device, instead of the hub device 200. In this case, the hub device 200 may request the other device to perform a function of the corresponding module.

The communicator 230 may be connected to a network through, for example, wireless communication or wired communication to communicate with an external device. The wireless communication, which is, for example, a cellular communication protocol, may use at least one of long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). In addition, the wireless communication may include, for example, short range communication. The short range communication may include at least one of, for example, wireless fidelity (WiFi) direct, Bluetooth, near field communication (NFC), or Zigbee. The wired communication may include at least one of, for example, universal serial bus (USB), high definition multimedia interface (HDMI), recommended standard 232 (RS-232), or plain old telephone service (POTS). The network may include at least one of communication networks such as a computer network (for example, a local area network (LAN) or a wide area network (WAN)), the Internet, and a telephone network.

The processor 210 may perform various functions by executing computer executable instructions stored in the memory 220.

According to an embodiment, the processor 210 may receive speech recognition information through the communicator 230 from the first electronic device of which speech recognition function is activated based on the user speech including the predetermined trigger word, detect an event in which a user using the first electronic device moves, control the communicator 230 to transmit a control signal for activating a speech recognition function of the second electronic device to the second electronic device based on the detected event, receive the speech recognition information through the communicator 230 from the second electronic device, and control the communicator 230 to transmit the control signal to one of the first and second electronic devices based on the speech recognition information received from the first and second electronic devices, by executing the computer executable instructions stored in the memory 220.

In addition, the hub device 200 may include a user input receiver. The user input receiver may receive various user inputs, for example, a touch input, a motion input, a button manipulation, and the like. For example, the user input receiver may include a button, a touch panel, and the like. In addition, the hub device 200 may further include a display for displaying various information. The display may include, for example, a light-emitting diode (LED), a liquid crystal display (LCD), or the like. In addition, the hub device 200 may include at least one microphone. The hub device 200 may recognize the user speech received through the microphone to perform an operation corresponding to the user speech, and may detect the movement direction of the user by using a plurality of microphones. In addition, the hub device 200 may further include a camera. An image captured by the camera may be used to determine the movement direction of the user or to attenuate the noise. In addition, the hub device 200 may further include a speaker. A response feedback to the user inquiry may be provided through the speaker.

Figure 12:
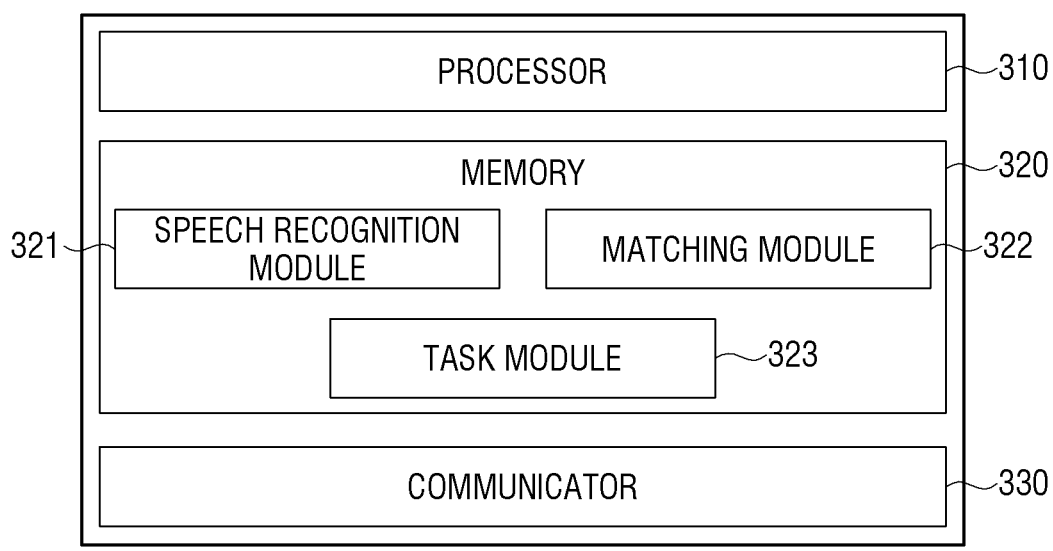
FIG. 12 is a block diagram illustrating a configuration of a server according to an embodiment.

FIG. 12 is a diagram illustrating a configuration of the server 300 according to an embodiment.

Referring to FIG. 12, the server 300 may include a processor 310, a memory 320, and a communicator 330.

The processor 310 is a component for controlling an overall operation of the server 300. For example, the processor 310 may drive an operating system or an application to control a plurality of hardware or software components connected to the processor 310, and may perform various kinds of data processing and operations. The processor 310 may be a central processing unit (CPU) or graphics-processing unit (GPU) or both. The processor 310 may be implemented as at least one general processor, a digital signal processor, an application specific integrated circuit (ASIC), a system on chip (SoC), a microcomputer (MICOM), or the like.

The memory 320 may include an internal memory or an external memory. The memory 320 is accessed by the processor 310, and readout, writing, correction, deletion, update, and the like of data in the memory 320 may be performed by the processor 310.

The memory 320 may include software and/or firmware configured as one or more modules. The module may correspond to a set of computer executable instructions.

The memory 320 may include a speech recognition module 321, a matching module 322, and a task module 323. The modules 321, 322, and 323 may be executed by the processor 310 to perform various functions.

The speech recognition module 321 may perform the same function as that of the speech recognition module 122 described above.

In particular, when the speech recognition information to which the language model or the acoustic model is not applied is received through the communicator 330 from the electronic device 100 or the hub device 200, the speech recognition module 321 may obtain a final recognition result by applying the language model or the acoustic model to the received speech recognition information.

The task module 323 may perform the same function as that of the task module 125 described above. For example, the task module 323 may perform a task of transmitting a specific control signal to at least one of the electronic devices 100 based on the final recognition result. For example, when the final recognition result is "What is the weather today?", task module 323 may perform a task of transmitting a control signal of outputting a speech response of "the weather is sunny today" to the electronic device 100.

On the other hand, the server 300 may further include the trigger word module 121 as described in FIG. 10. For example, the server 300 may receive an audio signal corresponding to the user speech from the electronic devices 100 to detect the trigger word in the audio signal by using the trigger word module 121, and may transmit a control signal for activating the speech recognition function to the electronic device 100 that has transmitted the corresponding audio signal when the trigger word is detected.

On the other hand, the server 300 may further include the hand over module 123 as described in FIG. 10. For example, the server 300 may receive user movement information obtained from the electronic devices 100 or the other device by using the hand over module 123, and hand over the speech recognition job to the electronic device 100 which is in the movement direction of the user based on the user movement information.

On the other hand, at least one of the modules 321, 322, and 323 of FIG. 12 may be provided in the external device, instead of the server 300. In this case, the server 300 may request the other device to perform a function of the corresponding module.

The communicator 330 may be connected to a network through, for example, wireless communication or wired communication to communicate with an external device. The wireless communication, which is, for example, a cellular communication protocol, may use at least one of long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). In addition, the wireless communication may include, for example, short range communication. The short range communication may include at least one of, for example, wireless fidelity (WiFi) direct, Bluetooth, near field communication (NFC), or Zigbee. The wired communication may include at least one of, for example, universal serial bus (USB), high definition multimedia interface (HDMI), recommended standard 232 (RS-232), or plain old telephone service (POTS). The network may include at least one of communication networks such as a computer network (for example, a local area network (LAN) or a wide area network (WAN)), the Internet, and a telephone network.

The processor 310 may perform various functions by executing computer executable instructions stored in the memory 320.

According to an embodiment, the processor 310 may receive speech recognition information through the communicator 330 from the first electronic device of which speech recognition function is activated based on the user speech including the predetermined trigger word, detect movement of a user using the first electronic device, control the communicator 330 to transmit a control signal for activating a speech recognition function of the second electronic device to the second electronic device based on the detected movement, receive the speech recognition information through the communicator 330 from the second electronic device, and control the communicator 330 to transmit the control signal to one of the first and second electronic devices based on the speech recognition information received from the first and second electronic devices, by executing the computer executable instructions stored in the memory 320.

FIGS. 15 to 17 are diagrams illustrating various embodiments related to the use of an acoustic model and a language model in the speech recognition system.

FIG. 15 is a diagram illustrating various embodiments related to the use of an acoustic model and a language model in the speech recognition system 2000.

The speech recognition system may include a plurality of electronic devices 100 and a server 300. Here, the symbols "O" and "X" indicate whether or not the acoustic model AM and the language model LM are provided.

According to an example 1.1, the electronic device 100 does not include the acoustic model and the language model. In contrast, the server 300 includes the acoustic model and the language model. Therefore, the speech recognition information to which the acoustic model and the language model are not applied, that is, the audio signal itself or the feature information extracted from the audio signal, may be transmitted to the server 300, and the server 300 may perform the speech recognition by applying the acoustic model and the language model. Accordingly, an operational burden of the speech recognition in the electronic device 100 may be reduced.

According to an example 1.2, the electronic device 100 may transmit the speech recognition information to which the acoustic model is applied to the server 300. In addition, the server 300 may perform the speech recognition by applying the language model.

According to an example 1.4, the electronic device 100 may receive the speech recognition information to which the acoustic model is applied from the other device, and apply the language model.

In addition, the server 300 may perform the speech recognition by applying the language model and/or the acoustic model not applied by the electronic device 100 to the speech recognition information. Accordingly, an operational burden may be reduced because the electronic device 100 performs only some of the processes for speech recognition. In addition, comparing the example 1.1 with the example 1.2 and the example 1.4, in the example 1.1, the electronic devices 100 may simply transmit the audio signal or feature information to the server 300. However, a speech recognition performance may be deteriorated because, here, the speech recognition proceeds by simply connecting the speeches in the server 300 while differences in recording characteristics of the electronic devices 100 are ignored. For example, when the electronic device 100 is a refrigerator, it may be preferable to use an acoustic model and a language model learned in consideration of noise generated in the refrigerator itself. As such, an acoustic model and a language model specialized for the situation of each electronic device may be stored for each of the electronic devices 100. Therefore, when the electronic device 100 applies at least one of the acoustic model or the language model to generate the speech recognition information and transmits the speech recognition information to the server 300, a final speech recognition performance at the server 300 may be improved.

On the other hand, in case of the example 1.1, when the electronic device 100 implemented as the refrigerator transmits the audio signal or the feature information to the server 300, the server 300 may also transmit information requesting to apply a language model and an acoustic model suitable for the refrigerator.

An example 1.3 corresponds to a case in which both the acoustic model and the language model are included in the electronic device 100 and it is possible to apply at least one of the acoustic model and the language model to the speech recognition information and transmit the speech recognition information to the server 300.

FIG. 16 is a diagram illustrating various embodiments related to the use of an acoustic model and a language model in the speech recognition system 3000. The speech recognition system 3000 may include a plurality of electronic devices 100 and a hub device 200.

Examples 2.1 to 2.4 of FIG. 16 are similar to the examples 1.1 to 1.4 described above with reference to FIG. 15, and thus descriptions thereof will be omitted.

FIG. 17 is a diagram illustrating various embodiments related to the use of an acoustic model and a language model in the speech recognition system 4000. The speech recognition system 4000 may include a plurality of electronic devices 100, a hub device 200, and a server 300.

Examples 3.1 to 3.16 of FIG. 17 are similar to the examples 1.1 to 1.4 described above with reference to FIG. 15, except that the hub device 200 is further included.

According to examples of FIG. 17, the speech recognition information may be transmitted from the electronic devices 100 to the hub device 200, and from the hub device 200 to the server 300. Here, the speech recognition information may be handed over to the next device regardless of the acoustic model and the language model being applied, depending on a capability of each of the devices. In particular, in case of embodiments 3.5 to 3.12, the acoustic model or the language model specialized for recording characteristics of the electronic devices 100 may be applied while reducing the operational burden in speech recognition in the electronic devices 100, and thus, the speech recognition performance may be improved.

On the other hand, even in the speech recognition system 1000 including the electronic devices 100, some devices may use only the acoustic model and some devices may use only the language model. In this case, when a specific electronic device transmits the speech recognition information to which only the acoustic model is applied to the other electronic device, the other electronic device may apply the language model to the speech recognition information to obtain a final recognition result.

When the electronic devices 100 and the hub device 200 transmit the speech recognition information to the other device, information indicating whether the speech recognition information is processed by one of or combination of the acoustic model and language model may also be transmitted. That is, for example, when the electronic device 100 transmits the speech recognition information to the hub device 200, information indicating that the speech recognition information is information to which only the acoustic model is applied may also be transmitted.

In the foregoing embodiments, a case in which one user utters the speech while moving around the electronic devices 100 has been described. Similarly, even in a case in which a plurality of users move around the electronic devices 100 and utter the speech, the speech recognition may be performed according to the foregoing embodiments. However, in this case, speeches of the plurality of users may be simultaneously input to one electronic device 100. Therefore, in order to distinguish the speeches of the plurality of users, user information may need to be transferred together when handing over the speech recognition job.

According to an embodiment, the first electronic device 100-1 may activate the speech recognition function by the user speech including the trigger word, and obtain the user information based on a feature of the user speech. Here, the user information, which is information for identifying the user based on the characteristics of the speech, may be speech feature information. Specifically, the user information may include information for automatically determining who is the speaker of a received speech signal by analyzing a unique characteristic of the user who uttered a sound signal based on the received speech signal. In other words, the speech recognition may analyze characteristics of a sound signal and identify a user based on the analyzed characteristics of the received sound signal. For example, when a user movement is detected during which the speech recognition function is activated, the first electronic device 100-1 may transmit the obtained user information as well as a control signal for activating the speech recognition function to the second electronic device 100-2 which is in the movement direction of the user. In this case, the transmitted user information may be feature information obtained from the speech signal or profile information, such as an ID of a user, a name of a user, and the like. In addition, when the second electronic device 100-2 receives the a plurality of user speeches through the microphone 140 after the speech recognition function is activated by the control signal received from the first electronic device 100-1, the second electronic device 100-2 may identify a user speech corresponding to the user information received from the first electronic device 100-1 among the plurality of user speeches, and perform speech recognition on the identified user speech. In addition, the second electronic device 100-2 may identify a user speech corresponding to the user information received from the third electronic device 100-3, and perform speech recognition on the identified user speech. Accordingly, each of the plurality of user speeches may be processed. This will be further described with reference to FIG. 26.

Figure 26:
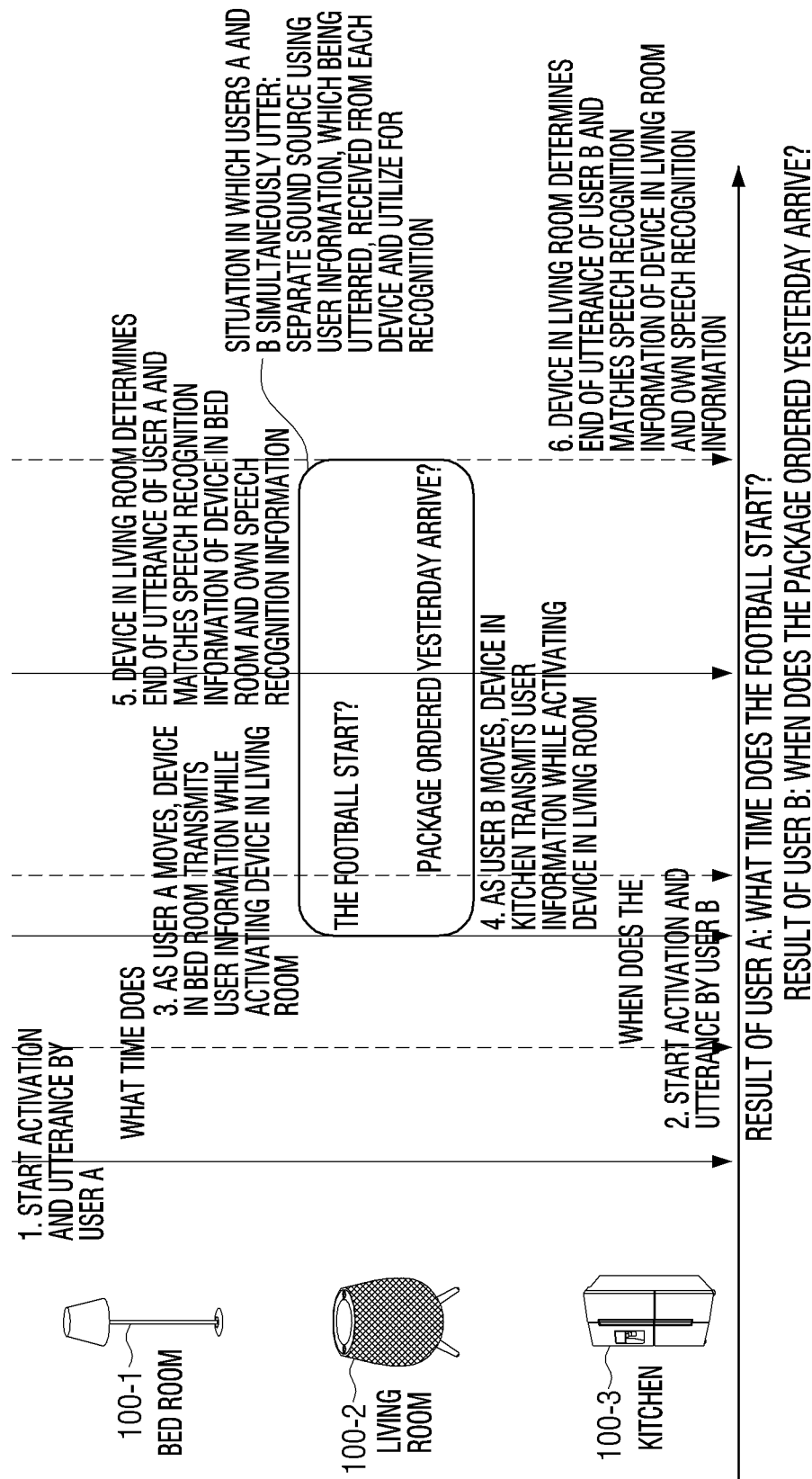
FIG. 26 is a diagram illustrating an embodiment performing speech recognition through a plurality of electronic devices in a situation in which a plurality of users utter.

FIG. 26 is a diagram illustrating an embodiment performing speech recognition through a plurality of electronic devices 100 when a plurality of users exist.

Referring to FIG. 26, a user A utters "What time does the football start this evening" while moving from a bedroom to a living room, and a user B utters "when does the package ordered yesterday arrive?" while moving from a kitchen to the living room.

As the first electronic device 100-1 in the bedroom activates the speech recognition function by the user A and the user A moves to the living room, the first electronic device 100-1 also transmits user information on the user A while activating the second electronic device 100-2 in the living room.

As the third electronic device 100-3 in the kitchen activates the speech recognition function by the user B and the user B moves to the living room, the third electronic device 100-3 also transmits user information on the user B while activating the second electronic device 100-2 in the living room.

In the second electronic device 100-2 in the living room, a situation in which speeches are simultaneously input from the user A and the user B may occur. In this case, the second electronic device 100-2 may identify the speech of the user A and identify the speech of the user B based on the received user information on the user A and the received user information on the user B received from the first electronic device 100-1 and the third electronic device 100-3, respectively. For example, the second electronic device 100-2 may separate an audio signal corresponding to the user information on the user A and an audio signal corresponding to the user information on the user B from the received audio signal.

For example, the electronic device 100-2 may separate a sound source corresponding to the user A and a sound source corresponding to the user B from the audio signal by using an independent component analysis technique. Here, the sound sources may be separated using the directions of the user A and the user B. The direction of each user A and user B may be identified using two or more microphones provided in the second electronic device 100-2 or using a camera provided in the second electronic device 100-2.

Therefore, the second electronic device 100-2 may individually perform recognition for each user.

Furthermore, the second electronic device 100-2 may generate speech recognition information for the user A and speech recognition information for the user B, respectively. The second electronic device 100-2 may receive the speech recognition information on the user A from the first electronic device 100-1, and match the speech recognition information on the user A generated by the second electronic device 100-2 with the received speech recognition information on the user A to obtain a first final recognition result. In addition, the second electronic device 100-2 may receive the speech recognition information on the user B from the third electronic device 100-3, and match the speech recognition information on the user B generated by the second electronic device 100-2 with the received speech recognition information on the user B to obtain a second final recognition result.

The second electronic device 100-2 may provide a feedback based on the first final recognition result for the user A. For example, the second electronic device 100-2 may output a speech response "This evening football starts at 9 o'clock" through the speaker. In addition, the second electronic device 100-2 may provide a feedback based on the second final recognition result of the user B. For example, the second electronic device 100-2 may output a speech response "The package ordered yesterday will ship tomorrow" through the speaker.

Accordingly, even in a situation in which several users utter speeches while moving around, each user speech may be processed separately.

In addition, even when a plurality of users simultaneously utter, the acoustic model and the language model may be selectively used in each device, as in the embodiments described with reference to FIGS. 15 to 17.

On the other hand, in the embodiments described above, only a single-turn scenario in which the user asks a question and immediately receives a response has been described, but the embodiments may also be applied to a multi-turn scenario.

Figure 27:
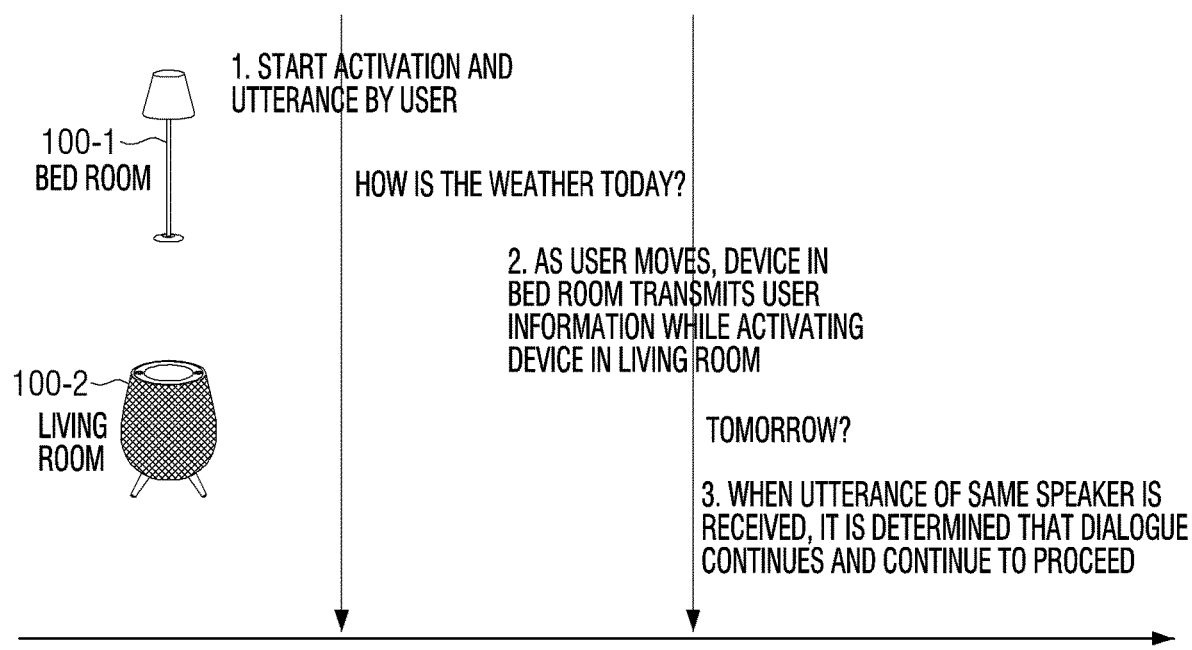
FIG. 27 is a diagram illustrating an embodiment related to a response provision of a multi-turn scheme.

For example, referring to FIG. 27, after the user ends a first utterance "what is the weather today?" in the first electronic device 100-1, the first electronic device 100-1 may provide a response such as "the weather is sunny today." In addition, when the user utters "tomorrow?" in the second electronic device 100-2 within a specific time after the end of the first utterance, the second electronic device 100-2 may provide a response "it will rain tomorrow" with reference to the first utterance "what is the weather today?", input to the first electronic device 100-1.

Here, the first electronic device 100-1 may also transmit user information and context information of the user speech when handing over the voice recognition job to the second electronic device 100-2. The context information may refer to information on the subject and category of the dialogue. For example, the context information on 'what is the weather today?' may include information such as 'weather' and 'inquiry'. With reference to the user information and the context information received from the first electronic device 100-1, it may be determined that the dialogue continues, and may assess the previous dialogue to provide an appropriate next response. For example, the second electronic device 100-2 may check whether a speech corresponding to the user information received from the first electronic device 100-1 is received within a predetermined time from a time at which the first utterance is ended in the first electronic device 100-1, and may provide a response based on context information for the corresponding speech when the corresponding speech is received.

In addition, even in the embodiment of the multi-turn as described above, the acoustic model and the language model may be selectively used in each device, as in the embodiments described with reference to FIGS. 15 to 17.

Although it is described that the speech recognition job may be handed over to the other device when the event in which the user moves is detected, the speech recognition job may be handed over when it is determined that it is appropriate for the other device continues to perform the speech recognition in addition to the event in which the user moves.

According to an embodiment, when it is determined that the sound input includes a noise higher than a predetermined level, the electronic device 100 may transmit a control signal for activating the speech recognition function to the other electronic device. Here, embodiments will be described with reference to FIG. 28.

Figure 28:
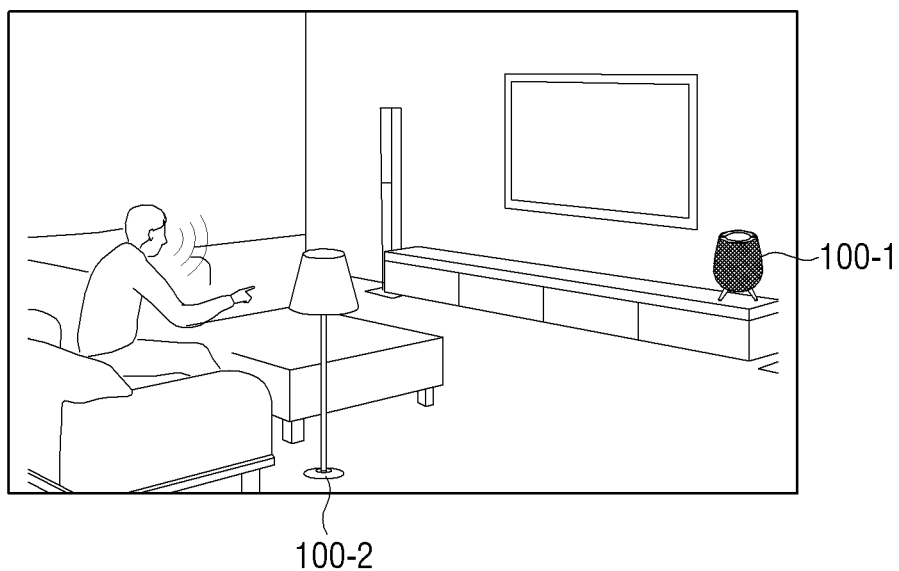
FIGS. 28 and 29 are diagrams illustrating situations in which handover of speech recognition occurs, according to various embodiments.

FIG. 28 is a diagram illustrating a scenario in which handover of a speech recognition job occurs according to an embodiment.

Referring to FIG. 28, a TV is next to the first electronic device 100-1 and is turned on while the user utters a trigger word and the speech recognition function of the first electronic device 100-1 is activated. When the first electronic device 100-1 detects that the user's words are not easily recognized due to the sound from the TV, the first electronic device 100-1 may select a device to which the speech recognition job may be handed over, so that the selected device is closer to a location at which the user is located, or to the other peripheral devices. When the second electronic device 100-2 is selected as the device to which the speech recognition job is to be handed over, the first electronic device 100-1 may transmit a control signal for activating the speech recognition function to the second electronic device 100-2. Then, the second electronic device 100-2 may continue to perform the speech recognition.

Figure 29:
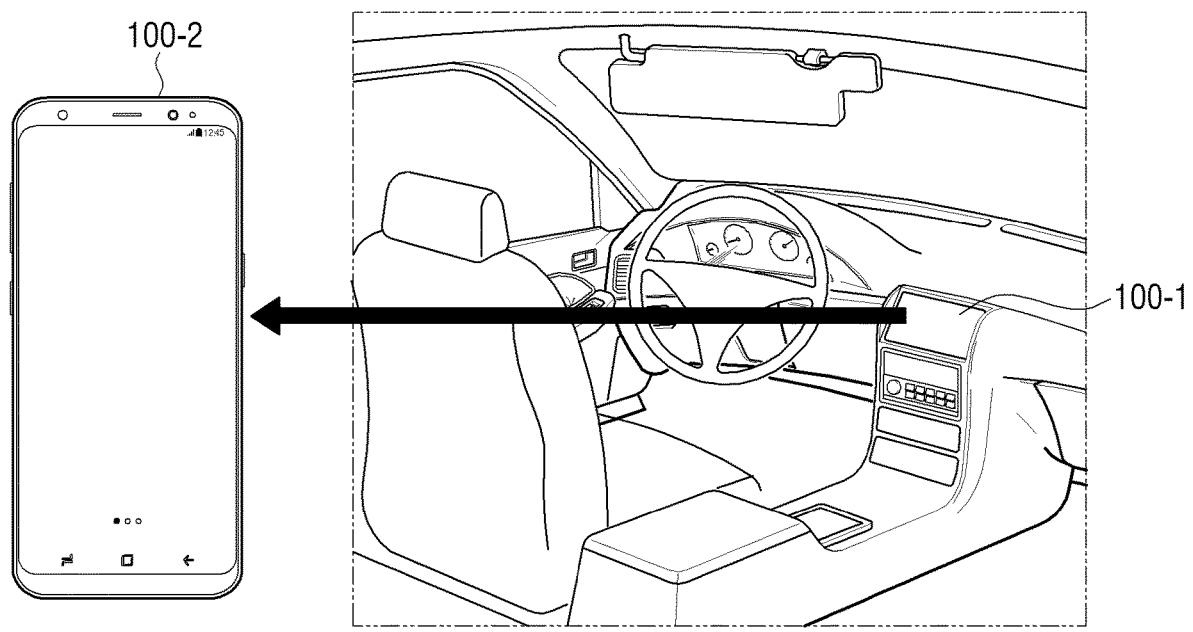

FIG. 29 is a diagram illustrating a scenario in which handover of a speech recognition job occurs according to another embodiment.

In FIG. 29, electronic devices 100 are implemented as a navigation 100-1 and a mobile device 100-2.

In a situation in which the user is getting out of the vehicle or parking, the user may utter to the navigation 100-1 "Bixby, please text Hong Gil Dong to reserve 6 seats at Yangjae Station Hawpo Restaurant at 5 o'clock today", and the navigation 100-1 may recognize the triggering word "Bixby" and may start the speech recognition. However, in certain situations, the navigation 100-1 may not be a reliable device because the power of the navigation 100-1 may be turned off when the vehicle is turned off, and therefore, the navigation 100-1 may need to hand over the speech recognition job to the mobile device 100-2 before the vehicle is turned off. Accordingly, for example, when a speed of the vehicle is lower than a predetermined speed and a backward driving is detected, the navigation 100-1 may determine that the vehicle is in a parking mode and hand over the speech recognition job to the mobile device 100-2. As such, the navigation 100-1 may transmit speech recognition information to the mobile device 100-2. Further, the navigation 100-1 may also transmit user information and additional information, such as time information, recording characteristics, information on a speech recognition progress status, and the like, for matching.

Therefore, after the user gets out of the vehicle, the speech recognition may continue, and when the utterance ends, the mobile device 100-2 may match the speech recognition information received from the navigation 100-1 with speech recognition information detected by the mobile device 100-2 to obtain a final speech recognition result, and may perform a task based on the final speech recognition result.

On the other hand, it is also possible to hand over the speech recognition job to peripheral devices by taking into account a battery status of the device. That is, when the battery of the device remains below a predetermined battery life, the speech recognition job may be handed over to the other device with the longer battery life.

Figure 30:
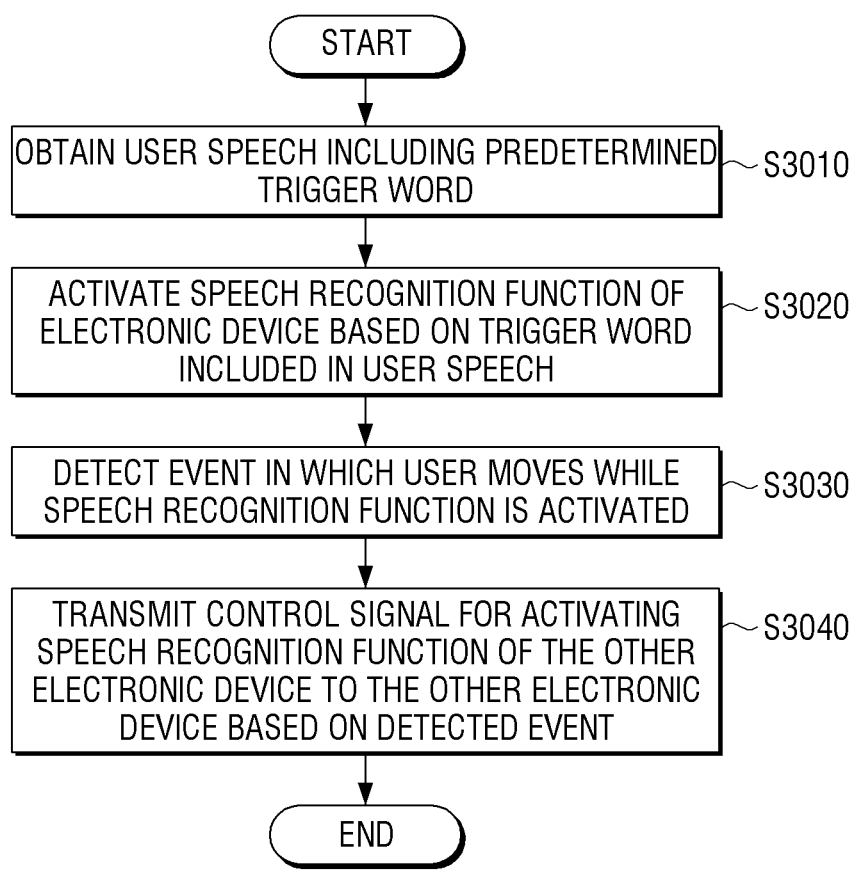
FIG. 30 is a flowchart illustrating a method for controlling an electronic device according to an embodiment of the disclosure.

FIG. 30 is a flowchart illustrating a method for controlling an electronic device according to an embodiment.

Referring to FIG. 30, the electronic device 100 may obtain a user speech including a predetermined trigger word through a microphone of the electronic device 100 (S3010). Based on determining that the user speech includes the predetermined trigger word, the electronic device 100 may activate a speech recognition function of the electronic device 100 (S3020). Further, the electronic device 100 may detect an event in which the user moves while the speech recognition function is activated (S3030). Thereafter, the electronic device 100 may transmit a control signal for activating the speech recognition function of the other electronic device to the other electronic device based on the detected event (S3040).

In S3030, the electronic device 100 may detect the event in which the user moves based on a signal of the user speech obtained through the microphone after the speech recognition function is activated. On the other hand, the event may be detected based on the signal of the speech obtained through the microphone, but may also be detected by using other sensors such as a camera and the like.

In S3040, the electronic device 100 may transmit the control signal using pre-stored information about a plurality of other electronic devices that may receive the speech. For example, when the event in which the user moves is detected, the electronic device 100 may obtain movement information of the user, identify the other electronic device which is closest to the user among the plurality of other electronic device based on the movement information of the user, and transmit the control signal to the identified other electronic device.

On the other hand, the method for controlling the electronic device 100 may further include an operation of obtaining first speech recognition information by performing speech recognition on the user speech obtained through the microphone, an operation of receiving second speech recognition information from the other electronic device receiving the control signal, and an operation of obtaining a final recognition result based on the first speech recognition information and the second speech recognition information.

In this case, time information including a time at which the control signal is transmitted to the other electronic device may be obtained, and the first speech recognition information and the second speech recognition information may be matched based on the obtained time information to obtain the final recognition result. Here, the obtained time information may include information on an absolute time at which the control signal is transmitted or information on a relative time at which the control signal is transmitted to the other electronic device based on a time at which the speech recognition function of the electronic device 100 is activated.

In addition, the electronic device 100 may apply a language model, which may be stored in advance in the electronic device, to the second speech recognition information to obtain the final recognition result when the second speech recognition information received from the other electronic device is speech recognition information to which the acoustic model is applied, but the language model is not applied. The electronic device 100 may apply an acoustic model and a language model, which may be stored in advance in the electronic device, to the second speech recognition information to obtain the final recognition result when the second speech recognition information received from the other electronic device is speech recognition information to which both the acoustic model and the language model are not applied.

Furthermore, the electronic device 100 may transmit a control signal for providing a feedback on the final recognition result to the other electronic device to the other electronic device.

Alternatively, when a second control signal for activating the speech recognition function of the electronic device 100 is received from the other electronic device, the electronic device 100 may activate the speech recognition function of the electronic device 100.

In this case, the electronic device 100 may receive user information from the other electronic device, identify a user speech corresponding to the user information received from the other electronic device among a plurality of user speeches when the plurality of user speeches are received through the microphone after the speech recognition function is activated by the second control signal, and perform speech recognition on the identified user speech.

On the other hand, the electronic device 100 may perform the speech recognition on the speech received through the microphone until the utterance of the user ends after the speech recognition function is activated by the second control signal to obtain speech recognition information, and may transmit the obtained speech recognition information to the other electronic device.

Furthermore, when the second control signal and information on a second user are received from the other electronic device in a state in which a speech of a first user including the predetermined trigger word is received through the microphone and the speech recognition function is activated, the electronic device 100 may process the speech of the first user and the speech of the second user, respectively, obtained through the microphone.

According to the foregoing embodiments, when it is expected that quality of the speech recognition may decrease as the user moves or as the surrounding environment changes, the current device may estimate the direction and distance, and transmit a signal to the other device which is in the direction of the current device to take over the speech recognition, thereby continuously performing the speech recognition. As such, each device may perform the speech recognition and combine the recognition results to generate a corresponding response based on the recognition results. In addition, when taking over the speech recognition, information on recording characteristics and the like may also be transmitted to help generate the final result.

According to the foregoing embodiments, the device may select the other device to actively take over the speech recognition, and thus even in a situation in which the quality of recording decreases, the recording is impossible, or when the user moves, several devices may cooperate to continue to smoothly perform the speech recognition.

Hereinafter, embodiments of processing speeches collected from several devices in a situation in which the user moves will be described with reference to FIGS. 31 to 37.

Figure 31:
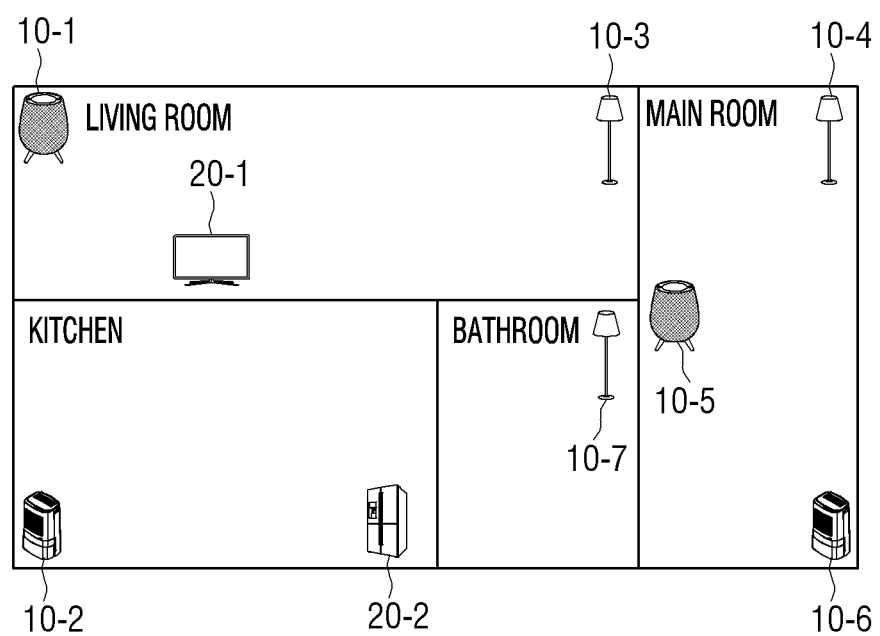
FIG. 31 is a diagram illustrating a process of matching audio signals received from a plurality of audio signal collecting devices based on a movement of a user, according to an embodiment.
Figure 32:
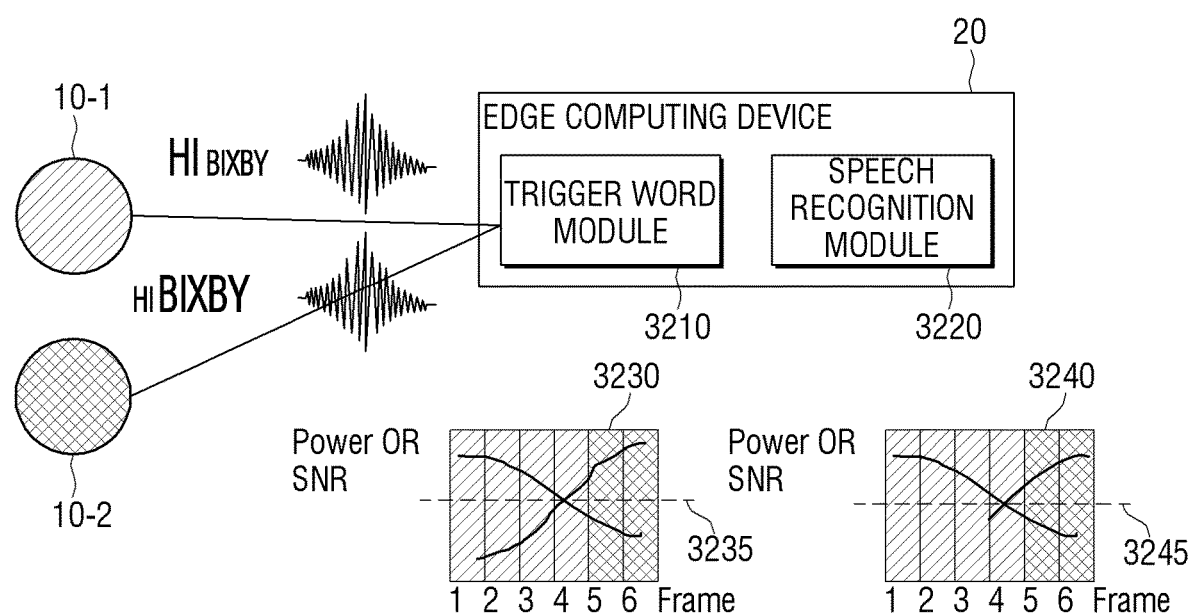
FIG. 32 is a diagram illustrating a method for recognizing, by an edge computing device, a trigger word from the audio signals received from the plurality of audio signal collecting devices, according to an embodiment.

Referring to FIGS. 31 and 32, an edge computing device 20 may match audio signals received from a first audio receiving device 10-1 and a second audio receiving device 10-2, respectively, to perform speech recognition.

Specifically, the edge computing device 20 may receive an audio signal according to a speech of a user from a first audio signal collecting device 10-1. In addition, when the movement of the user is detected based on information included in the audio signal received from the first audio signal collecting device 10-1, the edge computing device 20 may transmit a control signal for receiving the audio signal according to the speech of the user from a second audio signal collecting device 10-2 positioned in the movement direction of the user to the second audio signal collecting device 10-2. In addition, the edge computing device 20 may receive the audio signal from the second audio signal collecting device 10-2, and match the audio signal received from the first audio signal collecting device 10-1 and the audio signal received from the second audio signal collecting device 10-2 to perform the speech recognition on the speech of the user.

FIG. 31 is a diagram illustrating a process of matching audio signals received from a plurality of audio signal collecting devices according to a movement of a user.

As illustrated in FIG. 31, audio signal collecting devices 10-1 to 10-7 and edge computing devices 20-1 and 20-2 may be disposed in the home. Hereinafter, the audio signal collecting devices 10-1 to 10-7 may correspond to the electronic devices 100-1, 100-2, . . . 100-N in the above-described embodiments. Therefore, the descriptions of the electronic devices 100-1, 100-2, . . . 100-N may also be applied to the audio signal collecting devices 10-1 to 10-7.

In addition, the edge computing devices 20-1 and 20-2 may correspond to the hub device 200 in the above-described embodiments. Therefore, the above-described hub device 200 may also be applied to the edge computing devices 20-1 and 20-2.

The edge computing devices 20-1 to 20-2 are devices in which edge computing technology is implemented, and the edge computing technology is a technology for supplementing the limitation of cloud computing by an existing server. In particular, as the amount of data in IoT devices has increased and real-time processing has become important, the cloud computing by the server has some limitations. In the edge computing technology, some or all of the computing tasks previously performed on the server may be performed. Edge computing is a technology that distributes data in the vicinity of IoT devices or in the IoT device itself, and may process data faster than the existing cloud computing technology. Therefore, the edge computing devices 20-1 to 20-2 on which edge computing technology is implemented may locally process data received from the audio signal collecting devices 10-1 to 10-7 more efficiently.

The audio signal collecting devices 10-1 to 10-7 (hereinafter collectively described as "an audio signal collecting device 10") and the edge computing devices 20-1 to 20-2 (hereinafter collectively described as "an edge computing device 20") are devices having computing capability, and may include a memory for storing computer executable instructions and a processor capable of executing the instructions to perform a particular function. Therefore, a function of the audio signal collecting device 10 described below is implemented by the processor of the audio signal collecting device 10, and a functionality of the edge computing device 20 may be implemented by the processor of the edge computing device 20.

The audio signal collecting devices 10 may include a microphone. The audio signal collecting devices 10 may receive the speech of the user through the microphone and transmit an audio signal corresponding to the received speech to at least one of the edge computing devices 20. In addition, the edge computing devices 20 may perform speech recognition on the audio signals received from various audio signal collecting devices 10.

According to an embodiment, when the user utters while moving in the home, the audio signal collecting devices 10 may receive a speech and transmit an audio signal corresponding to the received speech to at least one of the edge computing devices 20, and at least one of the edge computing devices 20 may perform matching processing of connecting the audio signals received from the audio signal collecting devices 10-1 to 10-7 in the order of utterance to obtain a final speech recognition result.

The audio signal collecting device 10 may detect a speech in the audio signal obtained through the microphone. For example, a speech section, a noise section, and background noise may be separated through Voice Activity Detection (VAD) and/or End Point Detection (EPD) technology. The VAD technology is a technology that may detect a voice of human using a statistical model, a deep learning model, and etc., based on sound volume or energy distribution in a frequency domain, and the EPD technology is a technology for detecting the end point of a voice of human in sound.

The audio signal collecting device 10 may transmit an audio signal to at least one of the edge computing devices 20 when the speech is detected from the audio signal obtained through the microphone included in the audio signal collecting device 10. Here, a transmission burden may occur when the obtained audio signal is always transmitted to the edge computing device 20. Therefore, to alleviate transmission burden on both the audio signal collecting device 10 and the edge computing device 20, the audio signal may be transmitted only when speech recognition is required.

According to another embodiment, even if the voice section is not detected in the audio signal obtained through the microphone, the audio signal collecting device 10 may activate an audio signal transmission operation by a control of the edge computing device 20. For example, the edge computing device 20 may determine that the user is moving based on the quality of an audio signal received, such as power and/or signal-to-noise ratio (SNR) being lowered, from an audio signal collecting device 10-1. In this case, the edge computing device 20 may request the audio signal collecting device 10-2, which may be closer to the user, to transmit an audio signal that may have a better quality.

The audio signal collecting device 10 may further include a camera. The audio signal collecting device 10 may detect the movement of the user by analyzing an image obtained through the camera. For example, the audio signal collecting device 10 may recognize an object in the image obtained through the camera, and detect the movement of the user by tracking the recognized object.

According to still another embodiment, the audio signal collecting device 10 may transmit the image obtained through the camera to at least one of the edge computing devices 20. In this case, at least one of the edge computing devices 20 may recognize an object by analyzing the image, and detect the movement of the user by tracking the recognized object. In addition, the edge computing devices 20 may also include a camera and may detect the movement of the user based on the obtained image.

Furthermore, the edge computing device 20 may detect that the user movement based on a difference in amplitude of the user speech input through a plurality of microphones included in the edge computing device 20. Alternatively, the edge computing device 20 may detect the movement of the user based on the difference in amplitude of the user speech in the audio signals received from the audio signal collecting device 10 having the plurality of microphones.

On the other hand, the edge computing device 20 may obtain direction information of the user speech signals input through the plurality of microphones included in the audio signal collecting device 10, and may also detect the movement of the user based on the obtained direction information. Specifically, the plurality of microphones may be implemented as a microphone array in which the plurality of microphones are aligned at equal or varying intervals. In addition, the direction information of the user speech signal may be obtained by a Direction of Arrival (DOA) technique using the microphone array.

Here, the DOA technique may refer to a technique for obtaining the direction information on a speech signal using correlation between the speech signals received through the respective microphones among the plurality of microphones included in the microphone array. Specifically, according to the DOA technique, when the speech signal is received at the plurality of microphones at a certain incident angle, the edge computing device 20 may obtain an incident angle of the speech signal based on a delay distance and a delay time of the speech signal arriving at each microphone included in the plurality of microphones, and obtain the direction information on the received speech signal based on the obtained incident angle.

The audio signal collecting device 10 may further include a speaker, and may output a response to the user speech through the speaker. For example, the edge computing device 20 may transmit a response speech corresponding to the speech recognition result to the audio signal collecting device 10, and the response speech may be output from the audio signal collecting device 10.

The edge computing device 20 may include a trigger word module and a speech recognition module. The trigger word module may recognize a predetermined trigger word or phrase in the audio signal, and activate the speech recognition module when the trigger word is recognized. The trigger word may be a predetermined word or sentence. For example, 'Hi Bixby' and the like may be used.

According to an embodiment, the edge computing device 20 may recognize the trigger word from the audio signals received from a plurality of audio signal collecting devices 10.

FIG. 32 is a diagram illustrating a method for recognizing, by an edge computing device 20, a trigger word from the audio signals received from the plurality of audio signal collecting devices, according to an embodiment.

The edge computing device 20 may include a trigger word module 3210 and a speech recognition module 3220, which are software modules stored in a memory. The processor of the edge computing device 20 may execute such software modules to perform the trigger word recognition and speech recognition function.

Referring to FIG. 32, when the user says "Hi Bixby" while moving from the first audio signal collecting device 10-1 to the second audio signal collecting device 10-2, the first and second audio signal collecting devices 10-1 and 10-2 may detect the speech and transmit an audio signal to the edge computing device 20. The audio signal may be configured in frame units (e.g., 20 ms).

In this case, the trigger word module 3210 may recognize the trigger word in one of a first method and a second method. However, in the disclosure, the separation of the trigger word module 3210 and the speech recognition module 3220 is to more clearly describe the operation of the edge computing device 20. The first method and the second method described herein may also be performed by the speech recognition module 3220.

According to the first method, the trigger word module 3210 of the edge computing device 20 may receive an audio signal from each of the audio signal collecting devices 10-1 and 10-2 connected to the edge computing device 20. The trigger word module 3210 may compare the power and/or signal-to-noise ratio (SNR) of the signal of each of the frames constituting the audio signal received from each of the audio signal collecting devices 10-1 and 10-2 to identify frames that are better for speech recognition, i.e., frames with a higher power and/or signal-to-noise ratio. For example, when frames corresponding to the "Hi" portion are preferably received from the first audio signal collecting device 10-1, and frames corresponding to the "Bixby" portion are preferably received from the second audio signal collecting device 10-2, the trigger word module 3210 may use the frames corresponding to the "Hi" portion received from the first audio signal collecting device 10-1 for speech recognition and may use the frames corresponding to the "Bixby" portion received from the second audio signal collecting device 10-2 for speech recognition. Specifically, frames that are good for speech recognition may be identified in the audio signal received from the first audio signal collecting device 10-1, and frames that are good for speech recognition may be identified in the audio signal received from the second audio signal collecting device 10-2, such that the identified frames are matched in chronological order and the trigger word may be recognized based on the matched frames. For example, referring to a graph 3230 of FIG. 32, the trigger word module 3210 may identify a frame having a power or signal-to-noise ratio greater than or equal to a predetermined value 3235, match the identified frames, and recognize the trigger word based on the matched frames.

Specifically, when the audio signals are received from the audio signal collecting devices 10-1 and 10-2, the trigger word module 3210 may compare the power and/or signal-to-noise ratio (SNR) of the frame of the audio signal received from the first audio signal collecting device 10-1 and the frame collected from the second audio signal collecting device 10-2 to identify the frame that is better for recognition, match the identified frames in chronological order, and recognize the trigger word based on the matched frames.

The unit for comparing the audio frame received from the audio signal collecting device may be a power and/or signal-to-noise ratio (SNR) in a unit of one frame or may be a power and/or signal-to-noise ratio (SNR) in units of N frames depending on the setting. According to the second method, when it is determined that the speech is reduced in the audio signal received from the first audio signal collecting device 10-1, the edge computing device 20 may activate the second audio signal collecting device 10-2. The activation is to request the second audio signal collecting device 100-2 to transmit the audio signal.

Specifically, in addition to the first method described above, when it is determined that a frame of the audio signal received from the second audio signal collecting device 10-2 at a specific time is better than the frame of the audio signal received from the first audio signal collecting device 10-1, the trigger word module 3210 may match frames of the audio signal received from the first audio signal collecting device 10-1 until the specific time, and match frames of the audio signal received from the second audio signal collecting device 10-2 after the specific time. Accordingly, the trigger word included in the audio signal may be more accurately recognized based on the matched frames. For example, referring to a graph 3240 of FIG. 32, the trigger word module 3210 may identify a frame having a power or signal-to-noise ratio greater than or equal to a predetermined value 3245, match the identified frames, and recognize the trigger word based on the matched frames.

According to the above-described embodiments, even if the user utters the trigger word while moving, there is an advantage that the trigger word may be accurately recognized.

After the trigger word module 3210 recognizes the trigger word in the above-described manner, the trigger word module 3210 may activate the speech recognition module 3220.

The speech recognition module 3220 may perform speech recognition when activated by the trigger word module 3210. The speech recognition module 3220 may convert an audio signal corresponding to the user speech into a word string or text.

Figure 33:
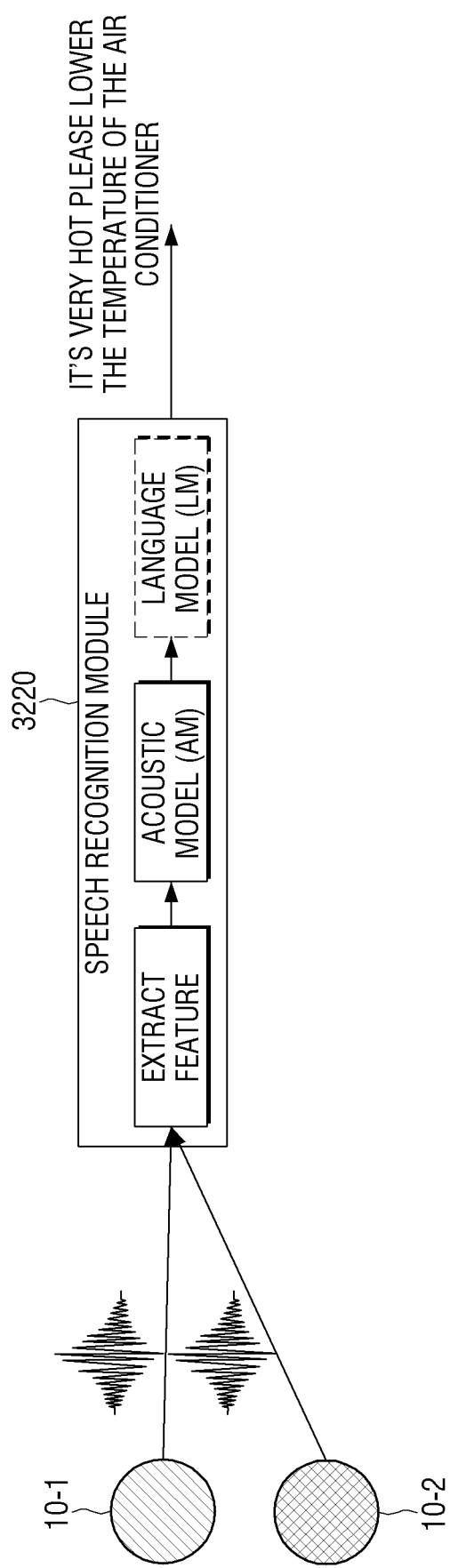
FIG. 33 is a diagram illustrating an example of a process of converting the audio signal into a word string in a speech recognition module according to an embodiment.

Referring to FIG. 33, the speech recognition module 3220 may generally include a process of extracting a feature portion of the speech, a process of passing the extracted feature information to an acoustic model (AM), and/or a process of passing the information passed through the acoustic model to a language model.

Specifically, the speech recognition module 3220 may extract the feature information from the audio signal. For example, the speech recognition module 3220 may extract the feature information including at least one of Cepstrum, Linear Predictive Coefficient (LPC), Mel Frequency Cepstral Coefficient (MFCC), or Filter Bank Energy from the audio signal.

The speech recognition module 3220 may obtain a pronunciation string, a character string, and a word string by passing the feature information through the acoustic model (AM).

The speech recognition module 3220 may further include a language model (LM). The language model may be used to supplement the information obtained through the acoustic model. For example, when the user speaks "it's very hot please lower the temperature of the air conditioner", and if the speech recognition is performed only by the acoustic model, "ondo" (means "temperature" in Korean) may be incorrectly recognized as "uundong" (means "exercise" in Korean). The language model analyzes the relationship between words to increase the likelihood that words with a higher relationship are combined, thereby making it possible to prevent the problem that the word is incorrectly recognized. In other words, a word that is more relevant in the context of a sentence or a phrase is more likely to be used or may be given higher relationship score.

On the other hand, when the quality of the audio signal received from the first audio signal collecting device 10-1 decreases, the edge computing device 20 may detect that the user has moved and may activate the second audio signal collecting device 10-2 which is in the movement direction of the user. In other words, the edge computing device 20 may request the second audio signal collecting device 10-2 to further transmit an audio signal received from the user.

On the other hand, the edge computing device 20 may determine which audio signal collecting device is located in the movement direction of the user using an artificial intelligence model. Here, the artificial intelligence model may include at least one artificial neural network and may be learned by deep learning. Specifically, the artificial intelligence model may include at least one artificial neural network of a deep neural network (DNN), a convolutional neural network (CNN), a recurrent neural network (RNN), and a generative adversarial network (GAN). However, artificial neural network models included in the artificial intelligence model are not limited hereto.

For example, when the quality of the audio signal received from the first audio signal collecting device 10-1 decreases, the edge computing device 20 may not have information to determine which other audio signal collecting device needs to be activated for the first time, and may thus activate all audio signal collecting devices. Then, when a speech of the same user is in the audio signal received from the second audio signal collecting device 10-2 among the audio signals received from all audio signal collecting devices and the quality of the audio signal is better, it may be determined that the user moved from the first audio signal collecting device 10-1 to the second audio signal collecting device 10-2. Such situations may be learned many times. As such, when the same situation occurs after repetitive learning, the edge computing device 20 may only activate a particular audio signal collecting device instead of activating all audio signal collecting devices.

Although not described above, there may be other methods of using the quality of the audio signal, the difference in amplitude in the audio signal obtained through the plurality of microphones, the image obtained through the camera.

The edge computing device 20 may match the speech of the same user on the audio signals received from different audio signal collecting devices 10 in chronological order. Specifically, the edge computing device 20 may collect and connect different audio signals from different audio signal collecting devices 10 that are expected to have high speech recognition accuracy. In this case, it is also possible to cut and connect the speech of the user in units of frames (or in units of fixed time), and it is also possible to connect those with a score of a certain level or higher, based on a score of the result of passing through the acoustic model or the language model regardless of the units of frame or specific time. Here, the score is a probability value indicating the accuracy of the audio signal passing the acoustic model or language model. For example, a score of 0.8 means that it is accurate with a probability of 80%. A detailed matching method performed by the edge computing device 20 will be described with reference to FIGS. 34 to 37.

FIGS. 34 to 37 are diagrams illustrating a matching method in the edge computing device 20 according to various embodiments.

Figure 34:
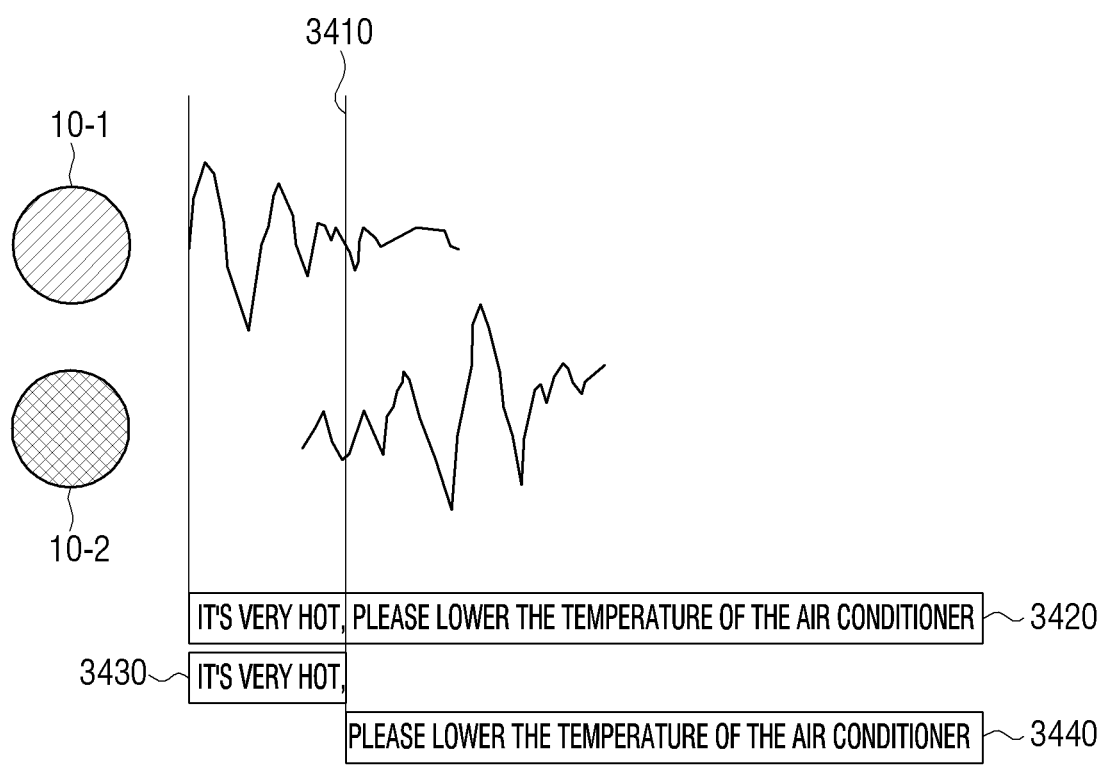
FIGS. 34 to 37 are diagrams illustrating a matching method in the edge computing device according to various embodiments.
Figure 35:
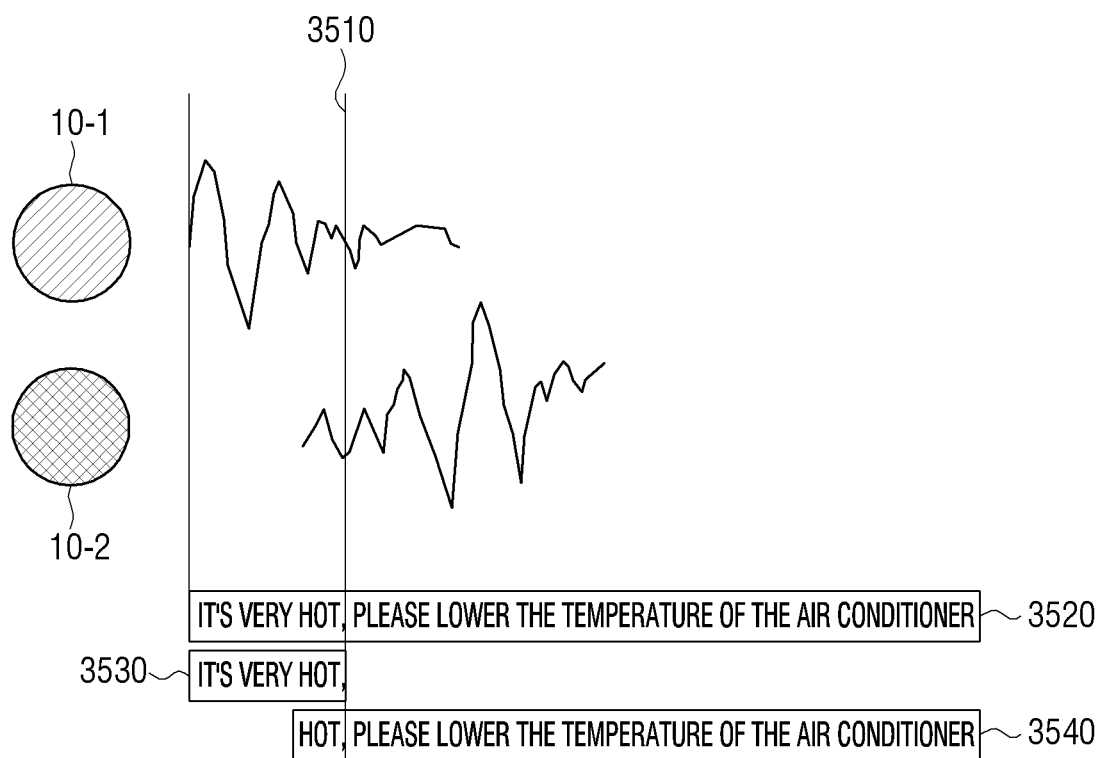
Figure 36:
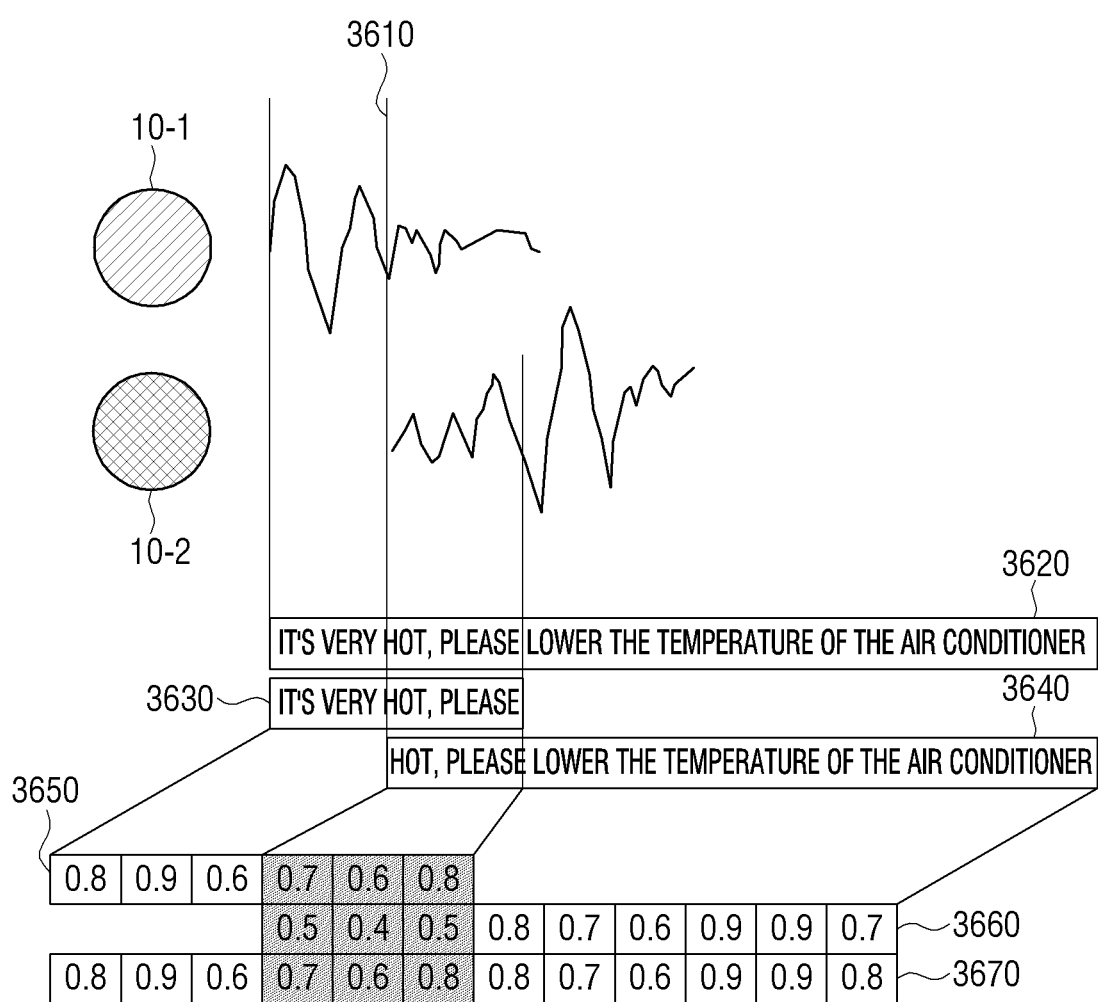

Hereinafter, the matching method will be described under the assumption that the edge computing device 20 receives audio signals from the first audio signal collecting device 10-1 and the second audio signal collecting device 10-2, respectively, aligns the received audio signals, and compare the aligned audio signals. Here, the criterion for aligning the received audio signals may be a time at which the audio signals are received, or the similarity of a pronunciation string or a character string. FIGS. 34 to 36 will be described in detail under the assumption that the received audio signals are aligned based on the time at which the audio signals are received. An embodiment in which the received audio signal are aligned based on the similarity of the pronunciation string or the character string will be described later with reference to FIG. 37.

Hereinafter, the matching method will be described under the assumption that the edge computing device 20 receives an audio signal from the first audio signal collecting device 10-1 and receives the audio signals from the second audio signal collecting device 10-2 as well as the first audio signal collecting device 10-1 after the movement of the user is detected. Therefore, it is apparent that the matching method described below is problematic since the edge computing device 20 activates the second audio signal collecting device 10-2 based on the detected movement of the user.

FIG. 34 is a diagram illustrating an embodiment in which a plurality of audio signals are matched based on a time of obtaining an audio signal.

Referring to FIG. 34, the edge computing device 20 may receive an audio signal according to a user speech from the first audio signal collecting device 10-1, and activate the second audio signal collecting device 10-2 when the movement of the user is detected. In addition, the edge computing device 20 may match the audio signals received from the first audio signal collecting device 10-1 before the time 3410 at which the second audio signal collecting device 10-2 is activated, and may match the audio signals received from the second audio signal collecting device 10-2 after the time 3410. In this case, the audio signals may be matched in units of frames (or in units of fixed time).

Specifically, as illustrated in FIG. 34, when a speech of the user is "it's very hot, please lower the temperature of the air conditioner" (3420), the edge computing device 20 may receive an audio signal corresponding to a user speech "it's very hot" (3430), from the first audio signal collecting device 10-1, and may receive an audio signal corresponding to a user speech "please lower the temperature of the air conditioner" (3440), from the second audio signal collecting device 10-2 after the time 3410 at which the second audio signal collecting device 10-2 is activated. In addition, the edge computing device 20 may match the audio signal corresponding to "it's very hot" (3430) received from the first audio signal collecting device 10-1 and the audio signal corresponding to "please lower the temperature of the air conditioner" (3440) received from the second audio signal collecting device 10-2 before the time 3410 at which the second audio signal collecting device 10-2 is activated.

In the foregoing embodiments, the plurality of audio signals are matched based on the time 3410 at which the second audio signal collecting device is activated, but more clearly, the time at which the edge computing device 20 receives the audio signal according to the user speech from the second audio signal collecting device after the second audio signal collecting device is activated may be the criterion for matching the plurality of audio signals. However, for convenience, the time 3410 at which the second audio signal collecting device is activated and the time at which the edge computing device 20 receives the audio signal according to the user speech from the second audio signal collecting device are referred to as the time 3410 at which the second audio signal collecting device is activated.

FIG. 35 is a diagram illustrating an embodiment in which a plurality of audio signals are matched based on quality of the received audio signal.

According to an embodiment, instead of simply matching the audio signal received before an activation time 3510 of the second audio signal collecting device 10-2 and the audio signal received after the activation time of the second audio signal collecting device 10-2, it is also possible to match a plurality of received audio signals based on the quality of the plurality of received audio signals.

Specifically, the edge computing device 20 may identify frames where the quality of each signal is at a certain level or higher among a plurality of frames constituting the audio signals received from the respective audio signal collecting devices 10-1 and 10-2 based on the power and/or signal-to-noise ratio of the plurality of received audio signals, and may match the identified frames.

For example, as illustrated in FIG. 35, when a speech of the user is "it's very hot, please lower the temperature of the air conditioner" (3520), the edge computing device 20 may receive an audio signal corresponding to a portion of the user speech "it's very hot" (3530) from the first audio signal collecting device 10-1, and may receive an audio signal corresponding to another portion of the user speech "hot, please lower the temperature of the air conditioner" (3540) from the second audio signal collecting device 10-2 after a time 3510 at which the second audio signal collecting device 10-2 is activated.

In addition, the edge computing device 20 may identify an audio signal having a relatively high quality of the audio signal among the audio signals corresponding to the user speech "hot" received from both the first audio signal collecting device 10-1 and the second audio signal collecting device 10-2 based on the power and/or signal-to-noise ratio of the plurality of received audio signals. For example, when the audio signal received from the second audio signal collecting device 10-2 corresponding to the user speech "hot" has a relatively higher quality signal compared to the audio signal received from the first audio signal collecting device 10-1, the edge computing device 20 may match an audio signal corresponding to "it's very" received from the first audio signal collecting device 10-1 and an audio signal corresponding to "hot, please lower the temperature of the air conditioner" received from the second audio signal collecting device 10-2.

FIG. 36 is a diagram illustrating an embodiment in which a plurality of audio signals are matched based on a score obtained through a language model or an acoustic model.

The edge computing device 20 may input a plurality of received audio signals to an acoustic model or a language model, obtain a score for a pronunciation string, a character string, or a word string through the acoustic model or the language model, and match the plurality of audio signals based on the obtained score. Here, the score is probability information on a speech recognition result of the audio signal and is specifically a probability value indicating the accuracy of the audio signal obtained through the acoustic model or the language model.

For example, as illustrated in FIG. 36, when a speech of the user is "it's very hot, please lower the temperature of the air conditioner" (3620), the edge computing device 20 may receive an audio signal corresponding to a user speech "it's very" (3630) from the first audio signal collecting device 10-1, and receive an audio signal corresponding to a user speech "hot, please lower the temperature of the air conditioner" (3640) from the second audio signal collecting device 10-2 after a time 3610 at which the second audio signal collecting device 10-2 is activated.

On the other hand, in addition to FIGS. 34 and 35, scores 3650, 3660, and 3670 obtained through an acoustic model or a language model are further illustrated in FIG. 36. Specifically, the edge computing device 20 may obtain a score 3650 for the audio signal received from the first audio collecting device 10-1 and a score 3660 for the audio signal received from the second audio collection device 10-2. In addition, if it is predetermined that only frames corresponding to scores of 0.6 or higher are used for matching, a score 3670 corresponding to the audio signal used for matching may be determined as illustrated in FIG. 36.

In addition, the edge computing device 20 may match the audio signals using frames corresponding to a portion of the user speech "it's very hot, please" among the audio signals received from the first audio signal collecting device and frames corresponding to another portion of the user speech "lower the temperature of the air conditioner" among the audio signals received from the second audio signal collecting device.

On the other hand, the edge computing device 20 may include a plurality of speech recognition modules to perform fast speech recognition on the received audio signals from the plurality of audio signal collecting devices 10. In addition, the speech recognition may be performed in parallel in the plurality of speech recognition modules.

Specifically, the edge computing device 20 may input the audio signal received from the first audio signal collecting device 10-1 and the audio signal received from the second audio signal collecting device 10-2 to each of the plurality of speech recognition modules included in the edge computing device 20, compare the scores obtained in parallel by the plurality of speech recognition modules in real time, and match the speech recognition results having a higher score among the audio signals received from the plurality of audio signal collecting devices.

Furthermore, the case of performing the speech recognition in one edge computing device 20 has been described above, but according to an embodiment, for improving the speed and efficiency of speech recognition, the speech recognition may be performed by comprehensively utilizing the speech recognition modules of the plurality of edge computing devices 20.

Specifically, the plurality of edge computing devices 20 may receive audio signals from the first audio signal collecting device 10-1 and the second audio signal collecting device 10-2, respectively. In addition, the plurality of edge computing devices 20 may input the received audio signal to the speech recognition module included in each edge computing device 20, and transmit the score obtained accordingly to one of the plurality of edge computing devices 20. One of the plurality of edge computing devices 20 that receives the scores from the plurality of edge computing devices 20 may compare the scores obtained in parallel from the plurality of edge computing devices 20 in real time, and match a speech recognition result having a higher score among audio signals received from the plurality of audio signal collecting devices to obtain a speech recognition result.

In addition, when the result of speech recognition processing by the edge computing device 20 is not accurate, it is also possible to process the speech recognition once more in an external server having more excellent computing capability, for example, the server 300 of the above-described embodiments. Specifically, when the quality of the speech signal received by the edge computing device 20 is low, or when the speech recognition score processed for the audio signal through the speech model or language model is low, it may be determined that the speech recognition processing result is not accurate, and it is also possible to process the speech recognition once more in an external server having more excellent computing capability. As such, the audio signal collecting device 10 may transmit the audio signal directly to the server 300 without passing through the edge computing device 20.

According to another embodiment, the edge computing device 20 itself may also include a microphone, perform the speech recognition on the audio signal obtained by itself, and transmit the audio signal to another edge computing device having better speech recognition capability.

When the speech recognition is completed after the matching, the edge computing device 20 may perform a specific task on the speech recognition result. For example, when the user speech "it's very hot, please lower the temperature of the air conditioner" is recognized, the edge computing device 20 may transmit a temperature control command to the air conditioner, and provide a speech response "The temperature of the air conditioner has been lowered to xx degrees."

On the other hand, such a speech response may be provided by the device that received the control command, such as the air conditioner. Alternatively, such a speech response may be provided by a device that is currently closest to the user. Alternatively, such a speech response may be provided by an audio signal collecting device to which the speech is finally input. In this case, a device to provide the speech may be determined based on parameters of various qualities of voice signal, such as the SNR of the speech, a sound pressure level, and a distance from the user who utters the speech.

Figure 37:
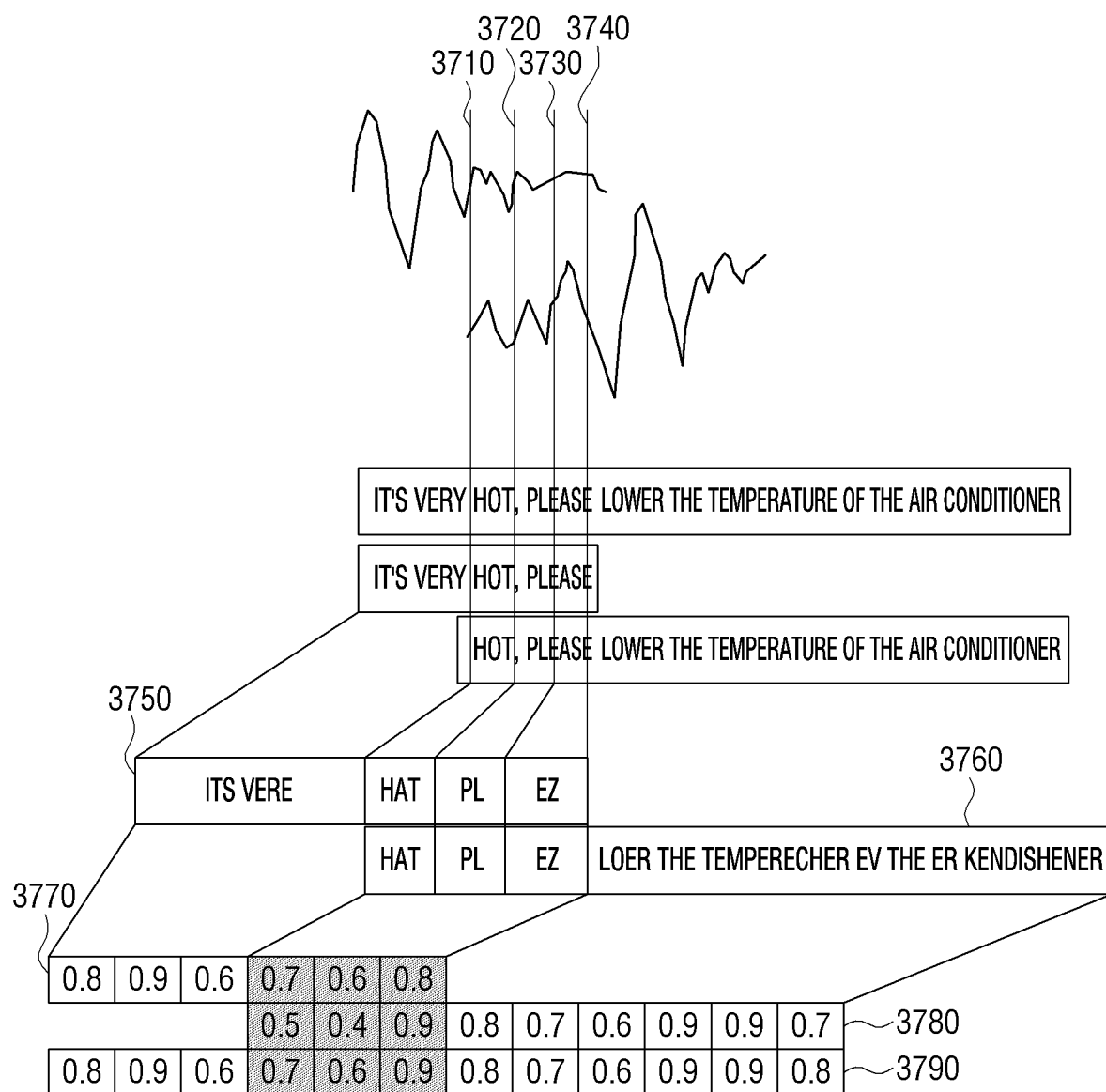

FIG. 37 is a diagram illustrating an embodiment in which a plurality of audio signals are aligned based on similarity of a pronunciation string or a character string, and the plurality of aligned audio signals are matched.

Hereinabove, the embodiment in which the plurality of audio signals are aligned based on the time, and are compared and matched has been. According to another embodiment, the plurality of audio signals may be aligned based on similarity of a pronunciation string or a character string between the plurality of audio signals, and the plurality of aligned audio signals may be compared and matched.

Hereinabove, in the matching of the plurality of audio signals, the description is made under assumption that the frame to be matched among the plurality of frames included in the plurality of audio signals is identified, and the identified frames are matched. However, the disclosure is not limited thereto. For example, when the plurality of audio signals are aligned based on the similarity of pronunciation string or character string between the plurality of audio signals, a unit of an audio signal to be matched may be identified based on a unit of pronunciation string or character string. In addition, the unit of the pronunciation string or the character string is not limited to a certain length.

For example, referring back to FIG. 34, when a speech of the user is "it's very hot, please lower the temperature of the air conditioner", the edge computing device 20 may receive an audio signal corresponding to a user speech "it's very" from the first audio signal collecting device 10-1, and receive an audio signal corresponding to a user speech "hot, please lower the temperature of the air conditioner" from the second audio signal collecting device 10-2 after a time 3410 at which the second audio signal collecting device 10-2 is activated.

In FIG. 37, alignment axes 3710, 3720, 3730, and 3740 may be identified based on a portion of the user speech where pronunciation strings 3750 and 3760 between the plurality of received audio signals are similar. Specifically, when the audio signals are received from each of the audio signal collecting devices 10-1 and 10-2, respectively, the edge computing device 20 may identify at least one of alignment axes 3710, 3720, 3730, and 3740 based on a portion of the user speech where the pronunciation strings 3750 and 3760 between the plurality of received audio signals are similar, as illustrated in FIG. 37. In addition, the edge computing device 20 may align the plurality of received audio signals based on the identified alignment axes 3710, 3720, 3730, and 3740, and compare the plurality of aligned audio signals.

In addition, FIG. 37 illustrates an example in which the plurality of audio signals are matched based on the scores obtained through the acoustic model and/or the language model, as described above with reference to FIG. 36. That is, FIG. 37 illustrates scores 3770, 3780, and 3790 obtained through the acoustic model and/or the language model. Specifically, the edge computing device 20 may obtain a score 3770 for the audio signal received from the first audio collection device 10-1 and a score 3780 for the audio signal received from the second audio collection device 10-2.

On the other hand, in the description with reference to FIG. 36, the case in which it is preset to use only a frame corresponding to a score equal to or greater than 0.6 has been described, but the disclosure is not limited thereto. According to still another embodiment, the edge computing device 20 may compare a score obtained by inputting the audio signal received from the first audio signal collecting device 10-1 to the acoustic model and/or the language model with a score obtained by inputting the audio signal received from the second audio signal collecting device 10-2 to the acoustic model and/or the language model, and may identify frames corresponding a higher score (3790).

Specifically, as illustrated in FIG. 37, a section in which the audio signal is received from both the first audio signal collecting device 10-1 and the second audio signal collecting device 10-2 may be a section corresponding to "hot" and "please". Further, in the pronunciation string 3750 corresponding to "hat" and the pronunciation string 3750 corresponding to "pl", a first score 3770 for the audio signal received from the first audio signal collecting device 10-1 may be higher (0.7 and 0.6, respectively), and in the pronunciation string 3750 corresponding to "ez", a second score 3780 for the audio signal received from the second audio signal collecting device 10-2 may be higher (0.9).

Therefore, the edge computing device 20 may match the audio signals using frames corresponding to the user speech "it's very hot, pl" among the audio signals received from the first audio signal collecting device and frames corresponding to the user speech "ease lower the temperature of the air conditioner" among the audio signals received from the second audio signal collecting device.

The various embodiments described above may be implemented in software, hardware, or a combination thereof. According to a hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In particular, the diverse embodiments described above may be implemented by the processor 110 of the electronic device 100, the processor 210 of the hub device 200, or the processor 310 of the server 300. According to a software implementation, the embodiments, such as procedures and functions, described herein may be implemented by separate software modules. Each of the software modules may perform one or more functions and operations described herein.

The various embodiments implemented in software including instructions may be stored in machine-readable storage media (e.g., a computer). The machine is an apparatus that invokes the stored instructions from the storage medium and is operable according to the invoked instruction, and may include the server 300 according to the embodiments herein.

If the instructions are executed by the processor, the processor may perform functions corresponding to the instructions, either directly or by using other components under the control of the processor. The instructions may include codes generated or executed by a compiler or an interpreter. For example, as the instructions stored in the storage medium are executed by the processor, the above-described method for controlling the electronic device 100, the hub device 200, or the server 300 may be executed.

The machine-readable storage media may be provided in the form of non-transitory storage media. Here, the terms 'non-transitory' means that the storage media do not include a signal and is tangible, but do not distinguish whether data is stored semi-permanently or temporarily in the storage media.

According to an embodiment, the method according to the various embodiments disclosed herein may be included and provided in a computer program product. The computer program product may be traded as a product between a seller and a purchaser. The computer program product may be distributed in the form of a machine readable storage media (e.g., a compact disc read only memory (CD-ROM)), or online through an application store (e.g., PlayStore™, AppStore™). In case of the online distribution, at least a portion of the computer program product may be at least temporarily stored in a storage medium, such as a memory of a server of a manufacturer, a server of an application store, or a relay server, or be temporarily generated.

Each of the components (e.g., modules or programs) according to the various embodiments may include a single entity or a plurality of entities, and some sub-components of the sub-components described above may be omitted, or other sub-components may be further included in the various embodiments. Additionally, some components (e.g., modules or programs) may be integrated into one entity to perform the same or similar functions performed by the respective components prior to the integration. The operations performed by the module, the program, or other component, in accordance with the diverse embodiments may be performed in a sequential, parallel, iterative, or heuristic manner, or at least some operations may be executed in a different order or omitted, or other operations may be added.

Although the embodiments have been illustrated and described hereinabove, the embodiments described herein are not limited to the above-mentioned embodiments, but may be variously modified by those skilled in the art to which the disclosure pertains without departing from the gist of the disclosure. These modifications should be understood to fall within the scope and spirit of the disclosure.

What is claimed is:

1. An electronic device comprising:
    a microphone to receive audio;
    a communicator;
    a memory configured to store computer-executable instructions; and
    a processor configured to execute the computer-executable instructions to:
        determine whether the received audio includes a predetermined trigger word spoken by a user,
        based on determining that the predetermined trigger word is included in the received audio, activate a speech recognition function of the electronic device,
        detect a movement of the user while the speech recognition function is activated, and
        based on detecting the movement of the user, transmit a control signal, to a second electronic device to activate a speech recognition function of the second electronic device,
    wherein the processor is further configured to:
        compare a signal-to-noise ratio (SNR) of each of a plurality of frames constituting the received audio,
        determine a frame among the plurality of frames having the SNR greater than or equal to a predetermined value,
        recognize the predetermined trigger word based on the determined frame,
        obtain first speech recognition information by performing speech recognition on the received audio,
        receive second speech recognition information through the communicator from the second electronic device receiving the control signal,
        obtain a final recognition result based on the first speech recognition information and the second speech recognition information,
        obtain the final recognition result by applying a language model to the second speech recognition information when the second speech recognition information received from the second electronic device is information indicating that an acoustic model is applied and the language model is not applied, and
        obtain the final recognition result by applying the acoustic model and the language model to the second speech recognition information when the second speech recognition information received from the second electronic device is information indicating that the acoustic model and the language model are not applied.

2. The electronic device according to claim 1, wherein the processor is further configured to detect the movement of the user based on the received audio obtained through the microphone after the speech recognition function is activated.

3. The electronic device according to claim 1, wherein the memory stores information on a plurality of electronic devices that receive the audio, and
    wherein the processor is further configured to:
        based on the movement of the user, identify one of the plurality of electronic devices that is closest to the user, and
        control the communicator to transmit the control signal to the identified electronic device.

4. The electronic device according to claim 1, wherein the processor is further configured to:
    obtain time information on a time at which the control signal is transmitted to the second electronic device, and
    match the first speech recognition information and the second speech recognition information based on the obtained time information to obtain the final recognition result.

5. The electronic device according to claim 4, wherein the obtained time information includes information on an absolute time at which the control signal is transmitted and information on a relative time at which the control signal is transmitted to the second electronic device based on a time at which the speech recognition function of the electronic device is activated.

6. The electronic device according to claim 1, wherein the processor is further configured to control the communicator to transmit the control signal, to the second electronic device, for providing a feedback on the final recognition result of the electronic device.

7. The electronic device according to claim 1, wherein the processor is further configured to activate the speech recognition function of the electronic device when a second control signal for activating the speech recognition function is received from the second electronic device.

8. The electronic device according to claim 7, wherein the processor is further configured to:
    receive user information from the second electronic device, and
    identify the received audio corresponding to the user information among a plurality of audios received through the microphone after the speech recognition function is activated by the second control signal.

9. The electronic device according to claim 7, wherein the processor is further configured to:
    obtain speech recognition information by performing speech recognition on the received audio until an utterance of the user ends after the speech recognition function is activated by the second control signal, and
    transmit the obtained speech recognition information to the second electronic device.

10. The electronic device according to claim 7, wherein the processor is further configured to identify a first user and a second user based on the received audio among a plurality of audios.

11. A method for controlling an electronic device, the method comprising:
    receiving audio through a microphone of the electronic device;

determining whether the received audio includes a predetermined trigger word spoken by a user;

based on determining that the predetermined trigger word is included in the received audio, activating a speech recognition function of the electronic device;

detecting a movement of the user moves the speech recognition function is activated; and based on detecting the movement of the user, transmitting a control signal, to a second electronic device to activate a speech recognition function of the second electronic device, wherein the method further comprises:

comparing a signal-to-noise ratio (SNR) of each of a plurality of frames constituting the received audio, determining a frame among the plurality of frames having the SNR greater than or equal to a predetermined value, recognizing the predetermined trigger word based on the determined frame, obtaining first speech recognition information by performing speech recognition on the received audio, receiving second speech recognition information through a communicator from the second electronic device receiving the control signal, obtaining a final recognition result based on the first speech recognition information and the second speech recognition information, applying a language model to the second speech recognition information when the second speech recognition information received from the second electronic device is information indicating that an acoustic model is applied and the language model is not applied, and applying the acoustic model and the language model to the second speech recognition information when the second speech recognition information received from the second electronic device is information indicating that the acoustic model and the language model are not applied.

12. The method according to claim 11, wherein in the detecting the movement of the user is based on the received audio obtained through the microphone after the speech recognition function is activated.

13. The method according to claim 11, wherein the electronic device stores information on a plurality of electronic devices that receive the audio, and wherein the method further comprises: based on the movement of the user, identifying one of the plurality of electronic devices that is closest to the user, and transmitting the control signal to the identified electronic device.

14. The method according to claim 11, further comprising:

obtaining time information on a time at which the control signal is transmitted to the second electronic device, and matching the first speech recognition information and the second speech recognition information based on the obtained time information to obtain the final recognition result.

15. The method according to claim 14, wherein the obtained time information includes information on an absolute time at which the control signal is transmitted and information on a relative time at which the control signal is transmitted to the second electronic device based on a time at which the speech recognition function of the electronic device is activated.

16. An electronic device comprising:

a communicator;

a memory configured to include at least one instruction; and a processor configured to execute the at least one instruction, wherein the processor is configured to:

receive a first audio signal of a user speech through the communicator from a first external device, determine whether the first audio signal of the user speech includes a predetermined trigger word spoken by a user, based on determining that the first audio signal of the user speech includes the predetermined trigger word, control the communicator to transmit a control signal, to a second external device, for receiving a second audio signal of the user speech from the second external device located in a movement direction of the user when a movement of the user is detected based on information included in the received first audio signal, receive the second audio signal through the communicator from the second external device, and match the received first audio signal and the received second audio signal to perform speech recognition on the user speech, wherein the processor is further configured to:

compare a signal-to-noise ratio (SNR) of each of a plurality of frames constituting the first audio signal, determine a frame among the plurality of frames having the SNR greater than or equal to a predetermined value, recognize the predetermined trigger word based on the determined frame, obtain first speech recognition information by performing speech recognition on the first audio signal, receive second speech recognition information through the communicator from a second electronic device receiving the control signal, obtain a final recognition result based on the first speech recognition information and the second speech recognition information, obtain the final recognition result by applying a language model to the second speech recognition information when the second speech recognition information received from the second electronic device is information indicating that an acoustic model is applied and the language model is not applied, and obtain the final recognition result by applying the acoustic model and the language model to the second speech recognition information when the second speech recognition information received from the second electronic device is information indicating that the acoustic model and the language model are not applied.

* * * * *